United States Patent [19]

Berlin, Jr. et al.

[11] Patent Number: 4,677,576

[45] Date of Patent: Jun. 30, 1987

[54] NON-EDGE COMPUTER IMAGE GENERATION SYSTEM

[75] Inventors: Edwin P. Berlin, Jr., Berkeley, Calif.; Geoffrey Y. Gardner, Centerport, N.Y.; Robert M. Gelman, Great Neck, N.Y.; Michael N. Gershowitz, Plainview, N.Y.

[73] Assignee: Grumman Aerospace Corporation, Bethpage, N.Y.

[21] Appl. No.: 508,260

[22] Filed: Jun. 27, 1983

[51] Int. Cl.[4] .................... G09B 9/08; H04N 7/18; G06F 15/66

[52] U.S. Cl. ................................ 364/522; 358/104; 340/723; 434/43

[58] Field of Search .................. 364/521, 522, 520; 340/720-728, 701, 703, 744, 798; 354/292; 353/30, 35; 355/40, 79; 358/104, 105

[56] References Cited

U.S. PATENT DOCUMENTS

| | | | |
|---|---|---|---|
| 3,602,702 | 8/1971 | Warnock | 364/522 |
| 4,116,444 | 9/1978 | Mayer et al. | 364/521 |
| 4,137,530 | 1/1979 | Hooker, Jr. | 340/723 |
| 4,179,823 | 12/1979 | Sullivan et al. | 364/521 |
| 4,179,824 | 12/1979 | Marsh | 364/521 |
| 4,209,832 | 6/1980 | Gilham et al. | 340/725 |
| 4,225,861 | 9/1980 | Langdon, Jr. et al. | 340/703 |
| 4,291,380 | 9/1981 | Rohner | 364/522 |
| 4,343,037 | 8/1982 | Bolton | 358/104 |
| 4,384,338 | 5/1983 | Bennett | 340/729 |
| 4,425,559 | 1/1984 | Sherman | 340/703 |

OTHER PUBLICATIONS

Franklin Crow, The Aliasing Problem in Computer-Generated Shaded Images, Communications of the ACM, Nov. 1977, vol. 20, No. 11, pp. 799-805.

Kuhl et al., Elliptic Fourier Features of a Closed Contour, Computer Graphics and Image Processing, vol. 18, 1982, pp. 236-258.

Matsuyama et al., A Structural Analyzer for Regularly Arranged Textures, Computer Graphics and Image Processing, vol. 18, 1982, pp. 259-278.

Sarraga, Algebraic Methods for Intersections of Quadric Surfaces in GM Solid, vol. 22, No. 2, May 1983, pp. 222-238.

Primary Examiner—Felix D. Gruber
Attorney, Agent, or Firm—Richard G. Geib; Daniel J. Tick; David Aker

[57] ABSTRACT

A computer image generation system is described which models objects without the necessity of linear edges. The system is adaptable for dynamic (real time) image generation from a compact model base for use in, for example, flight training systems. Scene content is enhanced by a novel texture generator. The system is designed for use with standard video display equipment.

43 Claims, 18 Drawing Figures

NON-EDGE COMPUTER IMAGE GENERATION SYSTEM

BACKGROUND OF THE INVENTION

This invention relates to computer image generation (CIG) systems in general, and in particular to dynamic (real time) CIG systems which model objects by means of nonlinear surfaces.

In order to achieve the high data rates required for real-time displays, a number of current CIG systems employ linear modeling techniques. Each object in the viewable scene displayed by such prior art image generators is defined as a polygon (or polyhedron) whose projection into the image plane consists of linear edges. Examples of such systems may be found in U.S. Pat. Nos. 3,602,702; 3,621,214; 3,736,564; 4,179,824; and 4,276,029; issued respectively to Warnock; Romney et al; Watkins; Marsh, and Gibson et al.

One advantage—indeed, the major justification—of linearization is simplified computation. By their nature, however, edge systems produce a stylized scene feature characterized more by linear artifacts than by the true nature of the desired imagery. Furthermore, scene content and detail are severely limited by the edge-count capacity of the system.

Of course, improvements in hardware capability have significantly enhanced the edge count of present CIG designs. Scene modeling still remains a problem, though, because even a small number of objects may include thousands of edges or faces which must each be positioned and linked in a reference coordinate system. Because actual reference coordinates, rather than descriptive features, are used to model objects in edge systems, automation of the modeling—i.e., off-line data base construction—is quite complicated and will typically require a significant investment in off-line equipment.

In addition to providing gross details of each modeled object, many CIG systems enhance scene content by texturing or varying the image intensity from pixel to pixel to create the illusion of a non-smooth surface. Texturing is accomplished, in general, in one of three ways. Most straightforward is the mapping of a stored texture pattern onto the image plane projection of the modeled object. This method is conceptually illustrated by the decor simulation method of U.S. Pat. No. 3,683,779; issued to Lifton. In a CIG system, of course, the texture pattern transparencies of Lifton would be implemented by means of memory storage devices with various patterns stored as digitized images. Scaling may be achieved by interpolation, but the data base for stored texture patterns is nonetheless extremely inefficient.

A second method of texturing takes advantage of the indeterminate nature of natural surface detail by simply varying color or intensity in a random fashion across the surface to be textured. Without relating the intensity variation in some way to object model coordinates, though, perspective validity cannot be maintained in a dynamic sequence.

Texture functions, a third general method for texturing, alleviate some of the problems discussed above, since they may be implemented with less memory than stored texture patterns and they may be mapped onto modeled objects, without change from frame-to-frame, to ensure perspective validity. An example of a system which uses preselected address bits for regulating texture is shown in U.S. Pat. No. 4,225,861, issued to Langdon et al. Existing texture functions, however, have certain drawbacks. Simple functions tend to produce regular unnatural patterns, while more complex functions add to computational expense and thereby exacerbate the problem of real time generation. It is clear, then, that desirable features in a CIG texture generator include correct representation of the indeterminate nature of natural surface textures, frame-to-frame coherence, and low storage and computational overhead.

A still further item of interest in CIG systems is antialiasing. Each frame in a dynamic image must be represented by a finite number of spatially sampled picture elements or pixels arranged in a raster format with equal spacing. The Nyquist Sampling theorem states that no spatial frequencies in the sampled signal greater than one half the sample frequency defined by the pixel width can be properly represented. Of course, the ideal solution to aliasing is to pre-filter the image before sampling to suppress all spatial frequencies greater than the Nyquist frequency. Unfortunately, implementation of an ideal low pass spatial filter is computationally prohibitive for real time frame rates.

Because ideal filtering is so computationally expensive, a number of approximate techniques have been developed. In one such method, each pixel is subdivided into an nxn subpixel array and the intensity adjusted in accordance with the number of subpixels in each different intensity or color area. No prior art antialiasing techniques have been developed, however, which completely eliminate the crawling, jumping and scintillation effects which characterize a dynamic sequence of aliased images. General discussions of antialiasing centering on more recent methods may be found in "Filtering Edges for Gray-Scale Displays", by Gupta and Sproull, *Computer Graphics*, Vol. 15, No. 3, August 1981; and "Anti-Aliasing through the Use of Coordinate Transformations", by K. Turkowski, *ACM Transactions on Graphics*, Vol. 1, No. 3, July 1982.

SUMMARY OF THE INVENTION

A principal object of the present invention is to provide a CIG system which will produce images free of the linear artifacts characteristic of edge type systems.

Another related object is to provide such a system in which scene modeling is characterized by the use of descriptive parameters.

A still further object of the present invention is the provision of a CIG system capable of producing dynamic images in real time.

Yet another object of this invention is to provide a system capable of implementing a texture generator with full perspective validity.

It is one still further object of the present invention to provide a CIG system with effective antialiasing.

In keeping with the foregoing objects, several preferred embodiments of the inventive CIG system and compatible modeling, texturing and antialiasing techniques are described. In one embodiment, a real time dynamic system is characterized by a highly modular architecture in which the projection of each viewable object in a scene model is processed by a dedicated object processor, and the image plane is divided into a plurality of uniform, contiguous subframes each processed by a dedicated subframe processor. A general purpose computer accesses a bulk storage device, and transfers object parameters therefrom to an available object processor as each object enters the viewable scene. A routing processor ensures that each object processor's output is passed to the appropriate subframe processors.

The modular assignment of computational tasks minimizes the necessity of intercommunication among the various elements. Each object processor, for example, produces a subframe bit map indicating which subframe or subframes are superimposed by the projection of the object being processed by that object processor. Thus, the routing processor need only receive the bit maps from each object processor, and each subframe processor need only receive information from the appropriate object processors. In a similar fashion, the system architecture is designed to minimize the bandwidth of each other critical data link as well.

Another feature of the real time system is the provision of double buffered input and output memories for each object and subframe processor. Each individual object or subframe processor is thus allowed to perform its assigned task using the most current data completely in parallel with every other processor, making real time image generation possible.

The real time image generation capability of the present invention makes the system especially suitable for flight training simulators. A preferred embodiment adapted for such use includes a simulated flight control console which continuously outputs updated viewpoint parameters for a simulated flight platform. The viewpoint parameters specify the location and orientation of the flight platform in the same object model space or reference coordinate system used to specify the object parameters in the bulk storage. In turn, the general purpose computer uses the viewpoint parameters to assign an available object processor to each object viewable in the image plane defined by the viewpoint parameters. The updated viewpoint parameters are also passed to each active object processor for exact determination of image plane curve coordinates defining the perspective projection of each object in the current image plane defined by the viewpoint parameters.

For applications not requiring real time image generation, the present invention is adaptable to off-line systems. One such system uses a general purpose computer to implement, in sequential fashion, the tasks of object and subframe processing performed by special-purpose, dedicated hardware modules operating in parallel in the real time system.

Further advantages and applications of the present inventive system will become clear upon reading the detailed descriptions of preferred embodiments which follow.

BRIEF DESCRIPTION OF THE DRAWINGS

Reference is made in the detailed description to the appended drawings, in which.

DETAILED DESCRIPTION OF PREFERRED EMBODIMENTS

Figure 1:
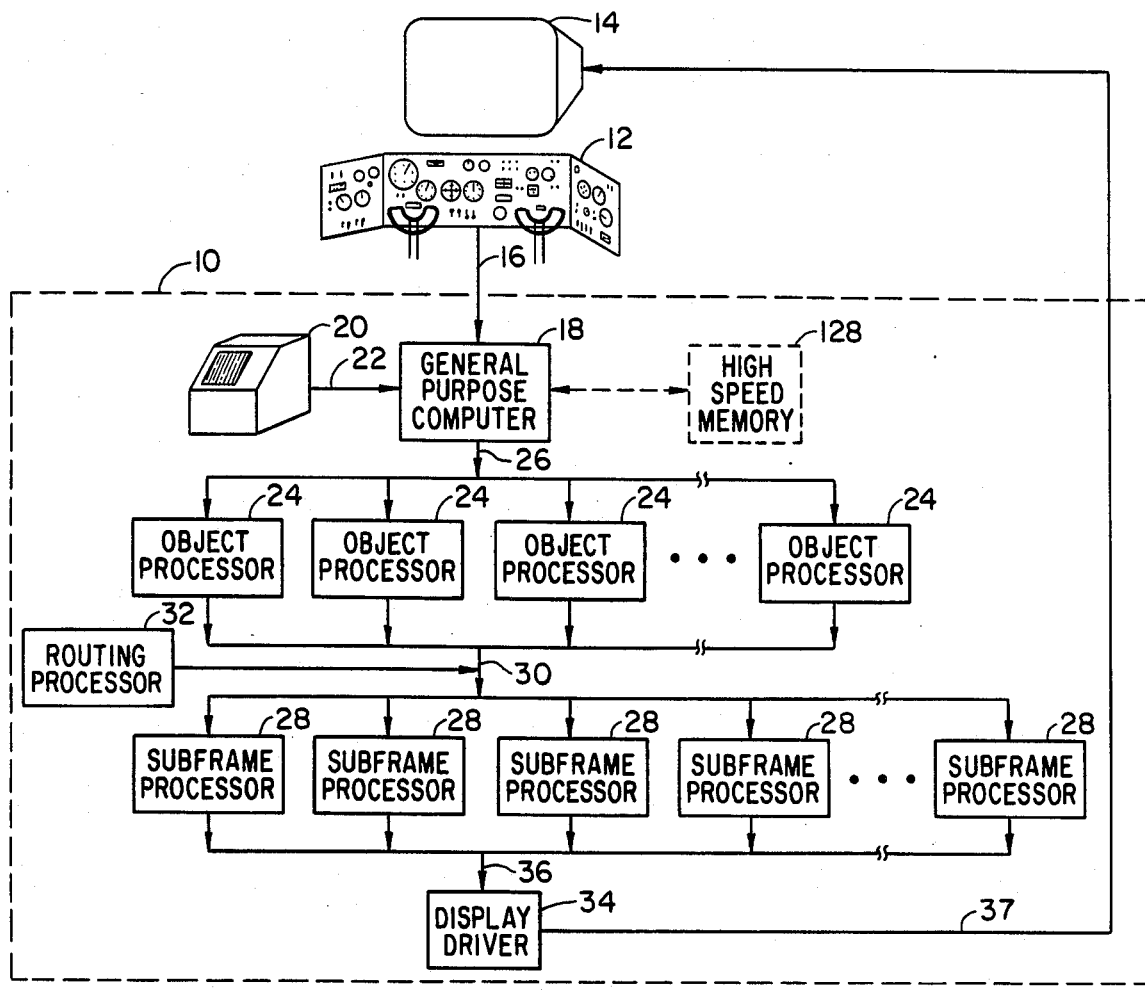
FIG. 1 is a schematic block diagram of a preferred embodiment of the present invention.

Referring to FIG. 1, the inventive CIG system 10 is embodied in a flight simulator with a simulated flight control console 12 and video display 14. As indicated by data link 16, flight console 12 outputs digitized viewpoint parameters in response to actions by a flight trainee operating the console. The viewpoint parameters are updated once during each passage of a desired frame period, the frame rate being selected so as to bring about compatibility with available video display devices.

The updated viewpoint parameters are received by a mainframe (general purpose) computer 18 programmed to access a bulk memory means such as a disc drive 20. Information in the form of object lists is stored in bulk memory 20, each object list including a plurality of object parameters indicating the size, shape, orientation, location and texture of one of a multiplicity of objects making up the modeled region. The viewpoint parameters indicate the location and orientation of the flight platform simulated by console 12 over the modeled region stored in bulk memory 20. By appropriate interpretation of the viewpoint parameters, the computer 18 keeps track of which modeled objects are viewable in the image plane simulated by video display 14. The object lists for the currently viewable objects and transferred, via data link 22, from bulk memory 20 to the computer 18.

The object parameters for each viewable object are first processed by one of a plurality of object processors 24. As each object enters the viewable scene, it is assigned an object processor by the computer 18 and its object list is transferred to that processor. In addition to keeping track of which objects are currently viewable, computer 18 monitors the availability of each object processor, reclaiming those whose assigned objects leave the viewable scene. Thus, the data link 26 connecting computer 18 with object processors 24 need not be of a sufficient bandwidth to supply each active object processor with a new object list during each frame. In addition to passing the updated viewpoint parameters, link 26 is only required to transfer object lists to newly assigned object processors.

During each frame period, each object processor provides an updated set of coefficients for image plane curves for its assigned object from the viewpoint parameters and the corresponding shape, size, orientation and location object parameters. The image plane curve coefficients represent a perspective projection of the object in image plane coordinates, without regard to the occulting of one object by another. Thus, no intercommunication is necessary among the object processors, and all of the image plane curve coefficients may be computed in parallel during each frame period.

In order to create a video display from the object processor outputs, it is necessary to update an intensity level during each frame period for each of a multiplicity of pixels corresponding to sample points on the image plane. Since a typical video raster may include on the order of $10^5$ to $10^6$ individual pixels, pixel generation in the present CIG system is performed by a plurality of subframe processors 28. Each such processor is associated with a subframe defined by one of a plurality of uniform contiguous areas forming the image plane. It is anticipated that each subframe may include on the order of 32×32 pixels.

Since the image plane curves are updated for each frame, all of the object processor 24 outputs must be transmitted over data link 30 once per frame period. Not all of this information, is needed by each subframe processor 28, however, because for a given frame, most objects will appear in only one subframe or a small group of contiguous subframes. Conversely, few subframes will be required to receive a large number of object processor outputs. In the embodiment of FIG. 1, then, a routing processor 32 governs the transfer of image plane curve coefficients, object parameters, and viewpoint parameters over data link 30. Under control of the routing processor 32, each active object processor 24 output is transmitted only once per frame period and is received only by those subframe processors 28, whose associated image plane areas are intersected by the projection of the associated object.

The digitized pixel intensity levels from subframe processor 28 are received by display driver 34 over data link 36. The pixels are arranged in video raster format by display driver 34, which is preferably a standard digital-to-analog video converter with appropriate timing and synchronizing hardware, so that video signal 38 may be utilized directly by video display 14.

Figure 2:
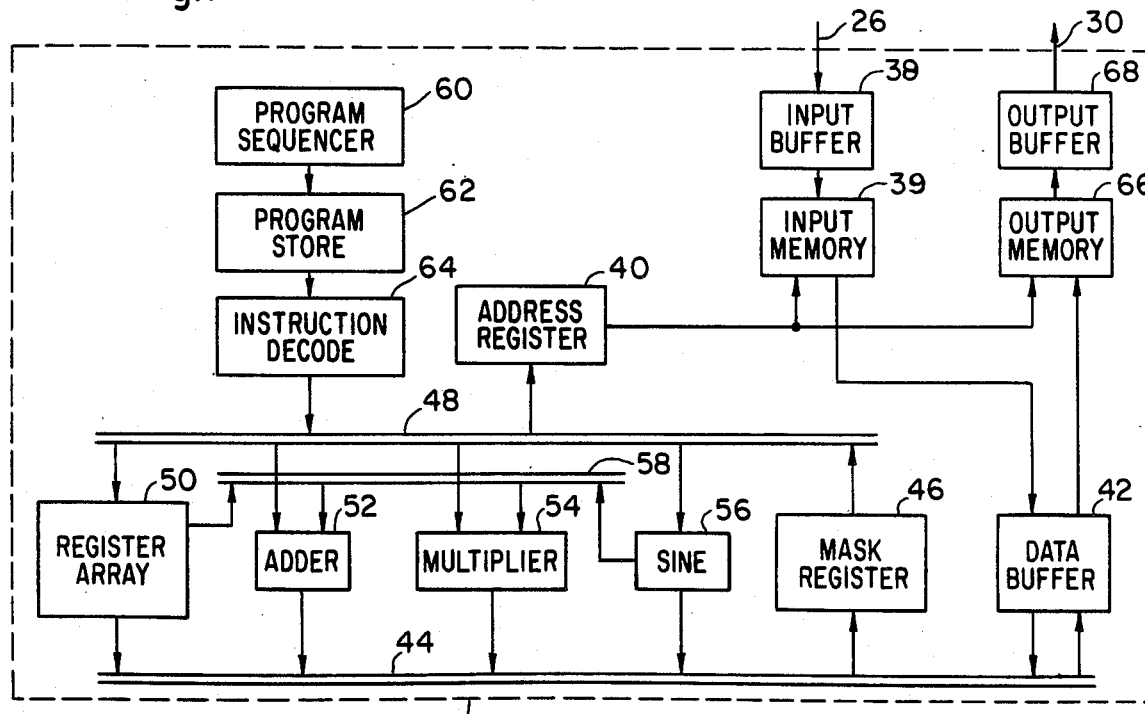
FIG. 2 is a detailed block diagram of an object processor from FIG. 1.

The internal architecture of the object processors 24 is shown in FIG. 2. Preferably, a standard format, such as that of Table A below, is used for all of the object lists. Hence, the identical architecture is employed in a preferred embodiment for all of the object processors 24.

With reference to TABLE A and FIG. 2, an object list transmitted over data link 26 first enters an input buffer 36. At the start of each frame period, the contents of the input buffer 36 are transferred into a working input memory 38. An address register 40 accesses memory 38, allowing individual words therein to be shifted into a data buffer 42. From buffer 42, input words are shifted, by means of a buffer bus 44, to a mask register 46.

TABLE A

| Word Number | Object List Format Parameter(s) | # Bits Required |
|---|---|---|
| 1 | List length | 7 |
| | Planar surface count | 3 |
| 2-4 | Location | all |
| 5-7 | Size, Shape | all |
| 8-10 | Orientation | all |
| 11-12 | Quadric surface texture | all |
| 13-15 | 1st Planar surface location | all |

TABLE A-continued

| Word Number | Object List Format Parameter(s) | # Bits Required |
|---|---|---|
| 16-17 | 1st Planar surface texture | all |
| 18-20 | 2nd Planar surface location | all |
| 21-22 | 2nd Planar surface texture | all |
| ... | ... | ... |

In order to provide as compact as possible an object model data base, some of the words in the object list format are used for multiple parameters. In the TABLE A format, for example, a seven bit field stores the object list length, while other directory parameters are stored in different fields of the first object list word. Accordingly, register 46 is used to justify and mask off the various partial word parameters from buffer 42.

Once isolated by register 46, the object and viewpoint parameters are made available on a program bus 48. Temporary storage for the parameters is provided by an array of working registers 50 responsive to program bus 48. Three arithmetic logic units, an adder 52, a multiplier 54, and a sine unit 56, preferably a lookup table, are also responsive to program bus 48. Adder 52 and multiplier 54 are additionally responsive to an accumultor bus 58 which in turn is responsive to the sine generator 56 and at least one of the working registers 50. The outputs from the arithmetic logic units 52, 54, and 56 and at least one of the working registers 50 may be loaded into the data buffer 42 or the mask register 46 by means of buffer bus 44.

The clocking, loading and enabling of the various registers, logic units and memories is performed by a control section or program unit including a program sequencer 60, a program store unit 62 and an instruction decoder 64. Because of the high throughput requirement for object processors 24, the instruction sequence stored in unit 62 is preferably implemented in microcoded firmware. Use of a pre-programmed read only memory (ROM) or a random access memory (RAM) loaded from the mainframe for program store unit 62 adds a desirable flexibility to the system, allowing the object processors to be adapted to different data word length or additional parameters such as color information to be added to the object lists by simply replacing the ROM's in each object processor, or by changing the program loaded into the RAM's. Means of loading the RAM's must be provided and will be obvious to those skilled in the art.

It will be noted that the data links in FIG. 2 show only the paths over which data words and memory addresses are transferred. Those skilled in the art will appreciate that various logical outputs from the instruction decoder 64 are used for controlling and timing of the data processing sections. In addition, to accommodate the variations permitted in the object list format of TABLE A—e.g. differences in the number of surfaces defining each modeled object which will necessitate different memory addresses to be loaded from instruction decoder 64 to address register 40—program sequencer 60 preferably includes a number of flag registers responsive to logical signals from the data processing sections. The flag registers, in turn, are used by the program sequencer to adjust a program pointer in response to the particular processing requirements of each object list.

The output from object processor 24 for each frame period is placed in an output memory 66 responsive to address register 40 and data buffer 42. Concurrent with the transfer of input parameters from buffer 36 to memory 38 at the beginning of each frame period, the object processor outputs stored in memory 66 during the previous frame period are transferred to an output buffer 68 for transmission over data link 30.

Figure 3:
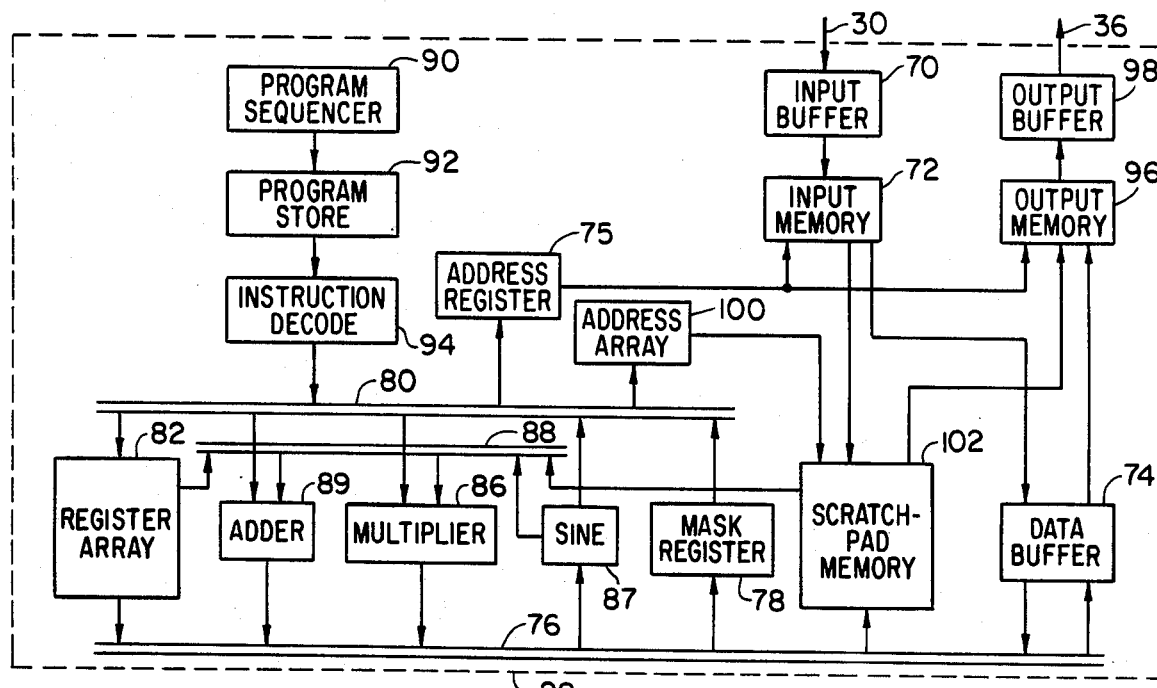
FIG. 3 is a detailed block diagram of a subframe processor from FIG. 1.

As shown in FIG. 3, the architecture of the subframe processors 28 is similar to that of object processors 24. In particular, the input buffer 70, the input memory 72, the data buffer 74, the address register 75, the buffer bus 76, the mask register 78, the program bus 80, the working register array 82, the adder 84, the multiplier 86, the sine unit 87, the accumulator bus 88, the program sequencer 90, the program store unit 92, the instruction decoder 94, the output memory 96, and the output buffer 98 of FIG. 3 all function similarly to the like named elements of object processor 24. The higher data throughput and parameter access required at the subframe processing level, however, imposes the requirement of several additional memory addressing modes. This is reflected in the inclusion of an address register array 100 and scratchpad memory 102. As shown, the additional address registers 100, like register 75, are responsive to the program bus 80, and words are loaded into the scratchpad memory 102 from input memory 72 or from memory 102 into output memory 96 according to the addresses in register 100. In a preferred embodiment, subframe outputs are loaded into the scratchpad memory 102 from buffer bus 76, and subframe processor inputs in memory 102 are made available on accumulator bus 88. As with the object processors, the subframe processing sequence stored in unit 92 will correspond to the output format from the object processors stored in the input buffer 70, and flag registers in program sequencer 90 are used to adjust the processing sequence in accordance with the number of object processor outputs received, etc.

Figure 4:
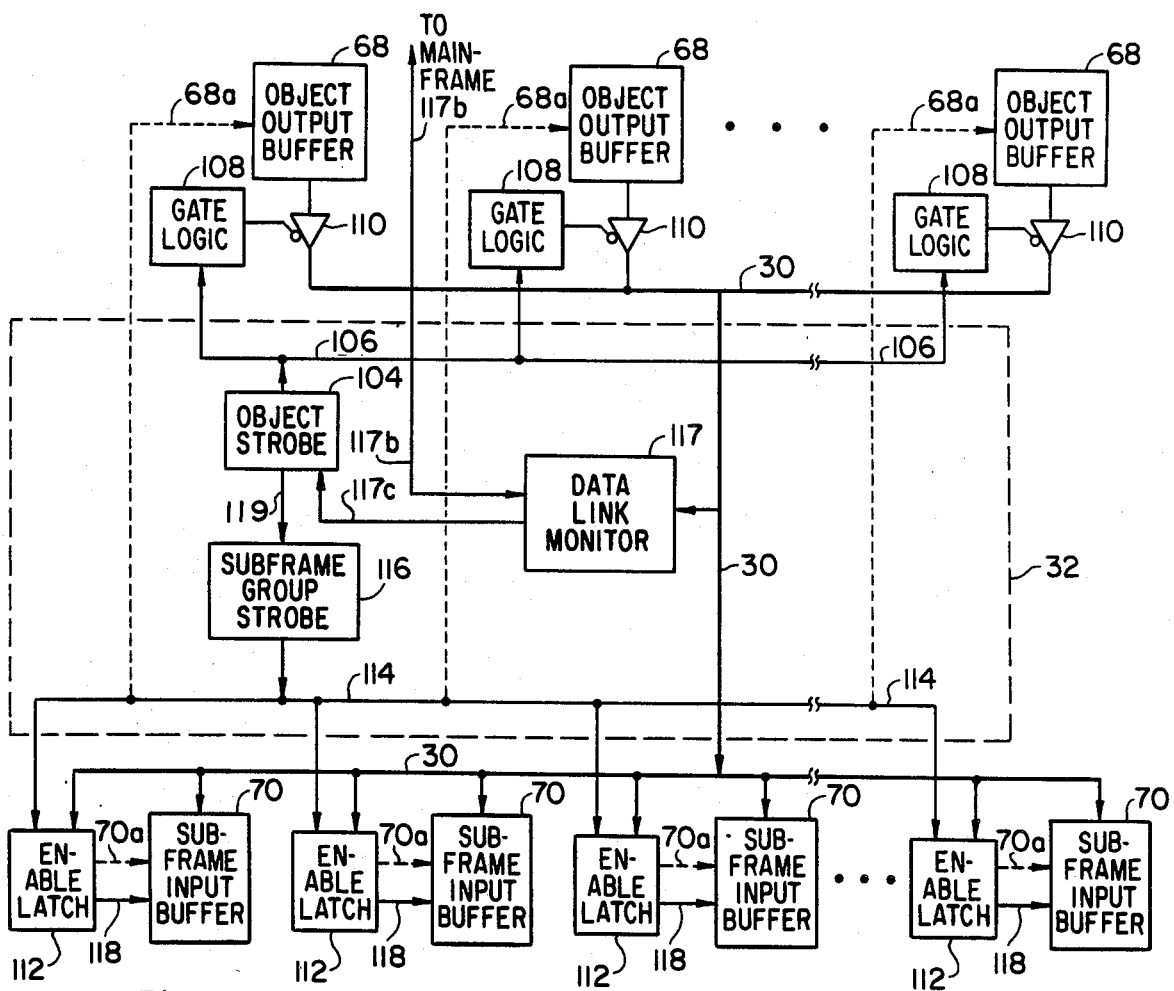
FIG. 4 is a detailed block diagram of the routing processor from FIG. 1.

FIG. 4 shows a preferred arrangement for the routing processor 32. As shown, the routing processor includes an object processor strobe 104 which addresses the object processors over an object identification bus 106. Included in each object processor 24 is a gate logic circuit 108 responsive to bus 106 and a gate 110 connecting the corresponding object output buffer 68 to data link 30. Similarly, each subframe processor 28 includes an input enable latch 112 responsive to a subframe line identification bus 114 from the routing processor. A subframe group strober 116 addresses predetermined groups of subframe processors over bus 114. A data link monitor 117 responsive to link 30 checks the object outputs for errors or overloads, and communicates any such conditions to mainframe 18 over bus 117b. Bus 117b may also be used to inform monitor 117 of newly assigned or reclaimed object processors, identification of currently active processors in turn being passed, as by signal 117c, to the object processor strobe.

During each frame period, then, object strobe 104 sequentially addresses each active object processor. Each gate logic circuit 108 is arranged to open its associated gate 110 in response to a unique address for the corresponding object processor being transmitted over bus 106. Thus, at any given time, only one object output buffer 68 will be connected to data link 30, allowing the corresponding object output to be transmitted to the subframe processors.

In accordance with the present invention, the first data words in each object output buffer transmitted over data link 30 comprise a subframe bit map. Each object processor generates a new subframe bit map as part of its calculations for each frame period to indicate which subframe processors are to receive its output for that frame. As indicated, an object may lie in several contiguous subframes; therefore, a multiplexed bit map format is used, with each bit in the map corresponding to a designated subframe processor. Since the number of subframes will presumably be greater than the bit length of each data word, several object output buffer words are used to store the bit map, each such bit map word corresponding to a predetermined group of subframe processors.

As each bit map word is transmitted over data link 30, subframe group strober outputs 116 a group identification code over bus 114 to identify the subframe processors corresponding to that group. A unique bit in the subframe bit map may thus be defined for each subframe processor as the logical conjunction of a predefined group code on bus 114 and a predefined data bit from link 30. Recognition of subframe processors designated to receive the output from the currently addressed object processor, then, occurs during transmission of the bit map, the designated subframes in a given bit-map word group being recognized simultaneously by appropriate logic in the associated enable latches 112 as the corresponding bit map word is transmitted over data link 30. In turn, the enable latch 112 for each subframe so recognized is arranged to set an input enable signal 118 to its associated subframe input buffer 70, so that the current object output following the bit map will be simultaneously received by all the bit-map designated subframe processors.

With regard to the sequencing of data from buffers 68 to buffers 70, it will be noted that each group code from subframe group strobe 116 identifies the position of an associated bit map word in the object output buffer. In practice, then, buffer addressing and subframe group identification may be derived from a single counter which is reset by the object strobe 104. The signal on bus 114, incremented for each data word and reset by signal 119 for each object output, may be used directly for parallel addressing of buffers 68 as indicated by address inputs 68a. Since more than one object output may be routed to any given subframe processor, address inputs 70a to buffers 70 are derived from the bus 114 signal by appropriate logic in each enable latch 112.

It is anticipated that the object outputs will not be uniform in length. To lessen the required bandwidth and to avoid possible overloads on data link 30, then, monitor 117 preferably suppresses the transmission of unused words in each buffer 68. In practice, each object processor may pack its output in the upper portion of its output buffer. A flag stored after the last valid output word in each object buffer 68 could then be sensed by appropriate logic in monitor 117, and object strobe 104 accordingly instructed to address the next active object processor. Alternatively, monitor 117 may instruct subframe group strobe/buffer address register 116 to skip addresses not containing currently valid output words.

Figure 5:
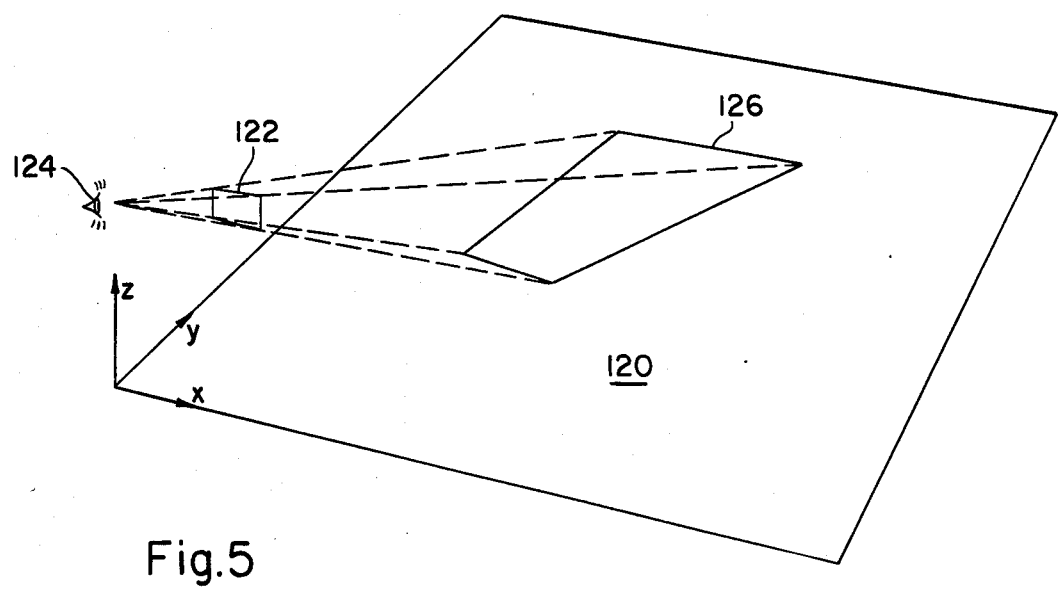
FIG. 5 is a schematic showing the relationship between a simulated image plane and model space ground plane.

FIG. 5 schematically illustrates the relation between an object model space ground plane 120 and the image plane 122 modeled by video display 14. In a preferred scheme for modeling objects, the location of each object is represented by three Cartesian coordinates defining a location point in a reference coordinate system. Particular width and depth axes, x and y, define the ground plane 120 and an elevation axis z is perpendicular to ground plane 120. The viewpoint parameters, then, include x, y, and z coordinates of observer 124 in the simulated flight platform.

In addition to indicating observer location with respect to the object model space, the viewpoint parameters, as pointed out earlier, must define the orientation of observer 124 as well. Although an observer line-of-sight (normal to image plane 122) may be represented in vector form by three Cartesian coordinates, the viewpoint orientation parameters must further define any rotation of the image plane about its normal. Such rotation may be represented by a fourth viewpoint orientation parameter specifying an angular measurement.

Alternatively, the viewpoint orientation may be completely defined by three angular measurements. Such a scheme is easily envisioned by considering the yaw, pitch and roll of the simulated flight platform. Thus, the first viewpoint orientation parameter indicates yaw or ground direction, and would be defined as an angular measurement in the ground plane with respect to the x or the z axis. The second parameter corresponds to pitch and indicates an angle with respect to the z axis or the ground plane. Finally, the third orientation parameter specifies roll, and is identical to the fourth parameter in the four-parameter scheme discussed above. An advantage to the three parameter scheme is that yaw, pitch, and roll may be easily derived from the simulated aircraft controls on console 12.

Figure 6:
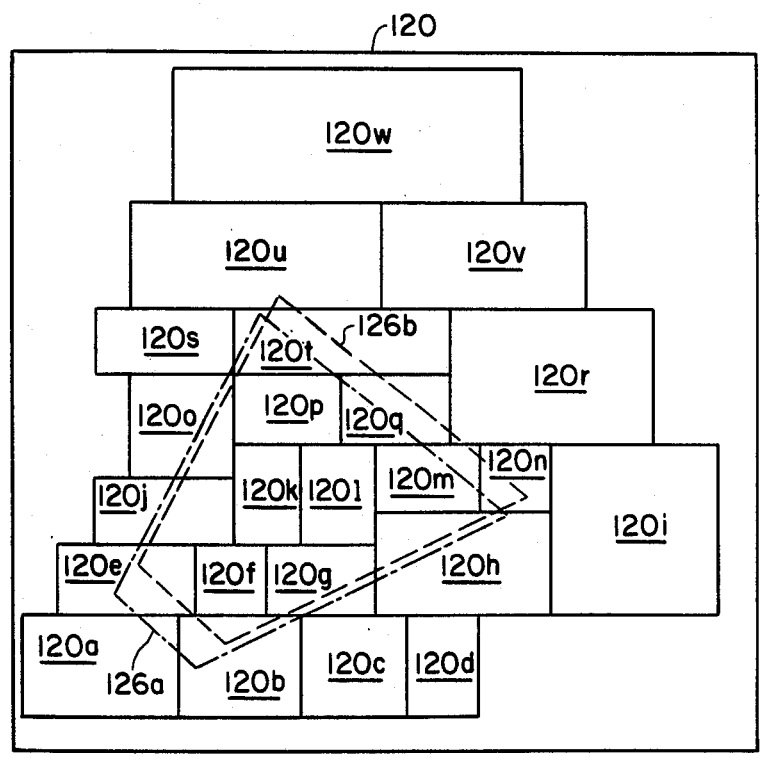
FIG. 6 shows a typical division of the ground plane of FIG. 5 into contiguous areas for arranging object parameters into blocks in a storage memory.

The viewpoint parameters are used by mainframe computer 18 to define a view window 126 in the ground plane 120. FIG. 6 shows two successive view windows 126a and 126b superimposed over a plurality of contiguous rectangular areas 120a-120w in ground plane 120. In a preferred scheme for transferring data from bulk storage means 20 to object processors 24, all the object lists are grouped into blocks of data, each block including all the object lists from one of the contiguous areas in the ground plane. Preferably, the areas are defined such that each includes approximately the same number of modeled objects, whereby the data blocks are substantially equivalent in size. This, the definition of areas 120a-120w depends on the relative density of modeled objects throughout image plane 120. As shown, areas 120f and 120n, for example, cover densely modeled areas, while objects in areas 120i and 120w are more spread out.

The grouping of the object lists into blocks representing contiguous areas in the ground plane facilitates the transfer of object lists by mainframe computer 18, since accessing data from a magnetic disc device is most efficiently accomplished by transferring large blocks of data at one time. The size of each block and corresponding ground plane 120 area, then should be such as to maximize the data transfer efficiency from storage device 20.

To further facilitate the transfer of data to object processors 24, a preferred embodiment of the present inventive CIG system further includes a high speed memory 128 for accessing individual object lists, shown in FIG. 1 in dashed lines. As each image plane area enters the view window, then, all of the object lists in the corresponding block are first transferred to memory 128, where they are temporarily stored pending assignment to an object processor. Conversely, as each area leaves the view window, its associated object lists may be deleted from memory 128 to accommodate newly entering areas. In FIG. 6 then, as the view window advances from 126a to 126b, blocks for areas 120r and 120u would be transferred from bulk memory to fast memory 128, and block 120a would be deleted from memory 128.

Figure 7:
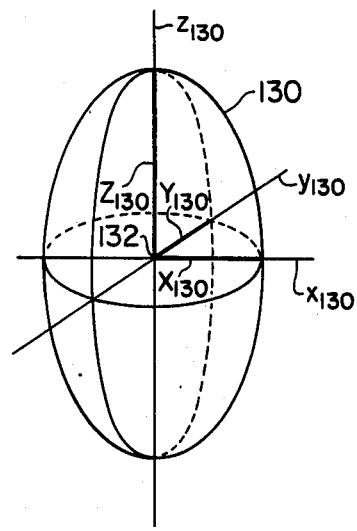
FIGS. 7-12 illustrate the use of quadric surfaces for modeling scene objects.

As pointed out earlier, each object list includes a number of parameters defining its size, shape, etc. In order to provide as compact as possible an object model data base, and at the same time eliminate the linear artifacts which characterize current edge-type CIG systems, the present system utilizes a single quadric surface to model each object. In particular, it has been found that objects can be acceptably represented by one of only two types of quadric surface—an ellipsoid or a hyperboloid. FIG. 7 shows the general configuration of an ellipsoid, while a two sheeted hyperboloid is illustrated in FIG. 8.

Referring to FIG. 7, then, an object 130 is modeled as an ellipsoid geometrically centered about is location point 132. Orthogonal object axes $x_{130}$, $y_{130}$, and $z_{130}$, intersecting at point 132, are used to define the shape and size parameters for object 130. Thus, the object 130 shape and size parameters comprise three radical lengths $X_{130}$, $Y_{130}$, and $Z_{130}$, (shown as heavy lines) taken along axes $x_{130}$, $y_{130}$ and $z_{130}$ from location point 132 to the surface of the ellipsoid.

Figure 8:
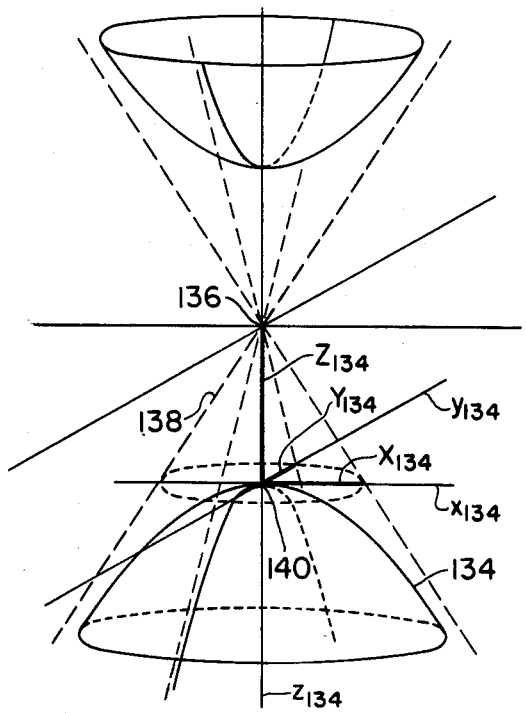

FIG. 8 shows an object 134 modeled by the lower part of a two sheeted hyperboloid geometrically centered about point 136. The bounding cone 138 for the hyperboloid is shown in long dashed lines. For convenience, the axes $x_{134}$, $y_{134}$, and $z_{134}$, are defined as intersecting at the vertex 140 of the lower part of the hyperboloid. The shape and size parameters for object 134, then, comprise three linear measurements $X_{134}$, $Y_{134}$, and $Z_{134}$, (again, shown in heavy lines) taken along axes $x_{134}$, $y_{134}$, and $z_{134}$, from vertex 140 to the surface of bounding cone 138.

The object orientation parameters for each object comprise three angular measurements specifying, in a manner similar to that used to define the viewpoint orientation parameters, the angular relationship of the object axes with respect to the x, y and z axes of the reference coordinate system.

Further flexibility in object modeling is provided by the use of bounding planes in conjunction with each quadric surface. FIGS. 9-12 illustrate the use of bounding planes for modeling various objects.

Figure 9:
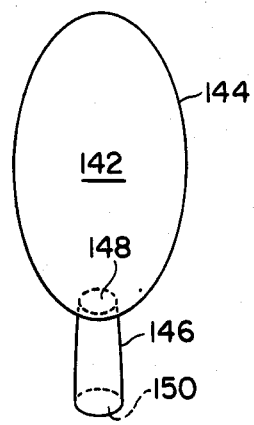

FIG. 9 shows a tree 142 in which the foliage is modeled by an ellipsoid 144 and the trunk is represented by a sharp hyperboloid 146 bounded by two planar surfaces 148 and 150. Alternatively, the trunk could be modeled as a cylinder bounded by two planes, since a cylinder may be defined as a degenerate ellipsoid by specifying an infinite radius along one object axis. Of course, tree 142 requires two object lists, since it is defined by two quadric surfaces.

Figure 10:
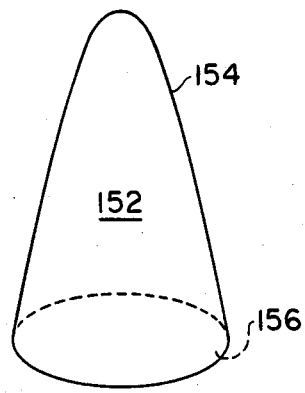

Another species of tree is illustrated in FIG. 10. As shown, tree 152 is modeled as a single quadric surface, hyperboloid 154, since its trunk is substantially invisible. One bounding plane 156 defines the lower limit of the tree 152 foliage, and a second bounding plane, not shown, is used to eliminate the upper part of hyperboloid 154.

Figure 11:
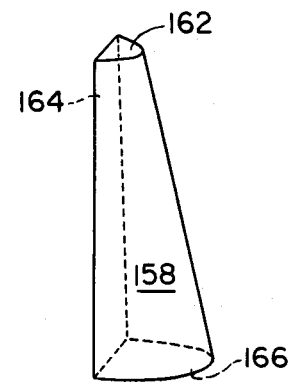

FIG. 11 shows an aileron 158 modeled as a thin elliptical cone 160 bounded by three planes 162, 164 and 166. A cone is defined as a degenerate hyperboloid by specifying a zero distance from the vertex of the hyperboloid to the location point. Of course, this necessitates that the remaining two linear measurements be taken from another point on the hyperboloid's z axis, preferably at some standard predefined distance, such a unit, from the vertex.

Figure 12:
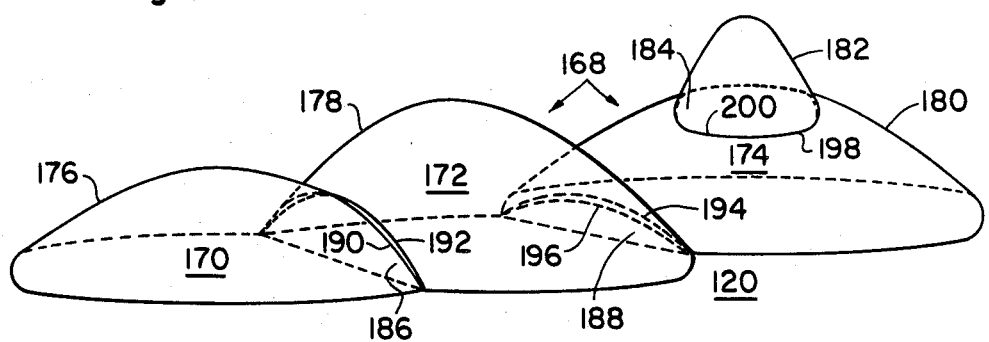

FIG. 12 illustrates the use of hyperboloids for modeling a mountain range 168, which includes three peaks 170, 172 and 174. As shown, peaks 170 and 172 are modeled by single hyperboloids 176 and 178, while peak 174 is made up of two stacked hyperboloids 180 and 182. Hyperboloids 176, 178 and 180 are bounded by ground plane 120 below. Surface 182 is bounded below, and surface 180 above, by a common bounding plane 184. As described with respect to tree 152 of FIG. 10, hyperboloid surfaces 176, 178, and 180 must be bounded above, by planes, not shown, to eliminate the upper hyperboloid sheet. Also, surfaces 176 and 178 are bounded by a common plane 186, and surfaces 178 and 180 by plane 188.

It will be noted that some surface discontinuity is introduced by using a common bounding plane for abutting quadric surfaces. This is seen in FIG. 12 at bounding planes 184, 186 and 188. Thus, surface 176 intersects plane 186 along curve 190, while a different intersection curve 192 is presented by plane 186 and surface 178. Similarly, plane 188 intersects surfaces 178 and 180, respectively, at curves 194 and 196; and plane 184 intersects surface 180 and 182, respectively, at curves 198 and 200.

At first glance it might appear simpler to allow the quadric surfaces themselves to intersect along a single curve, and to eliminate the bounding plane. Of course scene modeling would be simplified by such a procedure, since the need to find common bounding planes with the closest possible intersection curves, to maximize surface continuity between adjoining quadric surfaces, would be obviated. Bearing in mind, however, that the image plane curve coordinates for each quadric surface are computed by a single object processor 24 having no data on any other quadric surfaces, the necessity of bounding planes becomes obvious.

A further impediment to representing the intersection curve of two quadric surfaces is the complexity of the mathematics involved. Those skilled in the art will appreciate that the intersection between any quadric surface and a plane is a simple second order curve. By contrast, the intersection between two quadric surfaces is, in general, a far more complex curve, and calculations involving projections of such complex curves into an image plane are beyond the capability of presently available hardware for purposes of real time calculations. A discussion of the mathematics of quadric surfaces may be found in *Analytic Quadrics*, by Barry Spain, Pergamon Press, 1960. Particular reference is made to Chapter V of the Spain treatise, on Central Quadrics, for background on ellipsoids and hyperboloids.

Preferably, the object list format is capable of accommodating any number, up to some convenient limit, of bounding planes. Three additional shape parameters are required, as shown in TABLE A, to describe the location of each bounding plane. Preferably, the location of each bounding plane is described by three vector coordinates defining a line segment normal to the bounding plane and extending from the object's location point to a point on the bounding plane. The vector coordinates may be in terms of the reference coordinate system, but are more easily modeled in terms of the object axes. For example, a bounding plane through the geometric center of hyperboloid 134 (FIG. 8), in terms of the object axes $x_{134}$, $y_{134}$, $z_{134}$, would be described as vector (0, 0, $z_{134}$). Besides simplifying modeling, use of the object axes to describe bounding planes facilitates the implementation of moving models, since only an object's location and orientation parameters would change as it moves through the scene model space.

Prior to deriving two-axis image plane curve coordinates, each object processor preferably relates its assigned object parameters to the current frame viewpoint parameters by defining the quadric surface and bounding planes in terms of a three-axis eye coordinate system having axes X, Y and Z. The origin of the eye coordinate system is defined as the focal point of observer 124 (FIG. 5), and the Y axis passes through the center of the image plane rectangle 122. The remaining eye coordinate axes X and Z parallel horizontal and vertical axes h and v which define the image plane. The distance from the eye coordinate origin to the image plane is defined to be f, (i.e., the image plane intersects the Y-axis at (0,f,0)).

By appropriate rotation and translation of the object parameters, then, each quadric surface is reduced to ten quadric coordinates $q_1, q_2, \ldots, q_9, q_0$ which define the surface function $Q(X,Y,Z)$. The quadric surface, then, is the locus of points for which:

$$Q(X,Y,Z) = q_1 X^2 + q_2 Y^2 + q_3 Z^2 + q_4 XY + q_5 YZ + q_6 XZ + q_7 X + q_8 Y + q_9 Z + q_0 = 0$$

Similarly, each bounding plane is represented by four bounding plane coefficients $B_1, B_2, B_3$ and $B_4$ defining a bounding function $P(X,Y,Z)$:

$$P(X,Y,Z) = B_1 X + B_2 Y + B_3 Z + B_4 \circledR 0$$

where $\circledR$ is either $\leq$ or $\geq$ such that the inequality is satisfied for points on the side of the bounding plane for which the object is defined.

Figure 13:
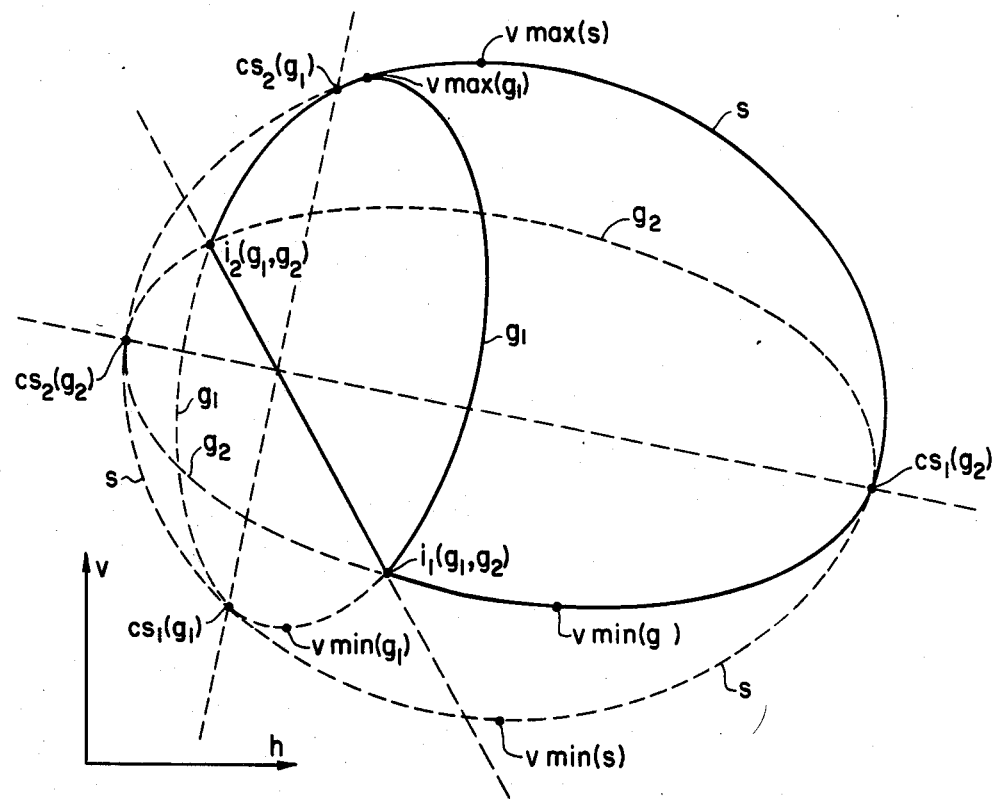
FIG. 13 illustrates the determination of intraobject visibility.

FIG. 13 shows a portion of image plane 122 with projection curves for an object modeled as an ellipsoid bounded by two planes. The image plane or projection curves are defined by the object processor in terms of h and v, the horizontal and vertical image plane axes. Visible portions of the image plane curves are shown in solid lines, while other portions are shown in broken lines.

The projection of the quadric surface silhouette, herein called the limb curve, is indicated in FIG. 13 as s. Since s is a perspective projection of a quadric surface, it may be represented by a planar function $s(h,v)$:

$$s(h,v) = a_1 h^2 + a_2 v^2 + a_3 hv + a_4 h + a_5 v + a_6 = 0$$

The image plane curve coefficients $a_1, a_2, \ldots, a_6$ for each limb curve may be derived from the associated quadric coefficients $q_1, q_2, \ldots, q_0$ and the focal point-to-image plane distance f by the following relations:

$$a_1 = q_7^2 - 4q_0 q_1$$

$$a_2 = q_9^2 - 4q_0 q_3$$

$$a_3 = 2q_7 q_9 - 4q_0 q_6$$

$$a_4 = (2q_7 q_8 - 4q_0 q_4)f$$

$$a_5 = (2q_8 q_9 - 4q_0 q_5)f$$

$$a_6 = (q_8^2 - 4q_0 q_2)f^2$$

Intersection curves $g_1$ and $g_2$ are projections of the intersections of each bounding plane with the quadric surface. Like the limb curve, each intersection curve may be represented by a quadratic function $g$ in $h$ and $v$ of the general form:

$$g(h,v) = e_1 h^2 + e_2 v^2 + e_3 hv + e_4 h + e_5 v + e_6 = 0$$

Both the quadric surface coefficients and the bounding plane coefficients associated with a particular intersection curve must be used to derive that curve's coefficients. It may be shown that the intersection curve coefficients $e_1, e_2, \ldots, e_6$ are given by:

$$e_1 = B_4^2 q_1 - B_1 B_4 q_7 + q_0 B_1^2$$

$$e_2 = B_4^2 q_3 - B_3 B_4 q_9 + q_0 B_3^2$$

$$e_3 = B_4^2 q_6 - B_1 B_4 q_9 - B_3 B_4 q_7 + 2 B_1 B_3 q_0$$

$$e_4 = (B_4^2 q_4 - B_2 B_4 q_7 - B_1 B_4 q_8 + 2 B_1 B_2 q_0) f$$

$$e_5 = (B_4^2 q_5 - B_2 B_4 q_9 - B_3 B_4 q_8 + 2 B_2 B_3 q_0) f$$

$$e_6 = (B_4^2 q_2 - B_2 B_4 q_8 + B_2^2 q_0) f^2$$

Intersection line $L_{1-2}$ is a projection of the intersection between the two bounding planes represented in FIG. 13. Since the projection of the intersection between two planes must also be a line, an equation in general form for the intersection line becomes:

$$L_{1-2}(h,v) = l_1 h + l_2 v + l_3 = 0$$

Using a second subscript to distinguish between the bounding planes, the coefficients for the plane associated with $g_1(h,v)$ become $B_{1-1}, B_{2-1}, B_{3-1}, B_{4-1}$; and the coefficients for the other plane become $B_{1-2}, B_{2-2}, B_{3-2}, B_{4-2}$. The image plane curve coefficients for intersection line $L_{1-2}$ are then given by:

$$l_1 = B_{1-1}/B_{4-1} - B_{1-2}/B_{4-2}$$

$$l_2 = B_{3-1}/B_{4-1} - B_{3-2}/B_{4-2}$$

$$l_3 = (B_{2-1}/B_{4-1} - B_{2-2}/B_{4-2}) f$$

In addition to providing image plane curve coefficients representative of the limb curve, the intersection curves and the intersection lines, the object processor preferably resolves the intraobject visibility. That is, the object processor additionally provides information indicating which portions of the image plane curves are visible. Several preliminary calculations are necessary in order to provide such intraobject visibility information.

Visibility test lines $T_1$ and $T_2$ are defined as the projections on the image plane of the lines of intersection between the quadric silhouette plane and each bounding plane. As with the intersection lines, each visibility line may be represented by a linear equation in $h$ and $v$:

$$T(h,v) = t_1 h + t_2 v + t_3 = 0$$

where $$t_1 = B_1/B_4 - q_7/2q_0$$

$$t_2 = B_3/B_4 - q_9/2q_0$$

$$t_3 = (B_3/B_4 - q_8/2q_0) f$$

Minimum and maximum points, with respect to the image plane vertical axis $v$, are determined for the limb curve and each intersection curve. These points are identified in FIG. 13 for curves $s(h,v)$, $g_1$ and $g_2$, respectively, as vmin(s), vmax(s), vmin($g_1$) vmax($g_1$), vmin($g_2$), and vmax($g_2$). Calculation of each vmin$_v$ and vmax$_v$ (the v coordinate values for vmin and vmax) is performed in accordance with the following equations:

$$\text{vmin}_v = -V_2/2V_1 - \sqrt{(V_2/2V_1)^2 - V_3/V_1}$$

$$\text{vmax}_v = -V_2/2V_1 + \sqrt{(V_2/2V_1)^2 - V_3/V_1}$$

where $V_1$, $V_2$ and $V_3$ are determined in accordance with the image plane curve coefficients for the limb curve or intersection curve. Letting $n_1, n_2 \ldots, n_6$ represent $e_1, e_2, \ldots, e_6$, or $a_1, a_2, \ldots a_6$, then, as appropriate, $V_1$, $V_2$ and $V_3$ are given by:

$$V_1 = n_3^2 - 4 n_1 n_2$$

$$V_2 = 2 n_3 n_4 - 4 n_1 n_5$$

$$V_3 = n_4^2 - 4 n_1 n_6$$

Also of interest in determining intraobject visibility are the points of contact or tangency between the limb curve and each intersection curve, $cs_1(g_1)$, $cs_2(g_1)$, $cs_1(g_2)$, and $cs_2(g_2)$. Calculation of the V coordinate each contact point $cs_1$ and $cs_2$, respectively, may be performed using the identical equations stated above for vmin and vmax by substituting the following values for $V_1$, $V_2$ and $V_3$:

$$V_1 = (a_1 t_2 - a_3 t_1) t_2 + a_2 t_1^2$$

$$V_2 = (a_1 t_2 - a_3 t_1) t_3 + (a_1 t_3 - a_4 t_1) t_2 + a_5 t_1^2$$

$$V_3 = (a_1 t_3 - a_4 t_1) t_3 + a_6 t_1^2$$

where $a_1, a_2, \ldots, a_6$ are the limb curve coefficients and $t_1, t_2, t_3$ are the visibility test line coefficients for the associated intersection curve. In general, two contact points $cs_1$ and $cs_2$ exist for each intersection curve and can be determined, as indicated above, from the intersection of the visibility test line and the limb curve. Some intersection curves, it will be noted, may only contact the limb curved at one point (i.e., when $(V_2/2V_1)^2 - V_3/V_1 = 0$); still other intersection curves will not intersect the limb curve at all (i.e., $(V_2/2V_1)^2 - V_3/V_1 < 0$).

Still other key visibility points, in addition to the minimum and maximum limb and intersection curve points and the contact points, are defined by the points of intersection among the intersection lines and the intersection curves. The intersection points between an intersection line and one intersection curve will be identical to the intersection points between that line and the intersection curve associated with the other bounding plane defining the intersection line, as indicated by intersection points $i_1(g_1,g_2)$ and $i_2(g_1,g_2)$. In general, the v coordinate values for $i_1$ and $i_2$ may be calculated from the same formulas used to calculate the v coordinate values for $cs_1$ and $cs_2$ by substituting the coefficients for either associated intersection curve for the limb curve coefficients (i.e., substitute $e_1, e_2, \ldots, e_6$ for $a_1, a_2, \ldots, a_6$) and the intersection line coefficients for the visibility test line coefficients (i.e., substitute $l_1, l_2, l_3$ for $t_1, t_2, t_3$).

Although no intersection point between two intersection lines is shown in FIG. 13 (since there is only one intersection line), calculation of the v coordinate for such a point may be accomplished by the simultaneous solution for v from the intersection line equation. If a first intersection line set of coefficients is identified by an added "1" subscript, and a second set by an added "2" subscript, it may be shown that the solution for v value of the intersection point $i_v(L_1,L_2)$ is given by:

$$i_v(L_1,L_2) = \frac{l_{1-2}l_{3-1} - l_{1-1}l_{3-2}}{l_{1-1}l_{2-2} - l_{2-1}l_{1-2}}$$

In accordance with the present invention, intraobject visibility information is keyed to scan line bands which are defined by the v coordinate values for the key visibility points determined from the equations above. Specifically, the intraobject visibility information provided by each object processor may be arranged on a visibility list having rows corresponding to each scan line band and one column for each limb curve, intersection curve or intersection line. A visibility list for the projected object of FIG. 13 may be arranged as shown in TABLE B.

It will be noted that only the v coordinate values for visibility points which are actually visible are used to define the scanline bands in the list. Thus, as each key point is calculated, its visibility is tested by reference to the bounding plane definitions and the associated visibility test line and intersection line definitions. The necessary tests for each point depend on the kind of point being tested, i.e.:
1. limb curve minimum or maximum
2. intersection curve minimum or maximum
3. contact point (limb and intersection curves)
4. intersection point (intersection lines and curves)

TABLE B

| scan line band (upper v coor. value) | Intraobject Visibility List | | | |
|---|---|---|---|---|
| | s(h,v) | $g_1$(h,v) | $g_2$(h,v) | $L_{1-2}$(h,v) |
| $vmax_v(s)$ | LR | 0 | 0 | 0 |
| $vmax_v(g_1)$ | LR | LR | 0 | 0 |
| $cs_{2v}(g_1)$ | R | LR | 0 | 0 |
| $i_{2v}(g_1,g_2)$ | R | R | 0 | 1 |
| $cs_{1v}(g_2)$ | 0 | R | R | 1 |
| $i_{1v}(g_1,g_2)$ | 0 | 0 | LR | 0 |
| $vmin_v(g_2)$ | — | — | — | — |

Each limb curve minimum or maximum is first tested against each of the visibility test lines, one at a time, by the following relation:

$$T(h_n,v_n) \textcircled{R} 0$$

where $h_n$ and $v_n$ are the h and v coordinate values for the point being tested, and $\textcircled{R'}$ is an inequality relation defined from the associated boundary plane relation. Specifically, $\textcircled{R'}$ will be identical to $\textcircled{R}$ from the associated bounding plane relation if the constant term $B_4$ in the relation is greater than 0. Otherwise, $\textcircled{R'}$ will be the opposite of $\textcircled{R}$ (i.e., if $B_4 > 0$ and $\textcircled{R}$ is "$\leq$", $\textcircled{R'}$ will be "$\geq$", and if $B_4 \leq 0$ and $\textcircled{R}$ is "$\geq$", $\textcircled{R'}$ will be "$\leq$"). The h coordinate value for a given point is found by solving the defining equation for the associated curve for the known v coordinate value.

Each intersection curve minimum or maximum is tested against the associated visibility test line only if the associated bounding plane faces away from the observer (i.e., if the observer 124 focal point is on the object side of the plane). To test which side of the plane the focal point is on the eye coordinates for the focal point (0, 0, 0) are substituted into the defining relation for the bounding plane, resulting in:

$$B_4 \textcircled{R} 0$$

Thus, if this relation is satisfied the intersection curve minimum and maximum must be tested further. As indicated, only the associated visibility test line is tested against. Also the opposite inequality relation to that used to test the limb curve must be used. That is, the intersection curve points will be visible if they fail the visibility line test stated for the limb curve. Again, however, if the focal point is on the opposite side of the object from the intersection curve's associated bounding plane as determined by the preliminary test above, (i.e., the plane faces the observer), both the minimum and maximum points for the associated intersection curve are accepted as having passed the visibility test line test.

For final determination of visibility, each limb and intersection curve minimum and maximum which satisfies all appropriate visibility test lines must be further tested against all intersection lines. Each such minimum or maximum will be visible if its coordinates $h_n$ and $v_n$ satisfy the following relation for each intersection line:

$$L(h_n,v_n) \textcircled{R'} 0$$

where $\textcircled{R'}$ is the same relation used with the visibility test lines.

The visibility of each intersection point will depend on whether any of the intersecting planes face the observer. It will be noted that each intersection point between an intersection line and an intersection curve involves two planes and thus may be visible if either satisfies the preliminary test for intersection curve minima and maxima. Each intersection point between two intersection lines is potentially visible if any of three associated bounding planes faces the observer. P Final determination of visibility for each intersection point for which at least one associated bounding plane faces the observer, then, is performed by testing against the unrelated intersection lines. That is, the same test described for limb and intersection curve minima and maxima is used, but each potentially visible intersection point need only be tested against intersection lines which do not pass through that point.

Visibility of each contact point is also tested on the basis of the intersection line test. Contact points which are visible will satisfy the test for all intersection lines.

Referring again to FIG. 13, application of the key point visibility tests just described is illustrated. The limb curve minimum vmin(s) is found to be invisible when tested against visibility test line $T_2$, while the maximum vmax(s) is visible since it satisfies $T_1, T_2$ and intersection line $i_{1-2}$. Similarly, intersection curve $g_2$ minimum vmin($g_2$) is visible because it satisfies both $T_2$ and $i_{1-2}$, but the maximum vmax($g_2$) fails to satisfy $T_2$ and is therefore not visible. The minimum and maximum for $g_1$ are not tested against the associated visibility test line $T_1$ because the bounding plane defining $g_1$ faces the observer. However, only the maximum $vmax(g_1)$ is visible because the minimum $vmin(g_1)$ fails to satisfy the test for intersection line $i_{1-2}$. Contact points $cs_2(g_1)$ and $cs_1(g_2)$ are visible because they satisfy the intersection line, while $cs_2(g_2)$ and $cs_1(g_1)$ do not satisfy $i_{1-2}$ and are therefore invisible. Since one of the planes defining $i_{1-2}$ faces the observer, intersection points $i_1(g_1,g_2)$ and $i_2(g_1,g_2)$ are potentially visible, and the actual visibility of $i_1(g_1,g_2)$ and $i_2(g_1,g_2)$ is confirmed since there are no other intersection lines against which the points would be tested.

When all the key visibility points for an object have been calculated and tested for visibility, the v coordinate values are sorted into scan order as in the exemplary visibility list above. Thus, each scan line band is defined as a horizontal strip between two successive v coordinate values. As indicated, the entries in each column correspond to one of the limb or intersection curves or intersection lines, and indicate the visibility of that image plane curve in each scan line band.

Each entry in an intersection line column, it will be noted from the exemplary list, is either "0," indicating that the intersection line is not visible in the corresponding scan line band, or "1", indicating that the line is visible. Four different entry types are needed for the limb and intersection curve columns, since each scan line band will in general intersect a left and a right segment of a given second order curve. Thus, "0" indicates that neither segment is visible; "L" the left segment; "R" the right segment; and "LR" that both segments are visible in the corresponding scan line band.

Derivation of visibility list entries may be accomplished by testing the potentially visible curves in each scan line band with the same visibility tests used for the key visibility points. A limb curve is potentially visible in all the scan line bands defined for a particular object, while an intersection curve's potential visibility is further limited by its minimum and maximum. An intersection line is potentially visible only between its intersection points and only if at least one of its defining planes faces the observer. Prior to derivation of the final visibility list, then, the potential visibility information (i.e., the "end-points") for each image plane curve are preferably kept with the curve's coefficients.

The v coordinate value midway between the upper and lower limit of each scan line band (e.g., $[vmax_v(s)+vmax_v(g_1)]/2$ for the first band on the visibility list above) may be used to test the visibility of potentially visible segments in the band. The h values for each potentially visible curve in the band are solved using the mid-v value, resulting in one point for each potentially visible intersection line and two points (left and right) for each potentially visible limb or intersection curve. Limb and intersection curve points are then tested in the same manner as the corresponding minima and maxima, while intersection line points are tested against any other intersection lines, similarly to intersection points.

Although the foregoing intraobject visibility determination example applies specifically to an ellipsoid-defined object, the mathematical relations are equally applicable to hyperboloid projections. Those knowledgeable in mathematics will realize that the limb curve for a hyperboloid, as defined above, will not necessarily have a minimum and maximum, and that the same will be true for intersection curves associated with such hyperboloid. In such cases, the upper and lower scan line bands will be defined by other key visibility points.

In preparing its subframe bit map, each object processor must save, in addition to the vertical coordinate values from the visibility list, the left most and right most horizontal coordinate values. Although exact computations for the horizontal minimum and maximum are not described, it is generally sufficient to simply use the minimum and maximum h coordinate values for visible points found in each scan line band. Each subframe will have an associated set of minimum and maximum h and v coordinate values which may be compared to the minimum and maximum h and v values for the object to determine the appropriate bit entry for the subframe.

As indicated earlier, the high level information from object processors 24 is utilized by subframe processors to determine intensity levels for a plurality of pixels arranged in raster format to simulate the desired image plane. Video rasters typically will include as many as 1024 rows or lines; each line may include as many as 1024 pixels. The total number of pixels used depends on the required resolution for a particular system.

Figure 14:
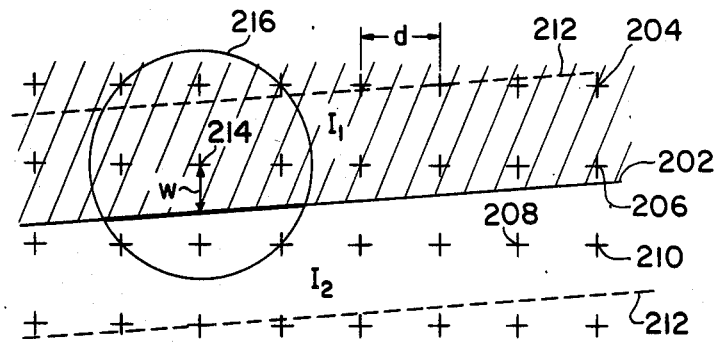
FIG. 14 shows a portion of the image plane in which two regions of different intensities are separated by a boundary curve.

FIG. 14 shows a portion of a video raster, with pixel centers indicated by cross marks, superimposed by a corresponding portion of a desired image plane including two regions of different intensities, $I_1$ and $I_2$, separated by a boundary curve 202. It is understood that curve 202, in practice, need not be linear, but may be defined by any of the second order image plane curve coefficients output by object processors 24. The regional intensity levels $I_1$, (cross hatched region), and $I_2$ are derived by subframe processors 28 by known mathematical techniques using additional surface and illumination information from the object processors. As shown, the pixels are all square and of uniform width d (center-to-center). Only those pixels referred to in the following discussion are identified by specific call-out numbers drawn to the pixel center cross mark.

Any image plane may generally be described as an intensity function in two spatial dimensions, characterized by continuously varying spatial frequencies. Those knowledgeable in information theory will appreciate that for any sampled image, no intensity variation therein representing a spatial frequency greater than one half the sample frequency will be properly represented. The result of such undersampling is called aliasing, and is particularly pronounced at sharp surface boundaries such as curve 202, where infinite spatial frequency components are present. The ideal solution to aliasing is to low pass filter the image plane prior to sampling, eliminating all spatial frequencies greater than one half the sampling frequency defined by the pixel width. The computational complexity of the ideal approach, however, takes it far beyond the possibility of real time implantation. A preferred antialiasing scheme implemented by subframe processors 28 will be presently explained with reference to FIG. 14.

Sampling of the image plane is first implemented by assigning to each pixel the intensity of the unfiltered image plane at the pixel center. Pixels 204 and 206, for example, would be assigned intensity level $I_1$, while pixels 208 and 210 would be assigned intensity level $I_2$. Then, all those pixels within a predetermined area about boundary curve 202 are identified as aliased pixels. The predetermined area about any image plane curve defining a boundary curve such as curve 202 is defined as that area including all pixel centers within a specified cutoff distance of the boundary curve, the cutoff distance preferably being equal to $\sqrt{2}d$. In FIG. 14, this predetermined area is shown as the area between dashed lines 212.

For each aliased pixel, a weighting distance w is calculated as the distance (in pixel widths) from the pixel center to the boundary curve. For this calculation, it is necessary to derive a linear approximation for the boundary curve within a radius of $\sqrt{2}d$ of each aliased pixel center. This is illustrated in FIG. 14 by pixel 214. Since pixel 214 lies within the area bounded by lines 212, it is an aliased pixel. The portion of curve 202 shown as a heavy line lies within a radius of $\sqrt{2}d$ of pixel 214, as shown by circle 216, although no linear approximation is necessary since curve 202 is linear. The weighting distance w for pixel 214 is shown.

Each weighting distance is used to derive two intensity weights, $W_1$ and $W_2$, which are used, in turn, to calculate an antialiased intensity level, I, for the pixel according to an expression:

$$I = W_1 I_1 + W_2 I_2$$

The derivation of intensity weights $W_1$ and $W_2$ from weighting distance w is explained with reference to FIGS. 14–17.

Figure 15:
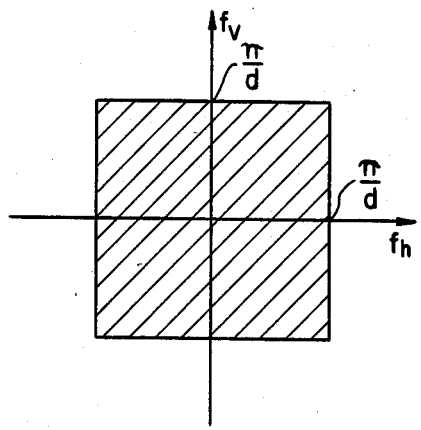
FIG. 15 shows the frequency response for an ideal low pass spatial filter in two dimensions.

As pointed out earlier, the theoretically correct solution to aliasing is to filter the image plane prior to sampling. FIG. 15 shows the spatial frequency domain transfer function for an ideal sampling filter. The abcissa, $f_h$, represents horizontal spatial frequencies in the image plane intensity function, while vertical frequencies are represented on the ordinate, $f_v$. Only those spatial frequencies in the shaded region would remain after ideal pre-sampling filtering. However, such ideal filtering would require computation of the impulse response of the filter of FIG. 15 convolved with the unsampled image plane intensity function, and, as indicated, would be computationally prohibitive.

Figure 16:
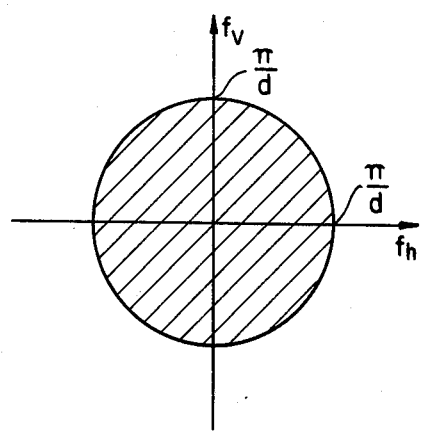
FIG. 16 shows the frequency response for a rotation invariant low pass filter.

To simplify the calculation of $W_1$ and $W_2$ for each aliased pixel, it is preferable, then, to base the calculation on a rotationally invariant pre-sample filter having a frequency domain transfer function shown in FIG. 16. It will be noted that the rotation invariant filter of FIG. 16 will attenuate some frequencies which would be passed by the ideal filter of FIG. 15, but rotational invariance implies that intensity weights may be calculated based only on the weighting distance w (FIG. 14) without regard to the slope of the boundary curve 202.

Figure 17:
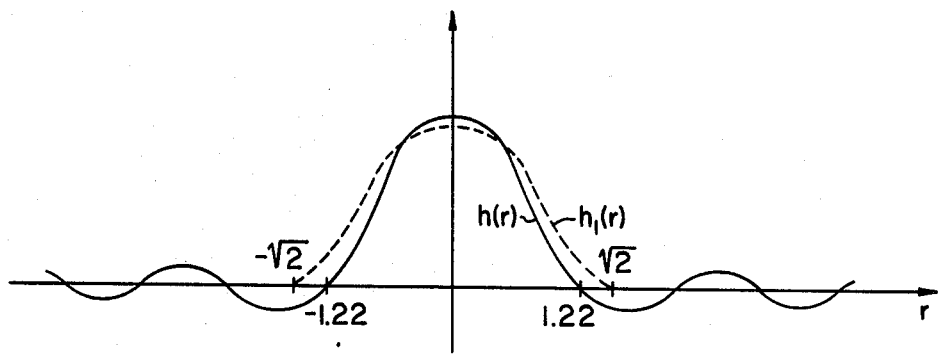
FIG. 17 shows the impulse response of the filter whose frequency response is shown in FIG. 16.
Figure 18:
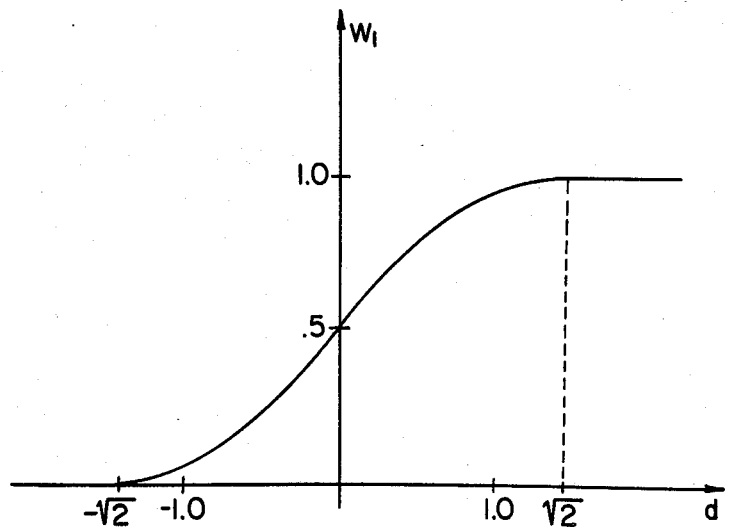
FIG. 18 shows an approximate intensity weighting function for the filter whose frequency response is shown in FIG. 16.

The rotational invariance of the FIG. 16 filter is further illustrated by examining its impulse response, $h(r)$: $h(r) = J_1(r)/r$ where $J_1$ is the first Bessel function. As shown in FIG. 17, $h(r)$ is seen to depend only on a polar coordinate r. Because $h(r)$ is infinite in extent and sometimes negative, it is desirable to approximate $h(r)$ by a function $h_1(r)$ which is positive for $|r| < \sqrt{2}$ and zero elsewhere. A radius of $\sqrt{2}$ is preferred because a circular (rotational invariant) impulse response with a smaller response cannot prevent antialiasing along a diagonal boundary curve.

Using the assumptions that within a small region boundary curves are approximately linear and that image plane intensities remain approximately constant within the regions separated by a boundary curve, the antialiased intensity level, I, is given by the convolution of $h_1(r)$ with the image plane intensity function:

$$I = I_2 \int_{-\infty}^{-w} h_1(r)\,dr + I_1 \int_{-w}^{\infty} h_1(r)\,dr$$

where $I_1$ is the image plane intensity of the pixel center, w is the distance from the pixel center to the boundary curve, and $I_2$ is the image plane intensity of the region opposite the boundary curve from the pixel center. This is seen to be the situation of pixel 214 in FIG. 14.

From the foregoing, it will be further appreciated that the intensity weights $W_1$ and $W_2$ are, indeed, a function of weighting distance w. Assuming $h_1(r)$ to be normalized, it becomes clear that $W_1$ will be zero for $w < -\sqrt{2}$ and one for $w > \sqrt{2}$. FIG. 17 shows the functional relationship between $W_1$ and d. Since antialiasing is only performed when $w < \sqrt{2}$, it has been found that, in this region, $W_1$ may be approximated by a third degree polynomial:

$$W_1 = \tfrac{1}{2} + (3\sqrt{2}/8)w - (\sqrt{2}/16)w^3$$

Although as described in reference to FIG. 13, weighting distance w assumes only positive values, it should be clear that a negative distance simply implies that the pixel center lies in the region whose intensity is identified as $I_2$. Thus, the second intensity weight for each pixel, $W_2$, may be found by negating the weighting distance used in the expression above for $W_1$, or, alternatively, by the expression:

$$W_2 = 1 - W_1$$

A further feature of a preferred embodiment of the present invention is the implementation of texturing by subframe processors 28. As shown in TABLE A, each quadric or planar surface includes accommodation in the associated object list for two data words specifying surface texture. It will be understood that the texture data in the object list itself need not be the actual parameters used in the texture function to be described. Rather, the object list texture data may be directory in nature, referencing parameters from a stored texture parameter list; or, alternatively, the object list data may be used by an algorithm to generate texture parameters.

For each visible surface with a specified texture, the subframe processors first identify all of the pixels in the image plane area circumscribed by that surface's image plane curves. For each such superimposed pixel are determined three Cartesian coordinates, x, y and z, of a point on the surface for which the point's image plane projection falls in the pixel center. Preferably, x, y and z are based not on the reference coordinate system, but instead on the object axes of the associated object, so that perspective validity is maintained for moving objects. Next, an intensity modulating factor, T, is calculated for each superimposed pixel using a general texture function with the associated texture parameters for the surface, the arguments for the texture function being the Cartesian coordinates x, y and z, as determined for each pixel.

The actual texture parameters will preferably include spatial frequencies and associated weighting factors statistically related to each object. Derivation of these parameters, then, may be based on Fourier analysis of actual photographs of generically similar objects. Further texture parameters, described herein as phase shift factors, may be derived by similar methods.

It has been found that a great variety of texture patterns giving a very natural appearance may be generated by using a single general formula for the computation of the intensity modulating factor T at each pixel:

$$T = \left[ \sum_{i=1}^{m} C_{xi}\sin(\omega_{xi}x + P_{xi}) \right] \times \left[ \sum_{j=1}^{n} C_{yj}\sin(\omega_{yj}y + P_{yj}) \right]$$

where spatial frequencies are indicated as $\omega$, the weighting factors as C, and the phase shift components as P. It is seen that a number m of the spatial frequencies, $\omega_{xi}$, are related, along with associated weighting factors $C_{xi}$ and phase shift components $P_{xi}$, in sum terms to the x coordinate and a number, n, of spatial frequencies $\omega_{yj}$, weighting factors $C_{yj}$, and phase shift components $P_{yj}$ are related to the y coordinate in similar sum terms. It has been found that three frequencies in either direction (x and y) are sufficient to simulate most natural surfaces, and in general the same frequencies can be used in both directions. Still further testing has established that the product of sums format of the equation above yields more natural looking patterns than does a sum of products.

The purpose of the phase shift components is to break up the regularity of the generated pattern. Obviously, if the same frequencies are related to both the x and y coordinates and no phase shifting is employed, a checkerboard like pattern will result. Using different frequencies of x and y will generate a tartan-like pattern. A natural randomness is simulated by shifting each of the sine waves before summing. The x coordinate phase shift components $P_{xi}$, are preferably made dependent on the y and z coordinates, while the y coordinate phase shift components, $P_{yj}$, are based on the x and z coordinates:

$$P_{xi} = J_{xi}\sin(\phi_{xi}y) + K_{xi}\sin(\psi_{xi}z)$$

$$P_{yj} = J_{yj}\sin(\phi_{yj}x) + K_{yj}\sin(\psi_{yj}z)$$

wherein the individual phase shift factors, J, $\phi$, K, and $\psi$ may be stored in each object list, looked up, or derived from the associated spatial frequencies and weighting factors.

The described texturing function, it will be noted, may be adapted to simulate translucence by using the same general formula in conjunction with an assigned translucence limit for each object to be displayed as translucent. Those pixels for which the translucence limit is exceeded by the texture modulating factor would display the object behind the translucent object (i.e., the second rank object).

The modeling of natural foliage, in particular, may be enhanced using a modification of the simulated translucence technique. Specifically, a translucence limit which varies in proportion to the distance from the foliage object boundary is compared to the texture modulating factor for each pixel. As a result, the edge of the foliage appears shaggy and more natural than would be possible using a simple boundary curve.

To implement a variable translucence limit, then, the distance of each pixel on the foliage surface to the surface boundary may be calculated, scaled, and compared to the texture modulating factor. As pointed out in the antialiasing section above, however, exact distance calculation involves the computation of a square root. Preferably, then, an alternate variable translucence limit is used which does not require a costly square root computation for each interior pixel on the foliage surface.

Typically, a foliage object will be modeled as an ellipsoid bounded only on the bottom (e.g., tree 142, FIG. 9) or a hyperboloid lower sheet bounded at the bottom (e.g., tree 152, FIG. 10). The foliage surface, then, will be bounded by a limb curve, s(h, v)=0, as described above. The image region or bounded interior surface may be defined as all points satisfying the expression $$s(h, v) < 0$$

The plane quadratic function s(h, v) will therefore have some minimum point inside the boundary which is the geometric center of the limb curve. This minimum, denoted $s_m$, may be calculated from the limb curve coefficients:

$$s_m = \frac{a_1 a_5^2 + a_2 a_4^2 - a_2 a_4 a_5}{a_3^2 - 4a_1 a_2} + a_6$$

A variable translucence limit, r(h, v), may thus be defined, for each interior pixel, as:

$$r(h, v) = s(h, v)/s_m$$

As defined, r(h, v) will vary from 0 at the object boundary (limb curve) to 1 at the object center.

The calculation of r(h, v) may be expedited, it will be noted, by computing s(h, v) as a second order function of h of the form:

$$s(h, v) = R_1 h^2 + R_2 h + R_3$$

where $$R_1 = a_1$$

$$R_2 = a_3 v + a_4$$

$$R_3 = a_2 v^2 + a_5 v + a_6$$

Since v remains constant for each scan line, $R_1$, $R_2$ and $R_3$ would only need to be computed once at the beginning of each line. Further streamlining of scan line computation may be accomplished by dividing $R_1$, $R_2$ and $R_3$ by $s_m$ and implementing the second order equation for r directly in an incremental form that involves only two additions without multiplication.

The above variable translucence technique may also be used to model other natural objects, such as mountains or clouds. In some applications, such as mountains, additional stipulations must be made in the variable translucence limit to prevent "holes" from appearing in the modeled object.

Those skilled in the art will appreciate that the foregoing description addresses a structure which may be modified in a variety of ways to suit specific applications. It may, for instance, be desirable to provide direct communication between object processors 24 and mainframe computer 18 to reduce the necessary bandwidth of data link 26 by using a separate bus to transmit the updated viewpoint parameters and to allow appropriate action by the mainframe computer in the case of any overload conditions which might occur in the object processors. Similar communication may be provided between the subframe processors 28 and mainframe computer 18.

The number of object processors 24, will, of course, depend on the required scene content of a given application. Similarly, the required resolution and available hardware will determine the number of subframe processors and pixels for a particular system.

The above described preferred embodiment may also be adapted for use with a variety of known techniques for enhancing the simulation of the desired image plane. For instance, shadow computation techniques may be implemented in the subframe processors in conjunction with an illumination vector (e.g., sunlight or moonlight) supplied by the mainframe computer. Color may be implemented by computing individual red, green, and blue intensity levels adaptable to standard color video display equipment.

With regard to the described antialiasing and texturing techniques, various modifications and adaptations of these techniques will suggest themselves to those skilled in the art. For example, the antialising technique may be adapted to pixels near boundary curve sections which cannot be approximated as a single linear segment by simply considering multiple segments, computing weighting factors for each, then appropriately normalizing the individual segment weighting factors. Similar treatment may be applied to pixels intersecting by two or more boundary curves separating regions of three or more different colors or intensities, or for small surfaces on the order of one or two pixel width dimensions. Another advantage to the texture function employed by the present system is that it provides greater scene content without introducing aliasing problems. Since the texturing function is based on sine waves, it is relatively easy to eliminate those frequency components in each texture pattern which are higher than one half the sample frequency in the image plane.

It would be further appreciated that the object modeling of the present invention greatly simplifies object visibility determination. Once the proper image plane curves—accounting for intraobject surface visibility—are computed by the object processors, the interobject visibility is easily determined by the subframe processors based on the viewpoint parameters. Also, by ranking the objects in order of interobject visibility, and determining intensity levels for highest order objects before proceeding to second and third rank objects behind translucent first rank objects, the results of any overload will not be as distracting.

Another modification which is easily accommodated by the present system is a multiple level of detail model data base. Thus a group of objects, such as trees, may be represented by a single object for viewpoint parameters indicating a long range. As the range decreases, a bounding plane may be inserted between the high level of detail model (the individual trees) and the single object model, and moved back as the range decreases further. The high level of detail object closest to the bounding plane could be made translucent to merge into the low level of detail model.

Besides such scene control techniques, those skilled in the art will doubtless arrive at numerous modeling methods using quadric surfaces as disclosed herein. To a great extent, object modeling is as much an artistic as a scientific procedure, but the parameters used in the present CIG system offer great potential for automated modeling process, as well as being more descriptive than abstract in nature. As pointed out, texture parameters may be derived by Fourier analysis of actual objects (clouds, water, sand, trees, etc.). Statistical analysis should also prove useful in reducing major terrain features to quadric surface models. For instance, digitizing low pass filtering of the Defense Mapping Agency (DMA) elevation data for a desired model region can be used to isolate major terrain features, which may then be scaled and fit to appropriately shaped quadric surfaces. Once the geographic region of which the visual images are to be simulated has been modeled in gross with respect to elevation data, DMA cultural data may be used to generate further quadric surfaces, bounding planes and texture parameters corresponding to solid surface objects typically found in the region. DMA cultural data includes such information as percent tree and roof cover; location of buildings, bridges and other surface features; and predominant height and surface material of such features. By constructing a library of detailed generic features and referring to the DMA cultural data, then, appropriate features can be added to the major terrain features to complete the scene model.

It will be noted that the techniques and system of the present invention may be easily adapted to accommodate moving models and dynamic features such as smoke, dust clouds or tree foliage. As noted above, moving models may be implemented by changing the associated objects' location and orientation parameters as the model moves through the scene. With regard to dynamic models varying of the texture parameters for each models' associated objects may be done in a predetermined manner to simulate the desired motion or agitation of the associated texture patterns, e.g., drifting smoke or wind-blown tree foliage. Preferably, control of moving and dynamic models is by the mainframe computer. Thus, the desired motion may be implemented by simply reassigning an updated object list to the same object processor, the updated list including the appropriately altered orientation, location or texture parameters.

Although a stated object of the present invention is the provision of a system capable of producing dynamic images in real time, it will be appreciated that the various modeling and surface rendering techniques described herein may be applied to static image generation and off-line dynamic image generations as well. For off-line systems, the parallel architecture discussed above is not necessary. In fact, with no stipulation that the system work in real time, all object projection calculations and pixel generation could be performed sequentially by the mainframe computer.

TABLE C (Appendix A) shows a documented source code listing (FORTRAN and assembly language) designed to enable a Data General Eclipse S250 computer to perform the functions of mainframe 18, object processors 24, and subframe processors 28 (FIG. 1) in an off-line system. Prior to execution of the image generation program, object lists and other inputs are prepared in ASCII format and loaded into a magnetic disc bulk memory device. The object lists are stored in a SCENE file. Texture parameters for up to 28 texture patterns are stored in file TEXT, keyed to directory parameters in the SCENE file. A third input file, EYEPTS, stores a desired series of viewpoint parameters including an updated set of parameters for each frame of imagery to be generated. The viewpoint parameters may be generated prior to execution of the offline image generation program, or may be supplied from a keyboard or other interactive input device during program execution.

As will be noted from the documentation included in TABLE C, the SCENE file contains, in addition to object lists, inputs related to a light vector, ambience, ground plane texture and color, and sky texture and color. Thus, the first three words in the SCENE file are x, y and z coordinates indicating the direction of illumination (sunlight or moonlight). The next SCENE entry indicates the intensity of ambient light, and falls within a range from 0 (no ambience) to 1 (all objects white). The fifth and sixth SCENE words are, respectively, a surface sampling factor and a hyperboloid surface translucence factor, normally set to 0.5 and 0.05 respectively. The surface sampling factor is used to position intensity sample points within the surface image for computing surface shading. Using a smaller value for the hyperboloid translucence factor proportionally reduces the translucence limit for all hyperboloid surfaces.

The next twelve words in the SCENE file relate to color and texture of the ground plane and sky. Specifically, word seven is a factor used to weight the ground plane texture, and words 8–10 are the red, green and blue color intensities for the ground plane. Words 11 and 12 are not used. Word 13 is a sky texture fractional weight, similar to the ground plane texture weight. Word 14 is an arbitrarily chosen distance to a sky plane from the ground plane, the sky plane being an artifice for modeling sky color and cloud texture. Words 15–17 are the red, green and blue intensities from the sky plane. Word 18 is used to input a sky intensity or luminosity, since no ambient or reflected light will be emitted from the sky plane. Like the ambience, scene scaling and hyperboloid translucence input the ground and sky texture weighting inputs are scaled from 0 (no texture) to 1 (full texture). All color inputs are scaled from 0 to 255. Following the sky plane parameters, (i.e., beginning at SCENE word 19), is an input indicating the number of objects in the scene model.

The actual object lists begin at SCENE word 20. The first word in each object list is the texture pattern number, identifying one of the up to 28 sets of texture function parameters in the TEXT file. Following the texture pattern number are the percent texture weight (0–1), the translucence limit (0–1), and the red, green and blue color components (0–255) for the object. The next inputs in each list are object shape parameters, prefixed by an entry indicating the number of bounding planes. Four parameters follow the number of bounding planes and describe the quadric surface shape and size with respect to the object axes (i.e., without regard to the object's orientation or location within the scene). To simplify the modeling of a hyperboloid, its object axes are defined with respect to a base plane intersecting the lower sheet, rather than with respect to the lower sheet vertex. (The base plane may or may not also be a bounding plane). For both ellipsoids and hyperboloids, then, the two SCENE words following the number of bounding planes for the object are linear measurements along the object's x and y axes from the object origin to the quadric surface. Two further words relate to the object's z axis. For ellipsoids, the first is the linear measure from the origin to the surface, and the second z entry is always 0. For hyperboloids, the first entry is the measure from the vertex of the bounding cone to the lower sheet vertex, and the second z entry is the distance from the object origin to the bounding cone vertex. The "sharpness" of the hyperboloid is thus determined by the third hyperboloid parameter (set to 0 for a cone), and its height by the fourth parameter (non-zero only for hyperboloids).

Following the quadric shape parameters is an x displacement entry which allows objects to be moved along the reference scene x axis. For stationary objects, the x displacement input would be set equal to zero.

Six SCENE words relate the orientation and location of the object axes within the scene. Specifically, the roll, pitch and yaw of the object axes in degrees with respect to the reference axes comprise the object orientation parameters, and are followed by the x, y and z displacement location parameters.

Seven SCENE words for each associated bounding plane follow the object's quadric surface information. The first SCENE word for each plane identifies the type of plane—±1 for an exposed, potentially visible surface; ±2 for a limiting surface (i.e., one which eliminates a hyperboloid sheet without actually intersecting the hyperboloid); and ±3 for a hidden surface (e.g., the base plane of a mountain peak). The sign of the first parameter for each bounding plane identifies the inequality relation $\widehat{R}$ for that plane—negative for $\leq$, positive for $\geq$.

The six parameters following the plane type are used to describe the position of the plane with respect to the reference system x-y ground plane, and describe the roll, pitch, and yaw (in degrees) and x, y, and z displacement necessary to move the bounding plane to its desired orientation location (from the ground plane position). It will be appreciated that only three of the available variables are ever necessary to position a plane; however, since the plane is positioned with respect to the ground plane rather than the object axes, the use of redundant ground plane positioning inputs simplifies object modeling.

The TEXT file, as indicated, includes parameters defining up to 28 texture patterns in accordance with the texture function described earlier. Each of the patterns may thus be referenced in the object lists in the SCENE file by an integer from 1 to 28. The parameters for the first pattern begin at TEXT word 7, and are followed in order by the parameters for the successively numbered patterns.

The first TEXT word for each pattern indicates the number of sine wave terms in the x and y directions, and is an integer from 1 to 7. The same number of spatial frequencies are used in both directions—that is, m and n from the texture function equation above are identical for a given texture pattern. The second TEXT entry for each pattern is an offset factor, normally having a value in a range from 0 to 5. The offset factor affects the mixture contrast—a lower value gives a higher contrast but results in clipping when the texture function yields a negative value.

The third, fourth and fifth TEXT words for each texture pattern relate to the translucence limit described earlier. The first translucence parameter establishes the base threshold for which complete translucence results when the texture function returns a lower value. The second parameter designates a range above the base threshold for which a variable translucence limit is to be computed; thus, setting the first and second translucence parameters to a common value results in a constant translucence limit for all objects textured by the associated texture pattern. The third translucence parameter relates to the variable translucence range and indicates a weight for the variable translucence limit.

All of the translucence parameters have a normal range between 0 and 1.

Following the translucence parameters for each texture pattern in the TEXT file are the weighting factors $C_x$ (up to seven, as indicated above), in turn followed by a like number of spatial frequencies $w_x$. The weights will have a normal range of 0–1, while the range of the spatial frequencies will depend on the desired texture and the magnitude of spatial units used. If fewer than seven frequencies are used, 0 inputs should be used for the unused weights and frequencies. Only the x coordinate weights and frequencies are actually specified as inputs, the y weights and frequencies and the various phase shift factors being derived from the x weights and frequencies in accordance with four additional inputs following the x frequencies for each pattern.

Specifically, the first TEXT word following each pattern's x frequencies is a factor by which each x frequency is multiplied to obtain an associated y dependent x coordinate phase shift frequency ($\phi_x$). The next entry is used directly as the phase shift weighting factor (J and K) for all x, y and z dependent phase shift frequencies. Following the phase shift weighting factor input is a factor by which each x frequency is multiplied to yield an associated y frequency. The resulting y frequencies, in turn, are used to generate x dependent y coordinate phase shift frequencies using the same input (i.e., the first TEXT word following the x frequencies) used to generate the x phase shift frequencies. Finally, the fourth input following the x frequencies is used to derive a single common z dependent phase shift frequency (for all $\psi_x$'s and $\psi_y$'s) by dividing by the first x frequency.

Two further inputs control the x and y offsets for the scene coordinate arguments to the texture function, and may be used to move the patterns parallel to the ground plane. It will be noted that the ninth texture pattern moves 200 spatial units in the x direction for every frame, in accordance with the statement four lines from the end of subroutine BPM1 in TABLE C.

The first four entries in the TEXT file are texture dynamics parameters which allow a designated one of the frequencies of a designated one of the texture patterns to be varied so as to simulate agitation of the texture pattern. The first TEXT word designates the affected frequency, and is set to an integer from 11 (for the first frequency) to 17 (for the seventh frequency). The second TEXT word identifies the texture pattern to be agitated (1–28). The third word dictates the weight of a dynamic offset factor to be added to the affected frequency, and will normally have a range similar to the affect frequency. The fourth texture dynamics parameter is a time period, in frames, for the repeated dynamic perturbation.

Those skilled in the art will appreciate that by entering an integer between 18 and 24 (for TEXT word 1), an agitation in the designated texture pattern (TEXT word 2) will be manifested as a periodic change in the magnitude rather than the spatial frequency of the pattern. Similarly, inputting a 1–10 will agitate the base translucence threshold (1), the variable translucence range (2), the weight of variable translucence (3), the x and y offsets (4, 5), the texture contrast (6), the phase shift magnitude (7), the z dependent phase shift frequency (8), the x to y frequency ratio (9); or the x-y phase shift frequency ratio (10). In each case, the third TEXT input (weighting factor) must be adjusted to an appropriate range.

The fifth entry in the TEXT file indicates the number of texture patterns. The sixth word is an antialias cutoff frequency input used to weight the Nyquist period for the projected patterns and having a range from 0 (all texture frequencies suppressed) to 1 (only frequencies greater than the Nyquist frequency suppressed).

Three input words precede the actual viewpoint parameters in the EYEPTS file. The first is the number of frames or viewpoints to be processed. The second EYEPTS entry is the distance from the focal point to the image plane (f), and the third entry is a zoom factor, normally set to one, which may be set to 2, 4 or 8 to proportionally magnify the image plane.

Following the zoom factor input are the viewpoint parameters, in six words for each viewpoint corresponding to roll, pitch, and yaw (in degrees) of the observer line of sight from the y reference axis and image plane h and v axes from the x and z reference axes and x, y and z displacement of the observer focal point from the reference origin. It will be noted that all six inputs are necessary, since not only the focal point and line of sight must be positioned, but the image plane rotation (pitch) must be specified as well.

Most of the subroutines and functions utilized by the program of TABLE C but not listed therein are standard system routines familiar to those skilled in computer programming. TABLE D (Appendix B) lists examples of file rewind, byte pack and unpack, read, bit operations, screen clear, video disc driver, and other routines which may be used with the program of TABLE C. All of the listings of TABLES C and D are compatible with a Data General Eclipse S250 and a Genisco GCT 3000 digital frame buffer, which may in turn be interfaced with any standard magnetic video disc drive to record the generated images on standard video tape.

Those skilled in the art will appreciate that interfacing a given computer with a particular digital frame buffer generally requires the development of special software. Hence the system routines of TABLE D are not applicable to other frame buffers in general.

In view of the various modifications which may be made in the present inventive system, the scope of the invention is to be interpreted only by the appended claims.

APPENDIX A

TABLE C - Listing for Off-Line System

DPOS                                                   02/17/83   13:49:57

BPM1            2600   D

```
        SUBROUTINE BPM1
        OVERLAY VOL1
        COMMON/SCALE IZ,FI,N
```

```
      COMMON M(16384)
      DIMENSION D(6),T(6),RS(3,3),VL(3),PT(194),TEXT(25,28),CX(7),WX(7)
      EQUIVALENCE (NVL,M(14244)),(NSC,M(14243)),(H,M(14241))
      EQUIVALENCE (F,M(8)),(D,M(10)),(T,M(22)),(RS,M(34)),(VL,M(70))
      EQUIVALENCE (AMB,M(76)),(DX,M(78)),(DZ,M(80)),(KR,M(11278))
      EQUIVALENCE (KG,M(11375)),(KB,M(11472)),(PT,M(11665)),
          (NS,M(12437))
      EQUIVALENCE (TEXT,M(12451)),(G,M(14237)),(S,M(14239)),
          (WMAX,M(14235))
      DO 1  I=4,0,-1                ;FOR EACH REMAP PAGE
      CALL REMAP(I)                 ;GET PAGE
      DO 1 J=1,16384                ;FOR EACH COMMON LOCATION
1     M(J)=0                        ;CLEAR MEMORY
      F=FI/IZ                       ;ADJUST F BY ZOOM FACTOR
      READ FREE(4)D                 ;GET EYEPT(ROLL,PITCH,YAW,X,Y,Z)
      IF(IZ.NE.2.AND.IZ.NE.4.AND.IZ.NE.8)IZ=1
      NSC=240/IZ                    ;1/2 # SCAN LINES
      NVL=320/IZ                    ;1/2 # VERT LINES
      CALL RT(0)                    ;ROT, MAT,:SCENE:EYE COORDS.
      READ FREE(1)T                 ;GET LIGHT VECTOR & AMBIENCE
      VL(1)=T(1)*RS(1,1)+T(2)*RS(2,1)+T(3)*RS(3.1)
      VL(2)=T(1)*RS(1,2)+T(2)*RS(2,2)+T(3)*RS(3,2)
      VL(3)=T(1)*RS(1,3)+T(2)*RS(2,3)+T(3)*RS(3,3)
      T(1)=SORT(VL(1)**2+VL(2)**2+VL(3)**2)
      VL(1)=VL(1)/T(1)
      VL(2)=VL(2)/T(1)
      VL(3)=VL(3)/T(1)
      G=T(3)/T(1)                   ;GROUND PLANE INTENSITY
      IF(G.LT.0)G=0                 ;CLIP
      AMB=T(4)
      G=(1-G)*AMB+G                 ;TOTAL GROUND PLANE INTENSITY
      DX=T(5)
      DZ=T(6)
      READ FREE(1)T                 ;GET GROUND PLANE %TEXT.&COLOR
      PT(193)=T(1)                  ;% TEXTURE
      BYTE(KR,192)=INT(T(2))        ;RED INTENSITY
      BYTE(KG,192)=INT(T(3))        ;GREEN INTENSITY
      BYTE(KB,192)=INT(T(4))        ;BLUE INTENSITY
      READ FREE(1)T                 ;GET SKY PLANE %TEXT,HEIGHT,&COLOR
      PT(194)=T(1)                  ;% TEXTURE
      H=T(2)-D(6)                   ;SKY PLANE ELEVATION
      BYTE(KR,193)=INT(T(3))        ;RED INTENSITY
      BYTE(KG,193)=INT(T(4))        ;GREEN INTENSITY
      BYTE(KB,193)=INT(T(5))        ;BLUE INTENSITY
      S=T(6)                        ;SKY INTENSITY
      READ FREE(3)IT,JT,AT,BT       ;GET TEXTURE DYNAMICS PARAMETERS
      READ FREE(3)NTF,WMAX
      WMAX=WMAX*3.14159/IZ          ;TEXTURE FUNCTION ANTIALIAS CUTOFF
                                              FREQUENCY
      DO 3 J=1,NTF                  ;FOR EACH TEXTURE FUNCTION
      READ FREE(3)NSIN,TOFF,A0,A1,A2
      READ FREE(3)CX
      READ FREE(3)WX
      READ FREE(3)TEXT(10,J),TEXT(7,J),A3,A4,TEXT(4,J),TEXT(5,J)
      SC=0                          ;INITIALIZE COEFFICIENT SUM
      TEXT(1,J)=A0                  ;BASE THRESHOLD
      TEXT(2,J)=A1-A0               ;LOWER LIMIT THRESHOLD
      TEXT(3,J)=1-A2                ;% THRESHOLD RANGE
      TEXT(6,J)=TOFF*NSIN           ;TOTAL OFFSET
      TEXT(8,J)=A4/WX(1)            ;Z PHASE FREQUENCY
      TEXT(9,J)=1/A3                ;Y FREQUENCY RATIO
      DO 2 I=1, NSIN                ;FOR EACH COEFFICIENT
      TEXT(11+I,J)=6.2831853/WX(I)  ;GET FREQUENCY
      TEXT(18+I,J)=CX(I)            ;
2     SC=SC+CX(I)+TOFF              ;COEFFICIENT SUMMATION
      TEXT(11,J)=1/(SC*SC)          ;SCALED
      IF(J.EQ.9)TEXT(4,9)=TEXT(4,9)+N*200,    ;MOVE TANKS
```

```
C       IF(J.EQ.12)TEXT(4,12)=TEXT(4,12)+N*240. ;MOVE DUST
3       BYTE(NS,J-1)=NSIN
        TEXT(IT,JT)=TEXT(IT,JT)*(1+AT*SIN(6.2831853*N/BT))
```

TABLE C - Listing for Off-Line System

```
        SUBROUTINE BPM2                     ;OBJECT PROCESSOR
        OVERLAY VOL2
        COMMON/SCALE/IZM,FI,NF
        COMMON L(16384)
        DIMENSION XL(10),SA(3,4),E(3,3,4),SC(3,3,4,192),VL(3),VN(192)
        DIMENSION A(9),B(3,7,192),ZX(2,21),IZ(32),G(2)
        DIMENSION C(5,7,192),V(2,21,189),IP(6,14,192),FM(192)
        DIMENSION DA(6).T(6),R(3,3),IPL(3,192).TR(192).PT(194)
        EQUIVALENCE (SC,L),(IP,L(31)),(XL,L(11)),(V,L(498)),(FM,L(13525))
        EQUIVALENCE (C,L(85)),(W,L(14235)),(VN,L(13851)),(TR,L(12053))
        EQUIVALENCE (KB,L(11472)),(KG,L(11375)),(KR,L(11278)),
             (PT,L(11665))
        EQUIVALENCE (IPL,L(10702)),(B,L(346)),(IB,L(178))
        EQUIVALENCE (NB,L(82)),(DDZ,L(80)),(DDX,L(78))
        EQUIVALENCE (VL.L(70)),(R,L(52)),(T.L(22)),(DA,L(10)),(F,L(8))
        EQUIVALENCE (NT,L(11569)),(IZ,L(16159)),NSC,L(14243)),
             (NVL,L(14244))
        DZ=DDZ                              ;HYPERBOLOID TRANSLUCENCE FACTOR
        DX=DDX/2                            ;SAMPLE SHIFT FACTOR
        NZ=NSC                              ;SCREEN TOP
        NX=NVL                              ;SCREEN RIGHT
        N=0                                 ;INITIALIZE OBJECT #
        READ FREE(1)NO                      ;GET # OF OBJECTS
        DO 71 NN=1,NO                       ;FOR EACH OBJECT
        N=N+1                               ;PROCESS NEXT OBJECT #
        IF(N.GT.189)GO TO 72                ;BAIL OUT
        READ FREE(1)T                       ;GET TEXTURE #,%,TRANSLUCENCE,COLOR
        BYTE(NT.N-1)=INT(T(1))              ;SAVE TEXTURE FUNCTION #
        PT(N)=T(2)                          ;SAVE % OF TEXTURE
        TR(N)=T(3)                          ;SAVE TRANSLUCENCE
        BYTE(KR,N-1)=INT(T(4))              ;SAVE RED COLOR COMPONENT
        BYTE(KG,N-1)=INT(T(5))              ;SAVE GREEN COLOR COMPONENT
        BYTE(KB,N-1)=INT(T(6))              ;SAVE BLUE COLOR COMPONENT
        READ FREE(1)T                       ;GET # BOUNDS,OBJECT DIMENSIONS
        BYTE(NB,N-1)=NBN=T(1)+1             ;# OF BOUNDING PLANES FOR OBJECT
        C1=1/T(2)**2                        ;QUADRIC CURVE COEFFICIENTS
        C2=1/T(3)**2
        C3=1/T(4)**2-T(5)**2
        C4=-C3*T(4)**2                      ;T(5)=0 FOR ELLIPSOID
        C5=T(6)*NF                          ;T(4)=0 FOR CONE
        READ FREE(1)DA                      ;X DISPLACEMENT
        DA(4)=DA(4)+C5                      ;GET OBJECT ROT & TRANSLATION DATA
        CALL RT(1)                          ;MOVE OBJECT
        A0-C1*T(1)**2+C2*T(2)**2+C3*T(3)**2+C4 ;ROTATE AND TRANSLATE OBJ. IN SCENE
        IQ=1                                ;LIMB EXISTS
        CALL ISB(IB,1)                      ;LIMB CURVE EXISTS
        IF(A0.LT.0)CALL ICB(IB,1)           ;LIMB CURVE DOESNT EXIST
        IF(A0.LT.0)IQ=0                     ;LIMB CURVE DOESNT EXIST
        DO 14 J=1.3                         ;QUADRIC CURVE COEFFICIENTS
        I=J+1
        IF(J.EQ.3)I=1
        A(J)=(C1*R(1,J)**2+C2*R(2,J)**2+C3*R(3,J)**2)
        A(J+3)=2*(C1*R(1,J)*R(1,I)+C2*R(2,J)*R(2,I)+C3*R(3,J)*R(3,I))
14      A(J+6)=2*(C1*R(1,J)*T(1)+C2*R(2,J)*T(2)+C3*R(3,J)*T(3))
        IF(A0.EQ.0)GO TO 16                 ;DONT NORMALIZE
        DO 15 I-1,9                         ;FOR EACH COEFFICIENT
15      A(I)=A(I)/A0                        ;NORMALIZE
16      IF(NBN.LE.1)GO TO 19                ;NO BOUNDING PLANES
        DO 18 J=2,NBN                       ;FOR EACH BOUND
        READ FREE(1)I,DA                    ;GET TYPE, POSITION
        DA(4)=DA(4)+C5                      ;MOVE PLANE
```

```
          CALL RT(3)                          ;ROTATE AND TRANSLATE IN SCENE
          CALL ISB(IB,J+J-2)                  ;OBJ. > BOUNDARY
          IF(T(3).LT.0)I=-I                   ;FLIP FOR - NORMALIZATION
          IF(I.LT.0)CALL ICB(IB,J+J-2)        ;OBJ. < BOUND
          CALL ISB()B,J+J-1)                  ;VISIBLE BOUNDARY
          IF(I.LT.0)I=-I                      ;ABSOLUTE VALUE
          IF(I.EQ.2)CALL ICB(IB,J+J-1)        ;BOUND IS LIMIT ONLY
          IF(T(3).GE.0.AND.T(3).LT.1)T(3)=1;CLAMP T(3)
          IF (T(3).LT.0.AND.ABS(T(3)).LT.1)T(3)=-1
          DO 17 K=1,3                         ;FOR EACH COEFFICIENT
17        B(K,J,N)=R(3,K)/T(3)                ;NORMALIZE
          IF(I.GT.2)GO TO 18                  ;SKIP SHADING FOR FLAGGED PLANE
          A0=SQRT(B(1,J,N)**2+B(2,J,N)**2+B(3,J,N)**2)
          A0=(VL(1)*B(1,J,N)+VL(2)*B(2,J,N)+VL(3)*B(3,J,N.))/A0
          IF(A0.LT.0)A0=0                     ;CLIP PLANAR INTENSITIES
          IF(A0.GT.1)A0=1
          I=255*A0
18        BYTE(IPL(1,N),J-2=I
19        K=0
          CALL ITB(IB,3,ITP)                  ;INITIALIZE LINE # POINTER
          IF(IQ-ITP.NE.1)GO TO 20             ;NOT HYPERBOLOID PROBLEM
          CALL ITB(IB,2,IFB)                  ;GET FLAG SENSE
          CALL ITB(IB,4,IGB)                  ;GET GP SENSE
20        DO 191 J=1,3                        ;FOR EACH COEFFICIENT
191       B(J,1,N)=A(J+6)/2                   ;LIMB PLANE
          DO 21 J=1,NBN                       ;FOR EACH PLANE
21        B(2,J,N)=B(2,J,N)*F                 ;SET Y=F
          A(8)=A(8)*F                         ;FOR COMPLETENESS
          DO 27 J=1,NBN                       ;DO FOR EACH CURVE
          CALL ITB(IB,J+J-1,IR)               ;IR=VISIBILITY FLAG
          IF(IR.EQ.0)GO TO 23                 ;INVISIBLE BOUND
          C0=A(1)+B(1,J,N)*(B(1,J,N)-A(7))
          C1=A(3)+B(3,J,N)*(B(3,J,N)-A(9))
          C2=A(6)+B(1,J,N)*(2*B(3,J,N)-A(9))-B(3,J,N)*A(7)
          C3=A(4)*F+B(1,J,N)*(2*B(2,J,N)-A(8))-B(2,J,N)*A(7)
          C4=A(5)*F+B(2,J,N)*(2*B(3,J,N)-A(9))-B(3,J,N)*A(8)
          C5=A(2)*F*F+B(2,J,N)*(B(2,J,N)-A(8))
          CALL REMAP(1)                       ;COEFFICIENTS
          C(1,J,N)=C1
          C(2,J,N)=C2
          C(3,J,N)=C3
          C(4,J,N)=C4
          C(5,J,N)=C5
          CALL ICB(L,7*N+J-8)                 ;CLEAR IC(J,N)
          IF(C0.EQ.0)GO TO 23                 ;DONT NORMALIZE IF C0=0
          CALL ISB(L,7*N+J-8)                 ;SET IC(J,N)
          DO 22 I-1,5                         ;FOR EACH COEFFICIENT
22        C(I,J,N)=C(I,J,N)/C0                ;NORMALIZE
23        CALL REMAP(0)                       ;BACK TO QUADRICS
          IF(J.EQ.1)GO TO 27                  ;NO LINES FROM LIMB PLANE
          DO 26 I=J,NBN                       ;DO FOR EACH BOUNDARY
          K=K+1                               ;NEXT LINE #
          JA=J                                ;ADJUSTED INDEX
          IF(J.EQ.I)JA=1                      ;USE LIMB
          IF(IQ+JA.EQ.1)GO TO 26              ;NO VISIBILITY LINES
          C1=B(3,I,N)-B(3,JA,N)               ;LINE COEFFICIENTS
          C2=B(2,I,N)-B(2,JA,N)
          C0=B(1,I,N)-B(1,JA,N)
          CALL REMAP(2)                       ;LINE COMMON
          CALL ISB(L,42*N+K+K-44)             ;POSITIVE SENSE
          IF(C0.LT.0)CALL ICB(L,42*N+K+K-44)  ;NEGATIVE SENSE
          CALL ICB(L,42*N+K+K-43)             ;CLEAR IV(K,N)
          V(1,K,N)=C1
          V(2,K,N)=C2
          IF(C0.EQ.0)GO TO 26                 ;DONT NORMALIZE IF C0=0
          CALL ISB(L,42*N+K+K-43)             ;SET IV(K,N)
          V(1,K,N)=V(1,K,N)/C0                ;NORMALIZE
```

```
         V(2,K,N)=V(2,K,N)/CO
26       CALL REMAP(0)                        ;BACK TO QUADRICS
         IF(IQ-ITP.NE.1)GO TO 27              ;NO HYP. PROBLEM
         CALL REMAP(2)
         CALL ITB(L,42*N-42,IFV)              ;SENSE OF FLAG LINE
         CALL ITB(L,42*N-44+NBN+NBN,IGV);SENSE OF G.P. LINE
27       CALL REMAP(0)
         CALL REMAP(3)                        ;VISIBILITY LIST SPACE
         IZ(1)=NZ                             ;SCREEN TOP
         IZ(2)=NZ                             ;SCREEN BOTTOM
         DO 28 J=3,32                         ;FOR EACH ZENTRY
28       IZ(J)=NZ-1                           ;BELOW SCREEN BOTTOM
C----FIND KEY POINTS---------------------------------------------------
         K=0                                  ;INITIALIZE LINE #
         DO 29 J=1,21
29       ZX(1,J)=ZX(2,J)=-32767
         DO 42 J=1,NBN                        ;DO FOR EACH BOUNDARY
         IF(J.NE.1)K=K+1
         IF(ITP.EQ.0.AND.J.EQ.2)K=NBN-1 ;NBN LINES FROM FLAGGED PLANE
         IF(ITP.EQ.0.AND.J.EQ.2)GO TO 42 ;NO KEY POINTS FOR FLAGGED PLANE
         IF(IQ+J.EQ.1)GO TO 42                ;NO LIMB CURVE
         CALL REMAP(1)                        ;COEFFICIENT COMMON
         CALL ITB(L,J-1+(N-1)*7,IT)           ;SET IT=IC(J,N)
         A0=C(2,J,N)**2-4*C(1,J,N)*IT
         IF(A0.EQ.0)GO TO 32                  ;PARABOLA
         B0=(2*C(4,J,N)*IT-C(2,J,N)*C(3,J,N))/A0
         C0=(4*C(5,J,N)*IT-C(3,J,N)**2)/A0
         D=B0*B0+C0
         IF(D.LT.0)GO TO 33                   ;NO CURVE EXTREMA
         A0=ABS(D*A0)-1                       ;X WIDTH MIDPT <1 PIXEL
         D=SQRT(D)
         DO 31 I=1,2                          ;GET MIN & MAX
         Z=B0+D                               ;CURVE EXTREMA
         IF(K.NE.0.AND.A0.GE.0)ZX(I,K)=Z;XION CURVE ZXTREMUM
30       X=-(C(2,J,N)*Z+C(3,J,N))/2
         IF(IT.EQ.0)X=((C(1,J,N)*Z+C(4,J,N))*Z+C(5,J,N))/(X+X)
         CALL VTEST(Z,X,N,J,0,0)              ;TEST VISIBILITY AND SORT
31       D=-D
         GO TO 33
32       Z=(C(3,J,N)**2-4*C(5,J,N))/(C(2,J,N)*C(3,J,N)-2*C(4,J,N))
         IF(IT.EQ.0)Z=C(3,J,N)/C(2,J,N)
         GO TO 30
33       IF(J+IQ.EQ.1)GO TO 42                ;NO LIMB
         IF(A0.GE.0.OR.K.EQ.0)GO to 330;CURVE NOT COLLAPSED
         C(1,J,N)=C(2,J,N)=0                  ;CLEAR SECOND ORDER TERMS
         CALL ICB(L.7*N+J-8)                  ;CLEAR X*X TERM
         CALL REMAP(2)                        ;GET VISIBILITY LINES
         CALL ITB(L,42*N+K+K-43,IT)           ;GET X TERM
         C1=V(1,K,N)                          ;GET Z TERM
         C2=V(2,K,N)                          ;GET CONST
         CALL REMAP(1)                        ;BACK TO CURVES
         C(3,J,N)=IT                          ;REPLACE LINEAR TERMS
         C(4,J,N)=C1
         C(5,J,N)=C2
         IT=0
330      DO 41 I=J-2,NBN                      ;DO FOR EACH XING PLANE
         I1=I
         IF(I.EQ.1.AND.J.EQ.1)GO TO 42 ;DONE WITH LIMB
         IF(I.LT.J)GO TO 331                  ;WINDOW XION PTS.
         IF(I.GT.J)K=K+1                      ;NEXT LINE #
         IF(I.EQ.J.AND.IQ.EQ.0)GO TO 41;NO CONTACT POINTS (NO LIMB)
         CALL REMAP(2)                        ;VISIBILITY LINE COMMON
         CALL ITB(L,42*N+K+K-43,IS)           ;SET IS=IV(K,N)
         C1=V(1,K,N)
         C2=V(2,K,N)
         GO TO 332
331      C1=0
```

```
            C2=-NX
            IF(I.EQ.J-1)C2=-C2
            IS=1
            I1=0                                ;TEST AS A XTREMUM
332         CALL REMAP(1)                       ;COEFFICIENT COMMON
            JA=J                                ;ADJUSTED INDEX
            IF(J.EQ.I)JA=1                      ;USE LIMB WITH VISIBILITY LINES
            CALL ITB(L,7*N+JA-8,IT)             ;SET IT=C0(JA,N)
            IF(IS.EQ.0)GO TO 36                 ;LINE IS HORIZONTAL
            A0=(IT*C1-C(2,JA,N))*C1+C(1,JA,N);"A"
            B0=-(2*C1*C2*IT-(C(2,JA,N)*C2+C(3,JA,N)*C1-C(4,JA,N)))/2;"-B/2"
            C0=(IT*C2-C(3,JA,N))*C2+C(5,JA,N);"C"
            D=B0*B0-A0*C0
            IF(D.LT.0.AND.I.NE.J)GO TO 41       ;NO WINDOW POINTS
            IF(D.LT.0)D=0                       ;NO POINTS
            D=SQRT(D)
            IF(A0.EQ.0)GO TO 34                 ;PARABOLIC CASE
            B0=B0/A0
            D=D/A0
34          DO 35 M=1,2
            Z=B0+D                              ;CONTACT/XION POINTS
            IF(A0.EQ.0.AND.C0.NE.0.AND.Z.NE.0)Z=C0/Z;PARABOLIC RECIPROCAL
            IF(A0.EQ.0.AND.Z.EQ.0)Z=-32767;PARABOLA, FLAGGED ENDPOINT
            X=-(C1*Z+C2)
            IF(ITP.NE.0.OR.J.NE.3.OR.J.NE.I)GO TO 342;WRONG POINT
            IF(A(7)*X+A(8)+A(9)*Z.LE.0)GO TO 341;+ LAMBDA
            G,(M)=NX                            ;- LAMBDA, CLIP TO SCREEN
            IF(X.GT.0)G(M)=-NX                  ;OTHER SIDE OF SCREEN
            GO TO 342
341         G(M)=X                              ;HYP. GP. CP'S
342         IF(I.EQ.J.AND.ZX(M,K).EQ.-32767)ZX(M,K)=Z;SAVE ZXTREME
            CALL VTEST (Z,X,N,JA,I1,0)          ;TEST VISIBILITY AND SORT
            IF(I.GT.J)ZX(M,K)=Z                 ;SAVE ZXTREME
35          D=-D
            IF(I.LE.J)GO TO 41                  ;DONE WITH WINDOW POINTS
            GO TO 38
36          IF(C1.EQ.0)GO TO 41                 ;NO POINTS
            Z=-C2/C1                            ;ZCP OR ZXP
            B0=-(C(2,JA,N)*Z+C(3,JA,N))/2       ;FIRST ORDER TERM
            C0=(C(1,JA,N)*Z+C(4,JA,N))*Z+C(5,JA,N);CONSTANT TERM
            D=B0*B0-IT*C0                       ;DISCRIMINANT
            IF(D.LE.0)GO TO 41                  ;NO POINTS
            D=SQRT(D)
            DO 37 M=1,2
            X=B0+D
            IF(IT.EQ.0.AND.X.NE.0.AND.C0.NE.0)X=C0/X;PARABOLIC RECIPROCAL
            IF(IT.EQ.0.AND.X.EQ.0)GO TO 37;PARABOLA, OPEN END
            CALL VTEST(Z,X,N,JA,I,0)            ;TEST VISIBILITY AND SORT
            Z=-C2/C1                            ;RESTORE Z FOR ITER. 2
37          D=-D
38          IF(ITB.NE.0.OR.ZX(1,K).GE.ZX(2,K).OR.J.EQ.3)GO TO 39;NOT HYPERB.
                                                                     PROB.
            SW=ZX(1,K)
            ZX(1,K)=ZX(2,K)
            ZX(2,K)=SW
39          IF(I.LE.J.OR.IS.EQ.0)GO TO 41 ;NO XXP
            DO 40 M=3-ITP,NBN                   ;FOR EACH PLANAR TRIPLET
            IF(M.EQ.J.OR.M.EQ.I)GO TO 40        ;NOT A THIRD PLANE
            CALL REMAP(0)                       ;GET IB WINDOW
            CALL ITB(IB.J+J-2,IR)               ;IR=IB(J,N) SENSE
            IF(IR.NE.0)CALL ITB(IB,I+I-2,IR);IR+IB(I,N) SENSE
            IF(IR.NE.0)GO TO 41                 ;XION LINE IS INVISIBLE
            C3=B(1,M,N)-B(1,J,N)                ;VX(J,M)
            C5=B(3,M,N)-B(3,J,N)                ;VZ(J,M)
            B0=IS*C5-C3*C1                      ;DETERMINANT
            IF(B0.EQ.0)GO TO 40                 ;NO XXP
            C4=B(2,M,N)-B(2,J,N)                ;VY(J,M)*(Y=F)
```

```
           Z=(C3*C2-IS*C4)/B0
           X=(C1*C4-C2*C5)/B0
           IF(ZX(1,K).EQ.-32767(ZX(1,K)=-ZX(1,K);MAXIMUM FLAG
           IF(Z.GE.ZX(1,K).OR.Z.LE.ZX(2,K))GO TO 40;XXP NOT VISIBLE
           SW=-B0*(Z-ZX(1,K))
           CALL ITB(IB,M+M-2,IR)         ;IR=SENSE OF PLANE M
           IF(IR.EQ.0)SW=-SW             ;FLIP FOR NORMALIZATION
           IF(SW.LT.0)ZX(1,K)=Z          ;NEW MAX ENDPOINT
           IF(SW.GT.0)ZX(2,K)=Z          ;NEW MIN ENDPOINT OF K
    40     CONTINUE
           IF(ZX(1,K).NE.32767)CALL SORT(ZX(1,K));SORT MAXIMUM XXP
           CALL SORT (ZX(2,K))           ;SORT MINIMUM XXP
           IF(ZX(1,K).EQ.32767)ZX(1,K)=ZX(2,K)
           IF(ZX(2,K).EQ.-32767)ZX(2,K)=ZX(1,K)
    41     CONTINUE
    42     CONTINUE
C----FIND INTERCEPTS----------------------------------------------------
           IN=M=0                        ;INITIAL INDEX TO VIS. LIST
    43     M=M+1                         ;NEXT VIS. LIST ENTRY
    431    IN=IN+1                       ;NEXT Z LIST VALUE
           IF(M.GT.14)GO TO 60           ;LIST FULL
           CALL REMAP(3)                 ;VISIBILITY LIST
           DO 44 J=1,10
           L(J)=0
    44     XL(J)=1E70
           IP(1,M,N)=IZ(IN)              ;SAVE ZMAX ON LIST
           IF(IZ(IN).LE.-NZ)GO TO 60     ;FINISHED WITH LIST
           Z=(IZ(IN)+IZ(IN+1))/2.        ;CENTER OF Z BAND
           L(16191)=0                    ;INITIALIZE LEFT SURFACE
           K=0                           ;INITIALIZE LINE #
           DO 48 J=1,NBN                 ;FOR EACH CURVE
           IF(J.EQ.1.AND.IQ.EQ.0)GO TO 48;NO LIMB CURVE
           DO 47 I=J,NBN                 ;FOR EACH XING BOUND
           IF(J.EQ.1)GO TO 45            ;NO PLANE TO FLAG
           K=K+1
           IF(Z.LT.ZX(2,K).OR.Z.GT.ZX(1,K))GO TO 47
           CALL REMAP(0)                 ;GET IB WINDOW
           CALL ITB(IB,J+J-1,IR)         ;GET FLAG FOR PLANE
           IF(IR.EQ.0)GO TO 47           ;NO CURVE FOR FLAGGED PLANE
    45     IF(I.NE.J)GO TO 461           ;XION LINE
           CALL REMAP(1)                 ;COEFFICIENT SPACE
           CALL ITB(L,J-1+(N-1)*7,IT)    ;IT=IC(J,N)
           B0=-(C(2,J,N)*Z+C(3,J,N))/2
           C0=(C1,J,N)*Z+C(4,J,N))*Z+C(5,J,N)
           D=B0*B0-IT*C0                 ;DISCRIMINANT
           IF(D.LT.0.AND.J.EQ.1)GO TO 47 ;NO INTERCEPT
           IF(D.LT.0)D=0                 ;AVOID PRECISION SLOP
           D=SQRT(D)
           DO 46 K1=0,1
           X=B0-D
           IF(IT.EQ.0.AND.X.NE.0.AND.C0.NE.0)X=C0/X;PARABOLIC RECIPROCAL
           IF(IT.EQ.0.AND.X.EQ.0)GO TO 46;PARABOLA OPEN END
           CALL VTEST(Z,X,N,J,-K1,M)     ;TEST VISIBILITY AND SET FLAG
    46     D=-D
           GO TO 47
    461    IF(J.EQ.1)GO TO 48            ;NONE OF THIS FOR LIMB
           CALL ITB(IB,J+J-2,IR)         ;SENSE OF PLANE J
           IF(IR.NE.0)CALL ITB(IB.I+I-2,IR);GET SENSE OF PLANE I
           IF(IR.NE.0)GO TO 47           ;BOTH PLANE INVISIBLE
           CALL REMAP(2)                 ;GET VISIBILITY LINE COEFFS.
           CALL ITB(L,42*N+K+K-43,IS)    ;SET IS=IV(K,N)
           IF(IS.EQ.0)GO TO 47           ;LINE IS HORIZONTAL
           X=-(V(1,K,N)*Z+V(2,K,N))      ;X INTERCEPT OF SCAN LINE
           CALL VTEST(Z,X,N,J,I,M)       ;TEST VISIBILITY AND FLAG
    47     CALL REMAP(0)                 ;BACK TO QUADRICS
    48     CONTINUE
C----SURFACE DETERMINATION---------------------------------------------
           CALL REMAP(3)                 ;GET VISIBILITY LIST WINDOW
```

```
        LSN=L(16191)                    ;-LAMBDA CURVE #
        KSN=0                           ;INITIALIZE SURFACES
        DO 481 J=2,6
481     IP(J,M,N)=0
        IF(XL(1).GT.NX)GO TO 592        ;LEFT MOST POINT TO RIGHT OF SCREEN
        DO 59 J=1,10                    ;FOR EACH INTERCEPT
        KTEMP=L(J)                      ;GET FIRST INTERCEPT
        KSN=KTEMP                       ;SET CURRENT SURFACE #
        IF(KTEMP.NE.0)GO TO 482         ;CONTINUE
        IF(L(10).EQ.0)GO TO 591         ;NO VALUE, FINISHED
        KSN=L(10)
        IF(KSN.LT.128)GO TO 55
        IF(LSN.LT.128)GO TO 56
482     IF(KSN.GT.8.AND.KSN.LT.16)KSN=KSN-8;REMOVE SIDE FLAG FROM CURVES
        IF(LSN.EQ.0)GO TO 58            ;FIRST EDGE OF OBJECT
        IF(LSN.LT.128)GO TO 53          ;LAST WAS SURFACE #
        IF(KTEMP.LT.128)GO TO 55        ;CURRENT IS SURFACE #
        M1=0                            ;INITIALIZE LINE COUNT
        DO 49 JA=2,NBN-1                ;DO FOR EACH CURVE
        DO 49 I1=JA+1,NBN               ;DO FOR EACH XION LINE
        M1=M1+1                         ;INCREMENT LINE COUNT
49      IF(M1.EQ.LSN-128)GO TO 50       ;BAIL OUT ON M1=LSN(JA,I1)
50      M1=0                            ;RESET LINE COUNT
        DO 51 L1=2,NBN-1                ;DO FOR EACH CURVE
        DO 51 K1=L1+1,NBN               ;DO FOR EACH XION LINE
        M1=M1+1                         ;INCREMENT LINE COUNT
51      IF(M1.EQ.KSN-128)GO TO 52       ;BAIL OUT ON M1=KSN(L1,K1)
        NSN=1                           ;LIMB SURFACE
        IF(JA.EQ.L1.OR.JA.EQ.K1)NSN=JA  ;SURFACE JA
        IF(I1.EQ.L1.OR.I1.EQ.K1)NSN=I1  ;SURFACE I1
        GO TO 57                        ;PACK SURFACE #
53      IF(KTEMP.GT.128)GO TO 56        ;
        IF(KSN.NE.LSN)GO TO 54          ;
        CALL REMAP(0)                   ;GET IB WINDOW
        CALL ITB(IB,KSN+KSN-2,M1)       ;GET SENSE OF PLANE KSN
        CALL REMAP(3)                   ;RETURN TO VISIBILITY LIST WINDOW
        IF(M1.EQ.0)GO TO 55             ;PLANE IS VISIBLE
54      NSN=1                           ;LIMB IS VISIBLE
        GO TO 57                        ;PACK SURFACE #
55      NSN=KSN                         ;CURRENT SURFACE IS VISIBLE
        GO TO 57
56      NSN=LSN                         ;LAST SURFACE IS VISIBLE
57      KTEMP=KTEMP+16*NSN              ;PACK SURFACE #
58      BYTE(IP(2,M,N),J-1)=KTEMP       ;SAVE POINT ON LIST
59      LSN=KSN
591     IF(XL(J-1).LT.-NX)IP(2,M,N)=0   ;RIGHTMOST POINT TO LEFT OF SCREEN
592     IF(M.EQ.1.AND.IP(2,1,N).EQ.0)GO TO 431
        IF(M.EQ.1)GO TO 43
        IF(IP(2,M,N).EQ.0)GO TO 60      ;ZMIN FOUND
        IF(IP(2,M,N).NE.IP(2,M-1,N))GO TO 43
        IF(IP(3,M,N).NE.IP(3,M-1,N))GO TO 43
        IF(IP(4,M,N).NE.IP(4,M-1,N))GO TO 43
        IF(IP(5,M,N).NE.IP(5,M-1,N))GO TO 43
        IF(IP(6,M,N).NE.IP(6,M-1,N))GO TO 43
        GO TO 431
C----GET SAMPLE POINTS-----------------------------------------------
60      J=IP(2,1,N)                     ;FIRST 2 INTERCEPTS OF OBJECT N
        IF(J.EQ.0)N=N-1                 ;DELETE THIS OBJECT FROM SCENE
        IF(J.EQ.0)GO TO 71              ;TRY NEXT OBJECT
        IF(M.GT.14)M=14                 ;DONT OVERFLOW LIST
        Z2=IP(1,1,N)                    ;ZMAX OF OBJECT
        Z1=IP(1,M,N)                    ;ZMIN OF OBJECT
        D=(Z2-Z1)*DX
        Z1=Z1+D
        Z2=Z2-D
        DO 69 J=1,3                     ;FOR EACH Z SAMPLE
        Z=Z1                            ;GET ZMIN
```

```
      IF(J.EQ.2)Z=Z2                    ;GET ZMAX
      IF(J.EQ.3)Z=(Z1+Z2)/2              ;GET ZCENTER
      JA=1                              ;LIMB CURVE
      IF(ITP+IQ.EQ.0)JA=3               ;USE G.P. XION IF HYP WITH NO LIMB
      CALL REMAP(1)                     ;GET COEFFICIENTS
      CALL ITB(L,JA-1+(N-1)*7,IT)       ;GET IC(JA,N)
      B0=-(C(2,JA,N)*Z+C(3,JA,N))/2     ;XS3
      C0=(C(1,JA,N)*Z+C(4,JA,N))*Z+C(5,JA,N)
      D=B0*B0-IT*C0                     ;DISCRIMINANT
      IF(D.LT.0)D=0                     ;NO VALUES
      D=SQRT(D)                         ;GET RADICAL
      DO 602 I=1,2                      ;GET X INTERCEPTS
      X=B0+D                            ;LIMB RIGHT FIRST
      IF(IT.EQ.0.AND.X.NE.0)X=C0/X      ;PARABOLIC CASE
      IF(A(7)*X+A(8)+A(9)*Z.LE.0)GO TO 601 ;+LAMBDA
      C1=NX                             ;-LAMBDA, CLIP TO SCREEN
      IF(X.GT.0)C1=-NX                  ;OTHER SIDE OF SCREEN
      X=C1
 601  IF(I.EQ.1)XX=X                    ;LIMB RIGHT
 601  D=-D                              ;GET OTHER SIDE
      XM=XX
      IF(X.LT.XX)XM=X                   ;LIMB LEFT
      IF(X.GT.XX)XX=X                   ;LIMB RIGHT
      IF(IQ-ITP.NE.1.OR.C(2,1,N)**2-4*IT*C(1,1,N).LT.0)GO TO 66
                                        ;NOT HYP. PROB.
      IF(G(1).LE.G(2))GO TO 61          ;PROPER ORDER
      SW=G(1)                           ;SAVE MAX
      G(1)=G(2)                         ;SWAP X
      G(2)=SW                           ;SWAP X
 61   IF(IT.EQ.0.AND.XM.EQ.0.AND.C0.NE.0)XM=G(1)
      IF(IT.EQ.0.AND.XX.EQ.0.AND.C0.NE.0)XX=G(2)
      CALL REMAP(2)
      CALL ITB(L,42*N-41,IG)
      SW=V(1,1,N)*Z+V(2,1,N)
      IF(IFB.NE.IFV.XOR.SW+XM*IG.LT.0)GO TO 64
      IF(IFB.NE.IFV.XOR.SW+XX*IG.LT.0)GO TO 65
      CALL ITB(L,42*N-43+NBN+NBN,IG)
      SW=V(1,NBN,N)*Z+V(2,NBN,N)
      IF(IGB.NE.IGV.XOR.SW+XM*IG.LT.0)XM=G(1)
      IF(IGB.NE.IGV.XOR.SW+XX*IG.LT.0)XX=G(2)
      GO TO 66
 64   XM=XX
      XX=C(2)
      GO TO 66
 65   XX=XM
      XM=G(1)
C----GET SAMPLES---------------------------------------------------
 66   IF(XM.LT.-NX)XM=-NX               ;MIN X = SCREEN LEFT
      IF(XX.LT.NX)XX=-NX                ;MAX X = SCREEN RIGHT
      D=(XX-XM)*DX                      ;FIND DELTA X
      X=XM=XM+D                         ;ADJUST XMIN
      XX=XX-D                           ;ADJUST XMAX
      DD 67 I=1,3                       ;FOR EACH X SAMPLE
      IF(I.EQ.2)X=XX                    ;XMAX ON PASS 2
      IF(I.EQ.3)X=(XM+XX)/2             ;XCENTER ON PASS 3
      CALL REMAP(0)                     ;GET QUADRICS
      C0=(A(1)*X+A(4)*F+A(6)*Z)*X+(A(3)*Z+A(5)*F)*Z+A(2)*F*F
      B0=-(A(7)*X+A(8)+A(9)*Z)/2
      D=B0*B0-C0
      IF(D.LT.0)D=0
      D=SQRT(D)
      IF(IQ.IQ.0)D=-D                   ;INSIDE UPPER SHEET OF HYPERBOLOID
      SA(I,1)=B0+D
      XD-X/SA(I,1)
      YD=F/SA(I,1)
      ZD=Z/SA(I,1)
      XN=2*A(1)*XD+A(4)*YD+A(6)*ZD+A(7)
```

```
        YN=2*A(2)*YD+A(4)*XD+A(5)*ZD+A(8)/F
        ZN=2*A(3)*ZD+A(5)*YD+A(6)*XD+A(9)
        SD=1/SQRT(XD*XD+YD*YD+ZD*ZD)
        SN=1/SQRT(XN*XN+YN*YN+ZN*ZN)
        IF(IQ.EQ.0)SN=-SN                   ;QUADRIC COEFFICIENTS WERE NEGATED
        SA(I,2)=(XN*VL(1)+YN*VL(2)+ZN*VL(3))*SN  ;N*L SAMPLE
        SA(I,3)=(XD*VL(1)+YD*VL(2)+ZD*VL(3))*SD  ;E*L SAMPLE
        SA(I,4)=(XD*XN+YD*YN+ZD*ZN)*SD*(SN+SN)   ;2*E*N SAMPLE
67      CONTINUE
        DO 68 K=1,4
68      CALL ISC(SA(1,K),SA(2,K),SA(3,K),XM,XX,E(J,1,K),E(J,2,K),
            E(J,3,K))
69      CONTINUE
        SD=SD*F
        VN(N)=W*SD                          ;CUTOFF FREQUENCY
        IF(ITP.EQ.0)VN(N)=-VN(N)*SA(3,4)/2;INCLUDE HYP.SLANT
        CALL REMAP(4)
        DO 70 K=1,4
        DO 70 J=1,3
70      CALL ISC(E(1,J,K),E(2,J,K),E(3,J,K),Z1,Z2,SC(1,J,K,N),SC(2,J,K,N),
            SC(3,J,K,N))
        CALL REMAP(1)                       ;GET CURVE COEFFICIENTS
        IF(IQ.EQ.0)FM(N)=C(5,1,N)=1
        IF(IQ.EQ.0)GO TO 71
        CALL ITB(L,(N-1)*7,IT)              ;IT=CO FOR LIMB
        FM(N)=IT*C(4,1,N)**2+C(3,1,N)*(C(3,1,N)*C(1,1,N)-C(4,1,N)*
            C(2,1,N))
        FM(N)=(FM(N)/(C(2,1.N)**2-4*IT*C(1,1,N))+C(5,1,N))
        IF(ITP.EQ.0)FM(N)=-FM(N)*DZ/SD
        IF(FM(N).NE.0)FM(N)=1/FM(N)
71      CALL REMAP(0)
72      L(1)=N                              ;SAVE ACTUAL # OF OBJECTS IN WINDOW
        SUBROUTINE BPM3
        OVERLAY VOL3
        COMMON M(16384)
        INTEGER COLON(192),XLOV,XLN1.XRN1
        INTEGER XL(192),XR(192),NAOB(192),LAP(5,192),NT(96),IP(6,14,192)
        DIMENSION TR(640),TEXT(25,28),B(3,7,192),AL(192),BE(192)
        DIMENSION VN(192),C(5,7,192),V(2,21,189),TN(192),PT(194),FM(192)
        DIMENSION S(3,3,4,192),CX(3,4),IPL(3,192),LINE(981),E(3),RS(3,3)
        EQUIVALENCE (S,M),(IP,M(31)),(V,M(498)),(FM,M(13525)),(C,M(85))
        EQUIVALENCE (NVL,M(14244)),(NSC,M(14243)),(H,M(14241)),
            (SKY,M(14239))
        EQUIVALENCE (G,M(14237)),(CO,M(14235)),(VN,M(13851)),
            (TEXT,M(12451))
        EQUIVALENCE (TN,M(12053)),(PT,M(11665)),(NT,M(11569)),
            (KB,M(11472))
        EQUIVALENCE (KG,M(11375)),(KR,M(11278)),(IPL,M(10702)),(B,M(346))
        EQUIVALENCE (NB,M(82)),(AMB,M(76)),(RS,M(34)),(F,M(8)),(E,M(2))
        EQUIVALENCE (AL,M(13825)),(BE,M(14209))
        STATIC LINE/2049,4096,22528,26628,110007K,0,0,120007K,972*0,8192/
        STATIC SR(640),SG(640),SB(640)
        NZ=NSC
        NX=NVL
        COFG=CO/F/E(3)
        COFS=CO/F/H
        LINE(6)=112360K-NSC                 ;VERTICAL SCROLL
        LINE(7)=114500K-NVL                 ;HORIZONTAL SCROLL
        IF(NSC.EQ.120)LINE(8)=122007K
        IF(NSC.EQ.60)LINE(8)=124007K
        IF(NSC.EQ.30)LINE(8)=126007K        ;ZOOM X 8
        CALL DWRT(LINE,8)                   ;SET PLOTTING MODE
        LINE(1)=0                           ;PGP SELECT
        LINE(2)=377K                        ;GROUP 0 ENABLE MASK (RED)
        LINE(3)=LINE(330)=LINE(657)=24000K  ;X0=0
        LINE(5)=LINE(332)=LINE(659)=61200K  ;640 PIXELS/SCAN LINE
        LINE(329)=10377K                    ;GROUP 1 ENABLE MASK (GREEN)
```

```
         LINE(654)=10000K                ;GROUP 1 DISABLE MASK
         LINE(656)=20377K                ;GROUP 2 ENABLE MASK (BLUE)
C        CALL ERASE                      ;ERASE THE SCAN CONVERTER SCREEN
         DD 132 LIN=NSC-1,-NSC,-1        ;FOR EACH SCAN LINE
         FLIN=LIN                        ;FLOAT Z
         XYZ=RS(1,2)*F+RS(1,3)*FLIN:XS FACTOR
         YYZ=RS(2,2)*F+RS(2,3)*FLIN:YS FACTOR
         ZYZ=RS(3,2)*F+RS(3,3)*FLIN:ZS FACTOR
         LINE(4)=LINE(331)=LINE(658)=30357K-LIN;GET START Z ON SCREEN
         DO 81 N=1,192                   ;FOR EACH OBJECT
         XL(N)=LAP(1,N)=32767            ;INITIALIZE INTERCEPT SORT LIST
         COLON(N)=0                      ;CLEAR OBJECT #S
         DO 80 L=2,5
80       LPA(L,N)=0                      ;CLEAR OBJECT #S
81       NAOB(N)=192                     ;SET ACTIVE LIST TO LAST OBJECT
         DO 82 L=321-NVL,320+NVL         ;FOR EACH POINT
         TR(L)=1                         ;INITIALIZE TRANSLUCENCE BUFFER
82       SR(L)=SG(L)=SB(L)=0             ;CLEAR THE LINE
         DO 97 N=1,M(1)                  ;DO FOR EACH OBJECT
         NBN=BYTE(NB,N-1)-1              ;GET # OF BOUNDS FOR OBJECT N
         LI=1                            ;INITIALIZE LIST ENTRY POINTER
         CALL REMAP(3)                   ;GET VISIBILITY LIST WINDOW
         IF(LIN.GT.IP(1,LI,N))GO TO 97   ;SCAN LINE ABOVE ENTRY
83       IF(IP(2,LI,N).NE.0)GO TO 84
         IP(1,1,N)-NZ-1                  ;PUSH FINISHED OBJECTS BELOW WINDO
         GO TO 97                        ;CONTINUE WITH NEXT OBJECT
84       LI=LI+1                         ;NEXT LIST ENTRY
         IF(LIN.LT.IP(1,LI,N))GO TO 83   ;NEXT Z BAND
         LI=LI-1                         ;SCAN LINE IN CURRENT Z BAND
         K=-1                            ;INITIALIZE HOR COUNT
85       K=K+1                           ;NEXT INTERCEPT
         CALL REMAP(3)                   ;GET VISIBILITY LIST
         CALL PARSE(IP(2,LI,N),K,IT,ID)  ;NEXT INTERCEPT DATA
         CALL REMAP(0)                   ;
         IF(K.EQ.0)GO TO 87              ;CALCULATE XL(N)
         IF(ID.EQ.0)GO TO 86             ;DONE WITH SCAN LINE INTERCEPTS
                                                FOR N
         IDS=ID                          ;SAVE ID
         ITS=IT                          ;SAVE IT
         GO TO 85                        ;TRY AGAIN
86       X=NX
         IF(IT.NE.0)GO TO 93             ;PAINT SURFACE IT TO SCREEN RIGHT
         ID=IDS                          ;GET LAST ID
         IT=ITS                          ;GET LAST IT
         IF(K.EQ.1.AND.ID.EQ.0)GO TO 93
87       IF(K.NE.0.OR.IT.EQ.0.OR.IT.EQ.8)GO TO 88
         IDS=ID
         ITS=IT
         X=-NX
         GO TO 93
88       IF(IT.GT.7)GO TO 90             ;LINE ID
         IL=1                            ;LEFT SIDE OF CURVE
         IF(ID.GT.8)IL=0                 ;RIGHT SIDE OF CURVE
         IF(ID.GT.8)ID=ID-8              ;REMOVE RIGHT SIDE FLAG
         IT=ID                           ;XION PLANE #
         CALL REMAP(1)                   ;COEFFICIENT SPACE
         CALL ITB(M,7*N+ID-8,IR)         ;IR=C0(J,N)
         B0=-(C(2,ID,N)*FLIN+C(3,ID,N))/2
         C0=-((C(1,ID,N)*FLIN+C(4,ID,N))*FLIN+C(5,ID,N))
         CALL REMAP(0)                   ;GET VISIBILITY LIST WINDOW
         IF(IR.EQ.0)GO TO 89             ;PARABOLIC CASE
         C0=C0+B0*B0                     ;DISCRIMINANT
         IF(C0.LT.0)C0=0                 ;AVOID PRECISION SLOP
         C0=SQRT(C0)
         IF(IL.EQ.0)C0=-C0               ;RIGHT SIDE
         X=B0-C0                         ;INTERCEPT X
         GO TO 93
```

```
89      IF(B0.EQ.0)GO TO 85            ;NO LINE
        X=-C0/(B0+B0)                  ;INTERCEPT X
        GO TO 93
90      IT=IT-8                        ;REMOVE LINE FLAG FROM SURFACE #
        K1=L=0                         ;INITIALIZE COUNTERS
        DO 91 J=1,NBN                  ;FOR EACH CURVE
        DO 91 I=J,NBN                  ;FOR EACH LINE
        K1=K1+1                        ;NEXT LINE #
        IF(I.NE.J)L=L+1                ;NEXT XLINE #
91      IF(L.EW.ID)GO TO 92            ;K FOUND
92      CALL REMAP(2)                  ;VISIBILITY LINE SPACE
        X-V(1,K1,N)*FLIN-V(2,K1,N)     ;XION LINE/SCAN LINE INTERCEPT
93      CALL REMAP(0)                  ;
        IR=X                           ;INTEGERIZE X
        IF(X.LT.-32767)IR=-NVL         ;CLIP TO WINDOW
        IF(X.GT.32767)IR=NVL
        IF(IT.EQ.0)IT=J+1              ;XION PLANE # FOR LEFT XL
        T0=-(B(1,IT,N)*X+B(2,IT,N)+B(3,IT,N)*FLIN)
        IF(K.NE.0)GO TO 94
        IF(X.GT.NVL)GO TO 97           ;NOT IN WINDOW
        XL(N)=IR                       ;GET LEFT MOST POINT OF OBJECT
        T1=X
        T2=T0
        GO TO 85                       ;LOOK FOR RIGHT MOST SIDE
94      IF(X.LT.-NVL)GO TO 97          ;DO NEXT OBJECT (NOT IN WINDOW)
        XR(N)=IR                       ;GET RIGHT MOST SIDE OF OBJECT
        IF(XL(N).GE.XR(N))GO TO 97     ;DO NEXT OBJECT (<2 PIXELS)
        CALL REMAP(4)
        AL(N)=T0=(T0-T2)/(X-T1)
        BE(N)=T1=T2-T0*T1
        N1=N                           ;GET OBJECT NUMBER
        N2=0                           ;INITIALIZE ACTIVE LIST POINTER
95      X=XL(N1)                       ;GET LEFT INTERCEPT
        IF(X.GT.NX)GO TO 97            ;DO NEXT OBJECT
96      N2=N2+1                        ;POINT TO NEXT ACTIVE OBJECT
        IF(X.GE.XL(NAOB(N2)))GO TO 96  ;GET LEFT INTERCEPT
        N3=NAOB(N2)                    ;SAVE OLD OBJECT #
        NAOB(N2)=N1                    ;PUT NEW OBJECT # IN ITS PLACE
        N1=N3                          ;BUMP STACK
        GO TO 95                       ;CONTINUE
97      CALL REMAP(0)                  ;GET # OF OBJECTS WINDOW
C-------------------------------------------------------------------------
        IF(NAOB(1).EQ.192)GO TO 127    ;NO OBJECTS ON SCAN LINE
        N3=1                           ;INITIALIZE STACK POINTER
        XRMIN=32767                    ;MIN XR IN COL
        K=NCOL=0                       ;AOL PTR & #OBJ IN COL
        XLOV=-NVL                      ;XL OF OVLP=SCRN LFT
98      K=K+1                          ;INDEX NEXT ACTIVE OB
        N1=NAOB(K)                     ;GET OBJECT #
        KTST=191-N1
        IF(KTST.LT.0)GO TO 105         ;OBJ # > MAX
        XLN1=XL(N1)                    ;X LEFT
        XRN1=XR(N1)                    ;X RT
99      IF(XLN1.GT.XLOV)GO TO 105      ;NEXT AOL OBJ NOT IN OVLP
        IF(XRN1.GE.XRMIN)GO TO 100
        XRMIN=XRN1                     ;UPDATE XRMIN & OBJ #
        NOXRMIN=N1
100     ICOL=1                         ;COL INDEX
        IF(NCOL.EQ.0)GO TO 103         ;IF COL EMPTY ADD N1
C INSERT OBJ N1 IN COL IN DEPTH SORT
        N2=COLON(ICOL)
        XS=(XRMIN+XLOV)*.5             ;MID PT FOR DEPTH TEST
101     CALL REMAP(4)                  ;GET SAMPLED COEFFICIENTS
        WT=(AL(N1)-AL(N2))*XS+BE(N1)-BE(N2)
        CALL REMAP(0)
        IF(WT.LE.0)GO TO 104
        DO 102 J=NCOL,ICOL,-1          ;PUSH DN COL OBJS BEYOND N1
```

```
102 COLON(J+1-COLON(J)
103 COLON(ICOL)=N1                        ;INSERT OBJ N1
    NCOL=NCOL+1                           ;UPDATE COL #
    GO TO 98                              ;DONE INSERTING N1
104 ICOL=ICOL+1                           ;DEPTH TEST NEXT COL OBJ
    IF(ICOL.GT.NCOL)GO TO 103             ;INSERT AT END
    N2=COLON(ICOL)
    GO TO 101
105 LAP(1,N3)=XLOV                        ;XL FOR OVLP
    DO 106 L=1,8
106 BYTE(LAP(2,N3),L-1=COLON(L)           ;SAVE FIRST 8 OBJECTS
    N3=N3+1                               ;NEXT OVLP #
    IF(KTST.LT.0)GO TO 107                ;AOL DONE
    IF(XLN1.GE.XRMIN)GO TO 107            ;XRMIN NEXT
    XLOV=XLN1                             ;XLN1 NEXT
    GO TO 99
107 XLOV=XRMIN                            ;START NEXT OVLP AT XRMIN
    IF(XLOV.GE.NVL)GO TO 113              ;END OF SL?
108 DO 109 I=1,NCOL                       ;FIND XRMIN OBJ
109 IF(COLON(I).EQ.NOXRMIN)GO TO 110
110 DO 111 J=I,NCOL                       ;CLOSE UP COL
111 COLON(J)=COLON(J+1)
    NCOL=NCOL-1
    YS=XRMIN                              ;SAVE FOR DUPL TEST
    NOXRMIN=COLON(1)
    XRMIN-XR(NOXRMIN)                     ;FIND NEW XRMIN
    DO 112 I=2,NCOL
    IR=COLON(I)
    IF(XR(IR).GE.XRMIN)GO TO 112
    XRMIN=XR(IR)
    NOXRMIN=IR
112 CONTINUE
    IF(YS.EQ.XRMIN)GO TO 108              ;DELETE DUPL. XRMINS
    IF(KTST.GE.0)GO TO 99                 ;AOL NOT DONE
    GO TO 105                             ;AOL DONE
C------------------------------------------------------------------
113 N3X=N3                                ;SAVE STACK LENGTH
    DO 126 KK=0,7                         ;FOR EACH PASS
    DO 125 N3=1,N3X                       ;FOR EACH OVERLAP BAND
    IX=LAP(1,N3)                          ;GET STARTING X
    IF(IX.LT.-NVL)IX=-NVL                 ;CLIP TO LEFT OF SCREEN
    N=BYTE(LAP(2,N3),KK)                  ;GET OBJECT # TO PAINT
    IF(N.EQ.0)GO TO 125                   ;NO OBJECT TO PAINT
    CALL REMAP(3)                         ;GET VISIBILITY LIST
    LI=1                                  ;INITIALIZE LIST ENTRY POINTER
    IF(LIN.GT.IP(1,LI,N))GO TO 125        ;SCAN LINE ABOVE ENTRY
114 LI=LI+1                               ;NEXT LIST ENTRY
    IF(LIN.LT.IP(1,LI,N))GO TO 114        ;NEXT Z BAND
    LI=LI-1                               ;SCAN LINE IN CURRENT Z BAND
    K=-1                                  ;INITIALIZE HOR COUNT
115 CALL REMAP(3)                         ;GET VISIBILITY LIST
    K=K+1                                 ;NEXT INTERCEPT
    CALL PARSE(IP(2,LI,N),K,IT.ID)        ;NEXT INTERCEPT DATA
    CALL REMAP(1)                         ;GET LIMB CURVE COEFFS.
    RL=C(2,1,N)*FLIN+C(3,1,N)
    CL=(C(1,1,N)*FLIN+C(4,1,N))*FLIN+C(5,1,N)
    CALL REMAP (0)                        ;
    IF (ID.NE.0)GO TO 116                 ;CONTINUE
    IF(IT.EQ.0)GO TO 125                  ;DO NEXT BAND
    X=NVL                                 ;SCREEN RIGHT IS END OF SURFACE
    GO TO 121                             ;DONE HERE
116 IF(IT.GT.7)GO TO 118                  ;LINE ID
    IL=1                                  ;LEFT SIDE OF CURVE
    IF(ID.GT.8)IL=0                       ;RIGHT SIDE OF CURVE
    IF(ID.GT.8)ID=ID-8                    ;REMOVE RIGHT SIDE FLAG
    CALL REMAP(1)                         ;COEFFICIENT SPACE
    FN=FM(N)                              ;SAVE THRESHOLD FACTOR FOR LATER
```

```
      CALL ITB(M,7*N+ID-8,IR)              ;IR=C0(J,N)
      B0=-(C(2,ID,N)*FLIN+C(3,ID,N))/2
      C0=-((C(1,ID,N)*FLIN+C(4,ID,N))*FLIN+C(5,ID,N))
      CALL REMAP(0)                        ;GET VISIBILITY LIST WINDOW
      IF(IR.EQ.0)GO TO 117                 ;PARABOLIC CASE
      C0=C0+B0*B0                          ;DISCRIMINANT
      IF(C0.LT.0)C0=0                      ;AVOID PRECISION SLOP
      C0=SQRT(C0)
      IF(IL.EQ.0)C0=-C0                    ;RIGHT SIDE
      X=B0-C0
      GO TO 121
117   IF(B0.EQ.0)GO TO 115                 ;NO LINE
      X=-C0/(B0+B0)
      GO TO 121
118   IT=IT-8                              ;REMOVE LINE FLAG FROM SURFACE #
      K1=L=0                               ;INITIALIZE COUNTERS
      NBN=BYTE(NB,N-1)-1                   ;GET # OF BOUNDS FOR OBJECT N
      DO 119 J=1,NBN                       ;FOR EACH CURVE
      DO 119 I=J,NBN                       ;FOR EACH LINE
      K1=K1+1                              ;NEXT LINE #
      IF(I.NE.J)L=L+1                      ;NEXT XLINE #
119   IF(L.EQ.ID)GO TO 120                 ;K FOUND
120   CALL REMAP(2)                        ;VISIBILITY LINE SPACE
      X=-V(1,K1,N)*FLIN-V(2,K1,N)          ;XION LINE/SCAN LINE INTERCEPT
121   IR=X
      IF(X.LT.-32767)IR=-NX
      IF(X.GT.32767)IR=-NX
      IF(IR.LE.IX)GO TO 115                ;SURFACE OCCULTED
      CALL REMAP(4)                        ;GET SAMPLED COEFFICIENTS
      DO 122 N1=1,4
      DO 122 N2=1,3
122   CX(N2,N1)=(S(1,N2,N1,N)*FLIN+S(2,N2,N1,N))*FLIN+S(3,N2,N1,N)
      CALL REMAP (0)                       ;GET PLANE INTENSITIES
      INT=BYTE(NT,N-1)                     ;TEXTURE # FOR OBJECT
      WT=PT(N)                             ;% TEXTURE FOR OBJECT
      T0=TEXT(1,INT)
      T1=TEXT(2,INT)
      T2=TEXT(3,INT)
      DO 124 L=IX,IR                       ;DO ACROSS SURFACE
      FL=L                                 ;FLOAT X
      IF(L.GE.NVL)GO TO 126                ;OFF SCREEN, TRY NEXT PASS
      LX=L+321
      TRN=TN(N)                            ;TRANSLUCENCE OF OBJECT N
      IF(TR(LX).LE.0)GO TO 124
      SINT=0                               ;BLACK BACKGROUND
      IF(IT.EQ.1)SINT=(CX(1,2)*FL+CX(2,2))*FL+CX(3,2);DIFFUSE INTENSITY
      IF(IT.GT.1)SINT=BYTE(IPL(1,N).IT-2)/255.
      IF(SINT.LT.0)SINT=0                  ;CLIP TO 0
      IF(SINT.GT.1)SINT=1                  ;CLIP TO 1
      IT(WT.LE.0)GO TO 123                 ;NO TEXTURING
      IF(IT.EQ.1)TL=1/((CX(1,1)*FL+CX(2,1))*FL+CX(3,1))
      IF(IT.GT.1)TL=-1/(B(1,IT,N)*FL+B(2,IT.N)+B(3,IT,N)*FLIN)
      XS=((RS(1,1)*FL+XYZ)*TL+E(1))
      YS=((RS(2,1)*FL+YYZ)*TL+E(2))
      ZS=((RS(3,1)*FL+ZYZ)*TL+E(3))
      CALL TEXTURE (XS,YS,ZS,INT,VN(N),SXT)
      TRN=TRN+1-T2*(SXT-(1-((FL+BL)*FL+CL)*FN)*T1-T0)
      IF(TRN.LT.0)TRN=0                    ;FULLY OPAQUE
      IF(TRN.GT.1)TRN=1                    ;FULLY TRANSPARENT
      SINT=SINT+WT*(SXT-SINT)              ;SHADING + TEXTURING
123   IF(SINT.LT.0)SINT=0
      SINT=AMB+(1-AMB)*SINT
      IF(L.GE.LAP(1,N3+1))GO TO 125 ;START NEXT OVERLAP INTERVAL
      CTR=TR(LX)*(1-TRN)*SINT
      SR(LX)=SR(LX)+CTR*BYTE(KR,N-1)
      SG(LX)=SG(LX)+CTR*BYTE(KG,N-1)
      SB(LX)=SB(LX)+CTR*BYTE(KB,N-1)
```

```
124   TR(LX)=TR(LX)*TRN              ;UPDATE TRANSLUCENCE BUFFER
      IX=IR                          ;ENDPOINT WILL BE NEXT STARTPOINT
      GO TO 115
125   CONTINUE
126   CONTINUE
127   IF(PT(193).LT.0)GO TO 130      ;SKIP BACKGROUND
      DO 129 L=-NVL,NVL-1            ;FOR EACH PIXEL
      FL=L                           ;FLOAT X
      LX=L+321
      IF(TR(LX).LE.0)GO TO 129       ;DONT BOTHER WITH BACKGROUND
      CL=0
      GPL=RS(3,1)*FL+ZYZ             ;GROUND PLANE INTERCEPT
      INT=1                          ;GROUND PLANE TEXTURE
      IF(GPL.GE.0)INT=2              ;SKY PLANE TEXTURE
      IF(PT(192+INT).LE.0)GO TO 128
      COF+COFC
      IF(INT.EQ.2)COF=COFS
      COF=COF*GPL*GPL
      TL=-F(3)/GPL                   ;DISTANCE TO GROUND PLANE
      IF(GPL.GE.0)TL=H/GPL           ;DISTANCE TO SKY PLANE
      XS=((RS(1,1)*FL+XYZ)*TL+E(1))
      YS=((RS(2,1)*FL+YYZ)*TL+E(2))
      CALL TEXTURE(XS,YS,0,INT,COF,SXT);TEXTURE THE BACKGROUND
      IF(INT.EQ.1)GO TO 128
      TRN=1-TEXT(3,2)*(SXT-TEXT(1,2));CLOUD THRESHOLD
      IF(TRN.LT.0)TRN=0
      IF(TRN.GT.1)TRN=1
      CL=255*TR(LX)*(1-TRN)*(SKY+PT(194)*(SXT-SKY) ;CLOUD INTENSITY
      TR(LX=TR(LX)*TRN
128   SINT=SKY                       ;SKY INTENSITY
      IF(INT.EQ.1)SINT=G+PT(193)*(SXT-G) ;GROUND PLANE SHADE & TEXTURE
      CTR=TR(LX)*SINT
      SR(LX)=SR(LX)+CTR*BYTE(KR,191+INT)+CL
      SG(LX)=SG(LX)+CTR*BYTE(KG,191+INT)+CL
      SB(LX)=SB(LX)+CTR*BYTE(KB,191+INT)+CL
129   CONTINUE
130   DO 131 L-320-NVL,319+NVL       ;FOR EACH PIXEL
      INT=SR(L+1)                    ;INTEGERIZE INTENSITY
      IF(INT.LT.0)INT=0              ;CLIP TO BLACK
      IF(INT.GT.255)INT=255          ;CLIP TO WHITE
      BYTE(LINE(6),L)=INT            ;PACK PIXEL RED INTENSITY
      INT=SG(L+1)                    ;INTEGERIZE INTENSITY
      IF(INT.LT.0)INT=0              ;CLIP TO BLACK
      IF(INT.GT.255)INT=255          ;CLIP TO WHITE
      BYTE(LINE(333),L)=INT          ;PACK PIXEL GREEN INTENSITY
      INT=SB(L+1)                    ;INTEGERIZE INTENSITY
      IF(INT.LT.0)INT=0              ;CLIP TO BLACK
      IF(INT.GT.255)INT=255          ;CLIP TO WHITE
131   BYTE(LINE(660),L)=INT          ;PACK PIXEL BLUE INTENSITY
C     CALL PLOT(LINE(6))             ;PLOT LINE ON SCAN CONVERTER
132   CALL DWRT(LINE,981)            ;PLOT LINE ON FRAME BUFFER
RT              810  D

SUBROUTINE RT(N)
      COMMON M(16384)
      DIMENSION E(3), D(6),T(6),RS(3,3),R(3,3),S(3,3)
      EQUIVALENCE (E,M(2)),(D,M(10)),(T,M(22)),(RS,M(34)),(R,M(52))
      IF(N.NE.0)GO TO 1              ;SKIP EYEPOINT ASSIGNMENT
      E(1)=D(4)
      E(2)=D(5)
      E(3)=D(6)
1     T(1)=COS(.01745329*D(1))
      T(2)=COS(.01745329*D(2))
      T(3)=COS(.01745329*D(3))
      T(4)=COS(.01745329*D(1))
      T(5)=COS(.01745329*D(2))
      T(6)=COS(.01745329*D(3))
```

```
      S(1,1)=T(1)*T(3)-T(4)*T(5)*T(6)
      S(2,1)=T(1)*T(6)-T(3)*T(4)*T(5)
      S(3,1)=-T(2)*T(4)
      S(1,2)=-T(2)*T(6)
      S(2,2)=T(2)*T(3)
      S(3,2)=T(5)
      S(1,3)=T(3)*T(4)+T(1)*T(5)*T(6)
      S(2,3)=T(4)*T(6)+T(1)*T(3)*T(5)
      S(3,3)=T(1)*T(2)
      IF(N.NE.0)GO TO 3
      DO 2 I=1,3
      DO 2 J=1,3
2     RS(I,J)=S(I,J)
      RETURN
3     DO 4 I=N,3
      T(I)=S(1,I)*(E(1)-D(4))+S(2,I)*(E(2)-D(5))+S(3,I)*(E(3)-D(6))
      DO 4 J=1,3
4     R(I,J)=RS(1,J)*S(1,I)+RS(2,J)*S(2,I)+RS(3,J)*S(3,I)
      SUBROUTINE VTEST(Z,X,N,J1,I1,K1)
      COMMON L(16384)
      DIMENSION XL(10),V(2,21,189),B(3,7,192)
      EQUIVALENCE (V,L(498)),(NX,L(14244)),(NZ,L(14243))
      EQUIVALENCE (B,L(346)),(IB,L(178)),(NB,L(82)),(XL,L(11))
      STATIC KL,X1,X2
      IF(K1.EQ.0)KL=0
      CALL REMAP(0)                    ;IB,NB
      NBN=BYTE(NB,N-1)                 ;SAVE NBN ON STACK
      IF(B(1,J1,N)*X+B(2,J1,N)+B(3,J1,N)*Z.GT.0)GO TO 7;-LAMBDA TO POINT
      IF(NBN.LE.1)GO TO 3              ;NO BOUNDS = >NO TESTS
      CALL ITB(IB,1,LEX)               ;GET LIMB FLAG
      IF(J1.GT.1)CALL ITB(IB,J1+J1-2,IJ) ;PLANE J INVIS.
      IF(I1.GT.1)CALL ITB(IB,I1+I1-2,II) ;PLANE I INVIS.
      K=M=0
      DO 2 J=2,NBN                     ;FOR EACH BOUND
      DO 2 I=J,NBN                     ;DO FOR EACH XING PLANE
      K=K+1                            ;NEXT LINE #
      CALL ITB(IB,I+I-2,ITC)           ;BOUNDARY SIDE
      IF(I.EQ.I1.OR.I.EQ.J1)CALL ITB(IB,J+J-2,ITC);SWITCH BOUNDARY
      IF(I.NE.J.AND.((I.LE.I1.AND.J.EQ.J1).OR.J.LT.J1))M=M+1;XL COUNT
      IF(LEX.EQ.0.AND.I.EQ.J)GO TO 2   ;NO LIMB = >NO V LINES
      IF(J1.LE.1.AND.I1.LE.1.AND.I.EQ.J)GO TO 1;LIMB XTRM
      IF(J1.GT.1.AND.I1.LE.1.AND.I.EQ.J.AND.J.EQ.J1.AND.ITC.NE.0)GO TO 1
      IF(J1.LE.1.AND.I1.LE.1.AND.(I.EQ.J1.XOR.J.EQ.J1))GO TO 1
      IF(J1.GT.1.AND.I1.GT.1.AND.(I.EQ.I1.XOR.J.EQ.I1))GO TO 1
      IF(J1.GT.1.AND.I1.GT.1.AND.((I.EQ.I1.OR.I.EQ.J1).XOR.(J.EQ.I1.
     OR.J.EQ.J1)))GO TO 1
      IF(J1.GT.1.AND.I1.GT.1.AND.I.EQ.J.AND.(I.EQ.I1.OR.I.EQ.J1).AND.
     IJ+II.EQ.2)GO TO 1
      GO TO 2
1     CALL REMAP(2)                    ;V LINE SPACE
      CALL ITB(L,42*N+K+K-43,IC)       ;V(X)
      T=V(1,K,N)*Z+V(2,K,N)+IG*X       ;X,Z VS. V LINE(K)
      E=.0039*(ABS(V(1,K,N))+IG)       ;PRECISION TOLERANCE
      CALL ITB(L,42*N+K+K-44,IG)       ;GET SENSE OF LINE
      IF(ITC.NE.IG)T=-T                ;FLIP FROM LINE NORMALIZATION
      IF((I.EQ.I1.OR.I.EQ.J1).AND.I.NE.J)T=-T;FLIP FOR SKEW SYMMETRY
      IF(J1.NE.1.AND.I.EQ.J)T=-T       ;FLIP IF XION/VIS LINE
      T=T+E                            ;ADD IN TOLERANCE
      IF(T.LT.0.AND.K1.EQ.0)Z=-32767   ;FLAG Z THAT FAILS
      IF(T.LT.0)GO TO 6                ;POINT NOT VISIBLE
2     CALL REMAP(0)                    ;BACK TO NB,IB
3     IF(ABS(Z).GT.NZ)GO TO 6          ;POINT OUT OF WINDOW
      IF(K1.NE.0)GO TO 6               ;MID BAND TEST
C     IF(ABS(X).GT.NX)GO TO 6          ;POINT OUT OF WINDOW
      CALL SORT(Z)                     ;Z SORT OF KEY POINTS
      GO TO 6                          ;FINISHED
4     IF(I1.GT.0)M=128+M               ;CODE FOR XL PLOT
```

```
        IF(I1.LE.0)M=J1-I1*8             ;CODE FOR CURVE PLOT
        CALL REMAP(3)                    ;GET VISIBILITY LIST
        DO 5 /I=1,10                     ;FOR EACH INTERCEPT
        IF(X.EQ.1E70)GO TO 6             ;DONE FLAG
        IF(X.GT.XL(I))GO TO 5            ;KEEP SEARCHING
        T=XL(I)                          ;SWAP
        XL(I)=X                          ;REPLACE OLD WITH NEW
        X=T                              ;BUMP REMAINING SLOTS
        IT=L(I)                          ;SAVE ID
        L(I)=M                           ;UPDATE ID AS WELL
        M=IT                             ;SWAP IDS
5       CONTINUE                         ;
6       CALL REMAP(1)                    ;CURVE COEFFICIENT WINDOW
        RETURN
7       IF(K1.EQ.0)GO TO 6               ;NOT MIDBAND TEST
        IF(KL.EQ.K1)GO TO 71
        KL=KL
        X1=X2=0
71      M=J1
        IF(I1.LE.0)GO TO 9
        M=128                            ;INITIALIZE LINE COUNT
        DO 8 J=2,NBN                     ;
        DO 8 I=0+1,NBN                   ;
8       IF((1.LE.I1.AND.J.EQ.J1).OR.J.LT.J1)M=M+1;INCREMENT LINE COUNT
9       CALL REMAP(3)
        IF(X.GT.0.AND.X.GT.X1)GO TO 10
        IF(X.GT.0.OR.X.GE.X2)GO TO 6
        X2=X
        L(10)=M
        GO TO 6
10      X1=X
        L(16191)=M
        GO TO 6
SORT            404 D

SUBROUTINE SORT(Z)
        COMMON L(16384)
        DIMENSION IZL(32)
        EQUIVALENCE (IZL,L(16159))
        IZ=Z                             ;FIX Z
        CALL REMAP(3)                    ;GET VISIBILITY LIST
        DO 1 I=1,32                      ;FOR EACH SLOT
        IF(IZ.EQ.IZL(I))GO TO 2          ;ALREADY IN LIST
        IF(IZ.LT.IZL(I))GO TO 1          ;TRY NEXT SLOT
        J=IZL(I)                         ;SAVE OLD Z
        IZL(I)=IZ                        ;REPLACE OLD Z WITH NEW
        IZ=J                             ;SLIDE OLD VALUES DOWN ONE SLOT
1       CONTINUE
2       CALL REMAP(1)                    ;DONE, RETURN TO ENTRY WINDOW
SIC             127 D

SUBROUTINE ISC(V1,V2,V3,P1,P2,C1,C2,C3)
        P3=1/(P1-P2)
        C1=2*(V1+V2-2*V3)*P3*P3
        C2=(V1-V2)*P3-C1*(P1+P2)
        C3=V1-P1*(C1*P1+C2)
TXTRN                   2642 D

TITLE TXTR
        XTN .BLAN
        .EXTD .BYTR SIN22?3
        NS=12436.
        TEXT=12456.
        DEFARGS
        DEF XT
        DEF YT
        DEF ZT
```

```
      DEF  N
      DEF  WMAX
      DEF  SXT
      DEFTMPS
      DEF  NSIN
      DEF  SX (2)
      DEF  SY (2)
      DEF  SXI (2)
      DEF  SYI (2)
      DEF  ZF (2)
      DEF  PZI (2)
RPI:  0.31830989            ;1/PI
      FENTRY TEXTURE
      LDA       1 @N 3      ;GET FUNCTION #
      SBI       1 1         ;DECREMENT
      ELEF      2 .BLAN     ;GET START ADDRESS OF COMMON
      ADDI      NS 2        ;GET ADDRESS OF NS ARRAY
      JSR       @.BYTR      ;READ NS(N)
      STA       0 NSIN 3    ;SAVE IT
      LDA       1 @N 3      ;GET FUNCTION # AGAIN
      SBI       1 1         ;DECREMENT
      ELEF      2 50.       ;ARRAY DIMENSION
      ELEF      0 .BLAN     ;GET ADDRESS OF COMMON
      MUL                   ;2*(25.*(N-1))+0
      ADDI      TEXT 1      ;STARTING ADDRESS OF TEXTURE DATA
                                BLOCK
      MOV       1 2         ;PUT IN INDEX REGISTER
      FLDS      3 @XT 3     ;GET XT
      FAMS      3 0 2       ;XT+XPH
      FLDS      2 @YT 3     ;GET YT
      FAMS      2 2 2       ;YT+YPH
      FLDS      1 4 2       ;GET TOFF
      FSTS      1 SX 3      ;SX=TOFF
      FSTS      1 SY 3      ;SY=TOFF
      FLDS      0 @ZT 3     ;GET ZT
      FMMS      0 8. 2      ;WPX*ZT
      FSTS      0 ZF 3      ;WPZ*ZT
      FLDS      0 RPI       ;1/PI
      FMMS      0 16. 2     ;W0=WX/PI
      FMOV      0 1         ;COPY IT
      FMS       3 0         ;W0*XT
      JSR       @SIN22?3    ;WIN(W0*XT)
      FSTS      0 SXI 3     ;SAVE SUM
      FMOV      1 0         ;GET W0 AGAIN
      FMS       2 0         ;W0*YT
      JSR       @SIN22?3    ;SIN(W0*YT)
      FSTS      0 SYI 3     ;SAVE SUM
      ELEF      0 16.       ;WX DISPLACEMENT
      STA       0 A-1       ;SETUP WX FETCH
      STA       0 B-1       ;SETUP WX FETCH
      STA       0 C-1       ;SETUP WX FETCH
      ELEF      1 30.       ;CX DISPLACEMENT
      STA       1 D-1       ;SETUP CX FETCH
      STA       1 CX-1      ;SETUP CX FETCH
LOOP: FLDS      1 @WMAX 3   ;GET CUTOFF FREQUENCY
      FLDS      0 16. 2     ;GET WX(I)
A:    FCMP      1 0         ;TEST WX
      FSLE                  ;WX(I)WMAX?
      JMP       PAST        ;YES BAIL OUT
      FMMS      0 10. 2     ;WY(I)
      FCMP      1 0         ;TEXT WY
      FSLE                  ;WY(I) >WMAX?
      JMP       PAST        ;YES, BAIL OUT
      FLDS      1 12. 2     ;GET PX
      FMMS      1 SXI 3     ;PX*SXI
      FMS       2 0         ;WY*YT
      FAS       0 1         ;WY*YT+PX*SXI
```

```
        FLDS       0 16. 2              ;GET WX(I)
B:      FMMS       0 ZF 3               ;WZ(I)*ZT
        JSR        @SIN22?3             ;SIN(WZ*ZT)
        FMMS       0 6 2                ;PZ*SIN(WZ*ZT)
        FSTS       0 PZI 3              ;Z PHASE SHIFT
        FAS        1 0                  ;WY*YT+PX*SXI+PZ*SZI
        JSR        @SIN22?3             ;SIN(WY*YT+PX*SXI+PZ*SZI)
        FLDS       1 12. 2              ;GET PX AGAIN
        FMMS       1 SYI 3              ;PX*SYI
        FSTS       0 SYI 3              ;UPDATE YI SUM
        FLDS       0 16. 2              ;GET WX(I) AGAIN
C:      FMS        3 0                  ;WX*XT
        FAS        1 0                  ;WX*XT+PX*SYI
        FAMS       0 PZI 3              ;WX*XT+PX*SYI+PZ+SZI
        JSR        @SIN22?3             ;SIN(WX*XT+PX*SYI+PZ*SZI)
        FSTS       0 SXI 3              ;UPDATE XI SUM
        FMMS       0 30. 2              ;CX(I)*SXI
D:      FAMS       0 SX 3               ;ADD TO X SUM
        FSTS       0 SX 3               ;SAVE SUM
        FLDS       0 SYI 3              ;GET YI SUM
        FMMS       0 30. 2              ;CS(I)*SYI
CX:     FAMS       0 SY 3               ;ADD TO Y SUM
        FSTS       0 SY 3               ;SAVE SUM
        ADI        2 0                  ;INCREMENT DISPLACEMENT
        STA        0 A-1                ;
        STA        0 B-1                ;
        STA        0 C-1                ;
        ADI        2 1                  ;INCREMENT DISPLACEMENT
        STA        1 D-1                ;
        STA        1 CX-1               ;
        DSZ        NSIN 3               ;LAST FREQUENCY?
        JMP        LOOP                 ;NOT YET
PAST:   FLDS       0 SY 3               ;GET SY
        FMMS       0 SX 3               ;SX*SY
        FMMS       0 14. 2              ;SCX*SX*SY
        FSTS       0 @SXT 3             ;RETURN SXT TO MAIN
        FRET
        END
```

APPENDIX B

TABLE D - System Routines for Off-Line System

```
0001 CIG     MACRO REV 06.50                     12:23:30  04/14/82
01                      TITLE CIG
                           .TITLE CIG    :RDOS ECLIPSE FORTRAN 5
03                      DEFARGS
04                      DEF A
05                      DEF B
06                      DEF C
07                      DEF D
08                      DEFTMPS
09                      .ENT SQRT COS SIN INIT .BYTW .BYTR SOVL .F5
                           R.UTS SM.SW
10                      .ENT SYST TMIN SQR22?3 COS22?3 SIN22?3 .RWND
                           BYTR .IATT
11                      .ENT BYTE .TURD .TACC .FRDR .FRDI .IURD .FWRS
                           .IACC
12                      .ENT .FOPE ERROR .SOV .SSE .FP .SP .NCAL IOSTK
                        LOC .LOCT
AB
13                      .EXTN USTAD I.SP I.SSE .AFTER .MAIN
14                      .EXTU
15      177777          R.UTS=-1
16      177777          SM.SW=-1
17      106070          .NCAL=106070
18          ;           USTAD=400
19      000017          .LOC 17
```

```
20  00017 000047'              SYST
21        000040                .LOC  40
22  00040 077777 .SP:          I.SP              ;STACK POINTER
23  00041 000000 .FP:          0                 ;FRAME POINTER
24  00042 077777 .SSE:         I.SSE             ;STACK END POINTER
25  00043 000000-.SOV:         SOVL              ;STACK OVERFLOW ROUTINE POINTER
26                              .ZREL
27  00000-172070 SOVL:         ELEF  2 112       ;STACK OVERFLOW ERROR CODE
28        000112
29  00002-006017 ERROR:        .SYSTM            ;SYSTEM CALL
30  00003-006400                .ERTN            ;ERROR RETURN TO CLI
31  00004-000004-               .                ;WAIT HERE IF ERROR OCCURS
32  00005-000211'.IATT:        STATR             ;SET ATTRIBUTE MASK
33  00006-000216'.FOPE:        OPEN
34  00007-000142-.IACC:        INIT
35  00010-000227'.FWRS:        PROMPT
36  00011-000257'.IURD:        READ
37  00012-000263'.FRDI:        READI
38  00013-000267'.FRDR:        READR
39              .TACC:
40  00014-000472'.TURD:        TERM
41  00015-000506'.RWND:        REWIND
42  00016-000517'SIN22?3:      SIN
43  00017-000520'COS22?3:      COS
44  00020-000543'SQR22?3:      SQRT
45  00021-000631'.BYTW:        BYTE
46  00022-000637'.BYTR:        BYTR
47  00023-000000 MINUS         0                 ;NEGATIVE # FLAG
48  00024-000000 DP:           0                 ;DECIMAL PART FLAG
49  00025-000000 FIRST:        0                 ;FIRST CHARACTER FLAG
50  00026-000000 EFORM:        0                 ;E FORMAT FLAG
51  00027-000000 MANT:         0.0               ;E FORMAT # TEMP
52        000000
53  00031-000103 IOSTK:        .BLK  67.         ;INPUT STACK
54  00134-000062=INSTP:        IOSTK*2           ;BYTE POINTER TO INPUT STACK
                                                        CHARACTERS
55  00135-000000 RETRY:        0                 ;ACCEPT INPUT ERROR RECOVERY
                                                        ADDRESS
56  00136-000000 PUT:          0                 ;VARIABLE ARRAY POINTER FOR
                                                        INPUT #
57  00137-000000 LENGTH:       0                 ;ARRAY LENGTH
58  00140-000000 TALK:         0                 ;ACCEPT FLAG
59  00141-000000 REAL:         0                 ;REAL ARGUMENT FLAG
60  00142-010140 INIT:         ISZ   TALK        ;SET CONVERSATIONAL MODE FLAG
   0002 CIG
01  00143-001400               JMP   0 3         ;RETURN
02  00144-000000 FMSK:         0                 ;FILE ATTRIBUTE MASK
03  00145-001066'LOC:          LOCMG             ;LOAD ON CALL MANAGER
04        000405                .LOC  405
05  00405 000012'              TMIN
06  00422 003002                .REV  6,2
07                              .NREL
08  00000'100001'DCT:          @.+1              ;DMA DEVICE CONTROL TABLE
09  00001'000000               0                 ;DUMMY FOR RTOS
10  00002'000150               150               ;PRIORITY MASK
11  00003'000004'              .+1               ;INTERRUPT SERVICE
12  00004'102520               SUBZL 0 0         ;GET 1
13  00005'142470               ESTA  0 FLAG      ;SET INTERRUPT FLAG
14        000676
15  00007'101140               MOVOL 0 0         ;GET 3
16  00010'103510               SVC               ;SVC(3) = RETURN FROM USER
                                                        INTERRUPT
17                       ;TASK/SYSTEM CALL HANDLER
18  00011'000047'              SYST              ;SYSTEM CALL HANDLER ADDRESS
19  00012'032433 TMIN:         LDA   2 @TCB      ;TASK CONTROL BLOCK POINTER
20  00013'025005               LDA   1 5 2       ;GET TASK STATUS
21  00014'125132               MOVZL #1 1 SZC    ;SYSTEM?
```

```
22  00015'000424            JMP   USER           ;NO
23  00016'021001            LDA   0 1 2          ;YES, RESTORE AC0
24  00017'025002            LDA   1 2 2          ;AC1
25  00020'035010            LDA   3 10 2         ;GET USP
26  00021'054016            STA   3 16           ;SAVE USP
27  00022'034001            LDA   3 1            ;GET INTAD
28  00023'175234            MOVZR #3 3 SZR       ;SYSTEM SPACE?
29  00024'000406            JMP   PST            ;YES
30  00025'035004            LDA   3 4 2          ;RESTORE AC3
31  00026'031003            LDA   2 3 2          ;RESTORE AC2
32  00027'020415            LDA   0 SIX          ;GET CODE 6
33  00030'127510            SCL                  ;SUPERVISOR CALL
34  00031'060202            NIOC  ERCC           ;
35  00032'035000  PST:      LDA   3 0 2          ;GET RETURN+CARRY
36  00033'175220            MOVZR 3 3            ;RESTORE CARRY
37  00034'054407            STA   3 RET          ;SAVE RETURN
38  00035'035004            LDA   3 4 2          ;RESTORE AC3
39  00036'031003            LDA   2 3 2          ;RESTORE AC2
40  00037'060177            INTEN                ;ENABLE INTERRUPTS
41  00040'002403            JMP   @RET           ;RETURN
42  00041'152400  USER:     SUB   2 2            ;CLEAR AC2
43  00042'000435            JMP   CALL           ;
44  00043'000000  RET:      0                    ;RETURN SAVE LOCATION
45  00044'000006  SIX:      6                    ;CODE 6
46  00045'000014  TCB:      .GADD USTAD 14       ;TASK CONTROL BLOCK POINTER
47  00046'000000  T3:       0                    ;TEMP SAVE
48  00047'054777  SYST:     STA   3 T3           ;SAVE CALL POINTER
49  00050'034001            LDA   3 1            ;GET INTAD
50  00051'175014            MOV   #3 3 SZR       ;SYSTEM SPACE?
51  00052'060277            INTDS                ;YES, DISABLE INTERRUPTS
52  00053'175015            MOV   #3 3 SNR       ;NO, FLAG SET?
53  00054'010001            ISZ   1              ;NO, SET IT
54  00055'036770            LDA   3 @TCB         ;TCB POINTER
55  00056'041401            STA   0 1 3          ;SAVE AC0
56  00057'045402            STA   1 2 3          ;SAVE AC1
57  00060'051403            STA   2 3 3          ;SAVE AC2
58  00061'171000            MOV   3 2            ;SWITCH POINTER TO INDEX 2
59  00062'034041            LDA   3 .FP          ;GET AC3
60  00063'055004            STA   3 4 2          ;SAVE AC3
    0003 CIG
01  00064'034762            LDA   3 T3           ;GET CALL POINTER
02  00065'024016            LDA   1 16           ;GET USP
03  00066'045010            STA   1 10 2         ;SAVE USP
04  00067'025400            LDA   1 0 3          ;GET CALL NAME
05  00070'045006            STA   1 6 2          ;SAVE CALL NAME
06  00071'175400            INC   3 3            ;POINT TO ERROR RETURN
07  00072'175500            INCL  3 3            ;POINT TO NORMAL RETURN, SHIFT
                                                  IN CARRY
08  00073'055000            STA   3 0 2          ;SAVE RETURN PC + CARRY
09  00074'025005            LDA   1 5 2          ;GET STATUS
10  00075'127240            ADDOR 1 1            ;COMPLEMENT SYSTEM BIT (BIT 0)
11  00076'045005            STA   1 5 2          ;SAVE STATUS
12  00077'034001  CALL:     LDA   3 1            ;GET INTAD
13  00100'175234            MOVZR #3 3 SZR       ;SYSTEM SPACE?
14  00101'002002            JMP   @2             ;YES, GO TO SYSTEM CALL HANDLER
15  00102'141000            MOV   2 0            ;NO, PASS TCB TO SYSTEM
16  00103'103510            SVC                  ;SUPERVISOR CALL
17  00104'060202            NIOC  ERCC
18                          ;FORTRAN INITIALIZER
19  00105'006017  .F5:      .SYSTM               ;SYSTEM CALL
20  00106'001400            .MEM                 ;DETERMINE AVAILABLE MEMORY
21  00107'000002-           ERROR                ;ERROR RETURN
22  00110'131000            MOV   1 2            ;COPY NMAX
23  00111'176070            ELEF  3 .AFTER       ;GET FIRST FREE ADDRESS
24         077777
25  00113'156415            SUB#  2 3 SNR        ;IS NMAX = FIRST FREE ADDRESS?
26  00114'030040            LDA   2 .SP          ;YES, GET STACK ADDRESS
```

```
27   00115'176070          ELEF   3 31.       ;GET 31
28        000037
29   00117'157000          ADD    2 3         ;GET MINIMAL STACK END
30   00120'162433          SUBZ#  3 0 SNC     ;DOES STACK SIZE OVERFLOW
                                               MEMORY?
31   00121'000000-         JMP    SOVL        ;YES, GET STACK OVERFLOW
                                               ROUTINE
32   00122'122400          SUB    1 0         ;NO, GET CHANGE IN NMAX
33   00123'101400          INC    0 0         ;OFFSET ADDRESS
34   00124'006017          .SYSTM             ;SYSTEM CALL
35   00125'011000          .MEMI              ;CHANGE NMAX
36   00126'000002-         ERROR              ;ERROR RETURN
37   00127'167770          ADDI   -23. 1      ;CREATE 23 WORD END ZONE
38        177751
39   00131'044042          STA    1 .SSE      ;SET STACK END
40   00132'173770          ADDI   15. 2       ;UNDERFLOW PADDING
41        000017
42   00134'050040          STA    2 .SP       ;SET STACK POINTER
43   00135'162070          ELEF   0 63        ;GET DACV1 DEVICE CODE
44        000063
45   00137'006017          .SYSTM             ;SYSTEM CALL
46   00140'021031          .DEBL              ;ENABLE THE DEVICE CODE
47   00141'000002-         ERROR              ;ERROR RETURN
48   00142'162070          ELEF   0 76        ;GET FPU DEVICE CODE
49        000076
50   00144'006017          .SYSTM             ;SYSTEM CALL
51   00145'021031          .DEBL              ;ENABLE THE DEVICE CODE
52   00146'000002-         ERROR              ;ERROR RETURN
53   00147'162070          ELEF   0 37        ;PGP DEVICE CODE
54        000037
55   00151'024627          LDA    1 DCT       ;PGP DEVICE CONTROL TABLE
56   00152'172070          ELEF   2 5         ;4K WORDS OF DMA BUFFER
57        000005
58   00154'006017          .SYSTM             ;SYSTEM CALL
59   00155'021007          .IDEF              ;DEFINE THE PGP INTERRUPT
60   00156'000002-         ERROR              ;ERROR RETURN
0004 CIG
01   00157'102400          SUB    0 0         ;CLEAR AC0
02   00160'040144-         STA    0 FMSK      ;DEFAULT FILE ATTRIBUTE MASK
03   00161'162470          ELEF   0 DEV10     ;GET "$TTI"
04        000024
05   00163'166470          ELEF   1 ZERO      ;CHANNEL 0
06        000024
07   00165'006006-         JSR    @ FOPE      ;OPEN FILE "$TTI" ON CHANNEL 0
08   00166'147350          FTD                ;DISABLE FPU TRAPS
09   00167'153350          FCLE               ;CLEAR FPU STATUS
10   00170'162070          ELEF   0 96.       ;96KW OF EXTENDED MEMORY
11        000140
12   00172'166070          ELEF   1 1         ;START WINDOW ON WORD 1024
13        000001
14   00174'172070          ELEF   2 16.       ;16KW IN WINDOW
15        000020
16   00176'006017          .SYSTM             ;SYSTEM CALL
17   00177'021067          .MAPDF             ;DEFINE THE MAP
18   00200'000002-         ERROR              ;ERROR RETURN
19   00201'106070          EJSR   .MAIN       ;CALL MAIN FORTRAN PROGRAM
20        077777
21   00203'006017          .SYSTM             ;SYSTEM CALL
22   00204'004400          .RTN               ;RETURN TO CLI
23   00205'000002-         ERROR              ;ERROR RETURN
24   00206'022124 DEV10:   '$T
25   00207'052111          'TI
26   00210'000000 ZERO:    0
27                 ;SET FILE ATTRIBUTES MASK
28   00211'130710 STATR:   XCH    1 2         ;SWAP ACS
29   00212'031000          LDA    2 0 2       ;GET MASK
30   00213'050144-         STA    2 FMSK      ;SAVE MASK
```

```
31   00214'144710              XCH    2 1         ;SWAP ACS
32   00215'001400              JMP    0 3         ;RETURN
33                        ;OPEN THE FILE
34                              FENTRY OPEN
35
36   00216'163710              SAVE   ?RSV?+?TMP?+?BK?      ;ALLOCATE TEMPS
37        000000
38   00220'101120              MOVZL 0 0          ;BYTE POINTER TO FILENAME
39   00221'033775              LDA    2 @-3 3     ;GET CHANNEL #
40   00222'024144-             LDA    1 FMSK      ;GET FILE ATTRIBUTES MASK
41   00223'006017              .SYSTM             ;SYSTEM CALL
42   00224'014077              .OPEN 77           ;OPEN THE CHANNEL
43   00225'000002-             .ERROR             ;ERROR RETURN
44   00226'127710              FRET               ;RETURN
45                        ;WRITE STRING, READ A LINE
46                              FENTRY PROMPT
47
48   00227'163710              SAVE   ?RSV?+?TMP?+?BK?      ;ALLOCATE TEMPS
49        000000
50   00231'021777              LDA    0 -1 3      ;GET RETURN ADDRESS
51   00232'140110              SBI    3 0         ;DECREMENT BY 3
52   00235'040135-             STA    0 RETRY     ;SAVE REPEAT ADDRESS
53   00234'125120              MOVZL 1 1          ;BYTE POINTER TO TEXT STRING
54   00235'122710              LDB    1 0         ;GET BYTE FROM STRING
55   00236'101005              MOV    0 0 SNR     ;IS BYTE A NULL?
56   00237'000406              JMP    .+6         ;YES, END OF PROMPT
57   00240'006017              .SYSTM             ;NO, SYSTEM CALL
58   00241'010000              .PCHAR             ;PRINT A CHARACTER
59   00242'000002-             ERROR              ;ERROR RETURN
60   00243'125400              INC    1 1         ;NEXT BYTE
0005 CIG
01   00244'000771              JMP    .-7         ;CONTINUE
02   00245'152400              SUB    2 2         ;CHANNEL # 0 FOR $TTO
03   00246'162070              ELEF   0 IDSTK     ;GET STACK ADDRESS
04        000031-
05   00250'101120              MOVZL 0 0          ;BYTE POINTER TO START OF INPUT
                                                   STACK
06   00251'040134-             STA    0 INSTP     ;SET INPUT STACK POINTER TO
                                                   START
07   00252'126400              SUB    1 1         ;CLEAR TRANSFERRED BYTE COUNT
08   00253'006017              .SYSTM             ;SYSTEM CALL
09   00254'015477              .RDL   77          ;READ A LINE
10   00255'000002-             ERROR              ;ERROR RETURN
11   00256'127710              FRET               ;RETURN
12                        ;READ A LINE
13                              FENTRY READ
14
15   00257'163710              SAVE   ?RSV?+?TMP?+?BK?      ;ALLOCATE TEMPS
16        000000
17   00261'033775              LDA    2 @-3 3     ;GET CHANNEL #
18   00262'000764              JMP    .-12.       ;READ A LINE
19                        ;READ INTEGER (ARRAY)
20                              FENTRY READI
21
22   00263'163710              SAVE   ?RSV?+?TMP?+?BK?      ;ALLOCATE TEMPS
23        000000
24   00265'102440              SUB    0 0         ;CLEAR REAL FLAG
25   00266'000404              JMP    .+4         ;SKIP NEXT ENTRY
26                        ;READ REAL (ARRAY)
27                              FENTRY READR
28
29   00267'163710              SAVE   ?RSV?+?TMP?+?BK?      ;ALLOCATE TEMPS
30        000000
31   00271'102520              SUBZL  0 0         ;SET REAL FLAG
32   00272'156253              ADCOR#2 3 SNC      ;ARRAY?
33   00273'152521              SUBZL 2 2 SKP      ;NO, SET LENGTH TO 1
34   00274'033773              LDA    2 @A 3      ;YES, GET LENGTH FROM STACK
```

```
35  00275'040141-            STA    0 REAL     ;SAVE REAL FLAG
36  00276'044136-            STA    1 PUT      ;SAVE STORAGE ADDRESS
37  00277'050137-            STA    2 LENGTH   ;SAVE STORAGE LENGTH
38  00300'102400 AGAIN:      SUB    0 0        ;CLEAR AC0
39  00301'040026-            STA    0 EFORM    ;CLEAR E FORMAT FLAG
40  00302'124250             FSS    1 1        ;CLEAR ACC
41  00303'102520             SUBZL  0 0        ;GET 1
42  00304'116450             FLAS   0 3        ;FLOAT IT
43  00305'040025-            STA    0 FIRST    ;SET FIRST CHARACTER FLAG
44  00306'163770 NINE:       ADDI   9. 0       ;GET 10
45       000011
46  00310'112450             FLAS   0 2        ;FLOAT 10. INTO FPAC 2
47  00311'102400             SUB    0 0        ;CLEAR AC
48  00312'040023-            STA    0 MINUS    ;CLEAR MINUS FLAG
49  00313'040024-            STA    0 DP       ;CLEAR DP FLAG
50  00314'020134- IGNOR:     LDA    0 INSTP    ;GET BYTE POINTER TO STACK
51  00315'102710             LDB    0 0        ;GET NEXT CHARACTER OFF STACK
52  00316'010134-            ISZ    INSTP     ;ADVANCE STACK BYTE POINTER
53  00317'172070             ELEF   2 "E              ;GET "E"
54       000105·
55  00321'112405             SUB    0 2 SNR   ;IS CHARACTER "E"?
56  00322'000434             JMP    EXPO      ;YES, PROCESS EXPONENT NEXT
57  00323'172070             ELEF   2 "-      ;NO, GET "-"
58       000055
59  00325'112415             SUB#   0 2 SNR   ;IS CHARACTER "-"?
60  00326'000445             JMP    NEGATE    ;YES; SET MINUS FLAG
0006 CIG
01  00327'151400             INC    2 2       ;NO, GET "."
02  00330'112415             SUB#   0 2 SNR   ;IS CHARACTER "."?
03  00331'000450             JMP    FRACT     ;YES; SET . POSITION
04  00332'130010             ADI    2 2       ;NO, GET "0"
05  00333'142423             SUBZ   2 0 SNC   ;IS CHARACTER < "0"?
06  00334'000467             JMP    ENDIT     ;YES, END INPUT
07  00335'030752             LDA    2 NINE+1  ;NO, GET 9
08  00336'112433             SUBZ#  0 2 SNC   ;IS # > 9?
09  00337'000464             JMP    ENDIT     ;YES, END INPUT
10  00340'152400             SUB    2 2       ;CLEAR AC
11  00341'050025-            STA    2 FIRST   ;CLEAR FIRST CHARACTER FLAG
12  00342'102450             FLAS   0 0       ;FLOAT DIGIT
13  00343'030024-            LDA    2 DP      ;GET FRACTION FLAG
14  00344'151004             MOV    2 2 SZR   ;FRACTION?
15  00345'000404             JMP    .+4       ;YES, SKIP TO FRACTIONAL SUM
16  00346'144450             FMS    2 1       ;NO, 10.*AC INTO AC
17  00347'104050             FAS    0 1       ;ADD IN NEW DIGIT
18  00350'000744             JMP    IGNOR     ;GET NEXT CHARACTER
19  00351'154450             FMS    2 3       ;FRACTION. GET WEIGHTING FACTOR
20  00352'164450             FMS    3 1       ;WEIGHT PARTIAL FRACTION
21  00353'104050             FAS    0 1       ;ADD IN NEW DIGIT
22  00354'164650             FDS    3 1       ;RESCALE RESULT
23  00356'000737             JMP    IGNOR     ;GET NEXT CHARACTER
24  00356'030025-EXPO:       LDA    2 FIRST   ;GET FIRST CHARACTER FLAG
25  00357'151004             MOV    2 2 SZR   ;FIRST CHARACTER?
26  00360'000432             JMP    NG        ;YES, INVALID CHARACTER
27  00361'030026-            LDA    2EFORM    ;NO, GET E FORMAT FLAG
28  00362'151004             MOV    2 2 SZR   ;ALREADY E FORMAT?
29  00363'000427             JMP    NG        ;YES, INVALID CHARACTER
30  00364'010026-            ISZ    EFORM     ;NO, SET E FORMAT FLAG
31  00365'014023-            DSZ    MINUS     ;MINUS FLAG SET?
32  00366'010023-            ISZ    MINUS     ;NO, CLEAR MINUS FLAG AND SKIP
33  00367'167050             FNEG   1         ;YES, NEGATE #
34  00370'106250             FSTS   1 MANT    ;SAVE #
35       000027-
36  00372'000710             JMP    AGAIN+2   ;GET NEXT CHARACTER
37  00373'014025-NEGATE:     DSZ    FIRST     ;FIRST CHARACTER?
38  00374'010025-            ISZ    FIRST     ;NO, CLEAR FLAG AND SKIP
39  00375'000402             JMP    .+2       ;SKIP
40  00376'000414             JMP    NG        ;INVALID CHARACTER
```

```
41  00377'010023-           ISZ   MINUS        ;SET MINUS FLAG
42  00400'000714            JMP   IGNOR        ;GET NEXT CHARACTER
43  00401'030026-FRACT:     LDA   2 EFORM      ;GET E FORMAT FLAG
44  00402'151004            MOV   2 2 SZR      ;E FORMAT?
45  00403'000407            JMP   NG           ;YES, INVALID CHARACTER
46  00404'030024-           LDA   2 DP         ;GET DP FLAG
47  00405'151004            MOV   2 2 SZR      ;DP FLAG SET?
48  00406'000404            JMP   NG           ;YES, INVALID CHARACTER
49  00407'010024-           ISZ   DP           ;NO, SET DP FLAG
50  00410'050025-           STA   2 FIRST      ;CLEAR FIRST CHARACTER FLAG
51  00411'000703            JMP   IGNOR        ;GET NEXT CHARACTER
52  00412'034041 NG:        LDA   3 .FP        ;GET FRAME POINTER
53  00413'031776            LDA   2 -2 3       ;GET STACK POINTER
54  00414'050040            STA   2 .SP        ;RESTORE STACK POINTER
55  00415'020140-           LDA   0 TALK       ;GET CONVERSATIONAL FLAG
56  00416'01004             MOV   0 0 SZR      ;CONVERSATIONAL MODE?
57  00417'002135-           JMP   @RETRY       ;YES, REPEAT FROM PROMPT DOWN
58  00420'172070            ELEF  2 30         ;FILE DATA ERROR CODE
59       000030
60  00422'000002-           ERROR              ;ERROR RETURN
    0007 CIG
01  00423'030028-ENDIT:     LDA   2 FIRST      ;GET FIRST CHARACTER FLAG
02  00424'151004            MOV   2 2 SZR      ;FIRST CHARACTER?
03  00425'000667            JMP   IGNOR        ;YEST, IGNORE IT
04  00426'030026-           LDA   2 EFORM      ;GET EXPONENT FLAG
05  00427'151005            MOV   2 2 SNR      ;E FORMAT?
06  00430'000421            JMP   DONE-3       ;NO, CHECK SIGN
07  00431'102520            SUBZL 0 0          ;GET 1
08  00432'116450            FLAS  0 3          ;FLOAT IT INTO FRAC 3
09  00433'106650            FFAS  0 1          ;PUT EXPONENT IN AC0
10  00434'106050            FLDS  1 MANT       ;GET #
11       000027-
12  00436'100405            NEG   0 0 SNR      ;-EXPONENT, = 0?
13  00437'000415            JMP   DONE         ;YES, EXPONENT = 0
14  00440'154450            FMS   2 3          ;NO, INCREASE WEIGHT FACTOR BY
                                                 10.
15  00441'101404            INC   0 0 SZR      ;ENOUGH WEIGHT?
16  00442'000776            JMP   .-2          ;NOT YET
17  00443'014023-           DSZ   MINUS        ;MINUS EXPONENT?
18  00444'000403            JMP   .+3          ;NO POSITIVE
19  00445'164650            FDS   3 1          ;YES, DIVIDE # BY WEIGHT
20  00446'000406            JMP   DONE         ;FINISHED HERE
21  00447'164450            FMS   3 1          ;MULTIPLY BY WEIGHT
22  00450'000404            JMP   DONE         ;FINISHED HERE
23  00451'014023-           DSZ   MINUS        ;MINUS FLAG SET?
24  00452'010023-           ISZ   MINUS        ;NO, CLEAR MINUS FLAG AND SKIP
25  00453'167050            FNEG  1            ;YES, NEGATE VALUE
26  00454'020141-DONE:      LDS   0 REAL       ;GET REAL FLAG
27  00455'101004            MOV   0 0 SZR      ;REAL #?
28  00456'000405            JMP   .+5          ;YES
29  00457'106650            FFAS  0 1          ;NO, INTEGERIZE IT
30  00460'042136-           STA   0 @PUT       ;RETURN READ VALUE
31  00461'010136-           ISZ   PUT          ;NEXT STORAGE ADDRESS
32  00462'000405            JMP   .+5          ;SKIP FLOATING POINT STORAGE
33  00463'106250            FSTS  1 @PUT       ;RETURN FLOATING POINT VALUE
                                                 READ
34       100136-
35  00465'010136-           ISZ   PUT          ;NEXT STORAGE ADDRESS
36  00466'010136-           ISZ   PUT          ;DOUBLE WORD FOR REAL STORAGE
37  00467'014137-           DSZ   LENGTH       ;LAST VALUE FOR ARRAY?
38  00470'000610            JMP   AGAIN        ;NO, START ON NEXT #
39  00471'127710            FRET               ;RETURN
40                          ;TERMINATE READING
41                          FENTRY TERM
42
43  00472'163710            SAVE  ?RSV?+?TM?+?BK?          ;ALLOCATE TEMPS
44       000000
```

```
45  00474'126400            SUB    1 1            ;0
46  00475'044140-           STA    1 TALK         ;CLEAR CONVERSATIONAL MODE FLAG
47  00476'044031-           STA    1 IOSTK        ;CLEAR FIRST WORD OF INPUT
                                                   STACK
48  00477'167770            ADDI   67.1           ;LENGTH OF INPUT STACK
49        000103
50  00501'172070            ELEF   2 IOSTK        ;START ADDRESS OF INPUT STACK
51        000031-
52  00503'155400            INC    2 3            ;NEXT WORD
53  00504'133710            BLM                   ;CLEAR STACK
54  00505'127710            FRET                  ;RETURN
55                     ;REWIND THE FILE
56                          FENTRY REWIND
57
58  00506'163710            SAVE   ?RSV?+?TM?+?BK?       ;ALLOCATE TEMPS
59        000000
60  00510'033775            LDA    2 @-3 3        ;GET CHANNEL #
0008 CIG
01  00511'102400            SUB    0 0            ;CLEAR AC0
02  00512'126400            SUB    1 1            ;DEFAULT MASK
03  00513'006017            .SYSTM                ;SYSTEM CALL
04  00514'023477            .SPOS  77             ;SET FILE POINTER POSITION TO 0
05  00515'000002-           ERROR                 ;ERROR RETURN
06  00516'127710            FRET                  ;RETURN
07                     ;TRIG. FUNCTIONS
08  00517'137750  SIN:      FSINS                 ;COMPUTE SINE
09  00520'157750  COS:      FCOSS                 ;COMPUTE COSINE
10  00521'040424            1.27324
11        057460
12  00523'137024            -0.0003187280
13        161536
14  00525'037500            7720165712D    ;0.0158499
15        165712
16  00527'140116            30023572343D   ;-0.308424
17        172343
18  00531'040377            10077777777D   ;1.0
19        177777
20  00533'136445            27511331137D   ;-0.00003595043
21        131137
22  00535'037243            7650627511D    ;0.002490001
23        027511
24  00537'140024            -0.0807455
25        125674
26  00541'040311            10062207733D   ;0.785398
27        007733
28                     ;SQUARE ROOT
29  00543'107750  SQRT:     FSQRS
30  00544'100250            FSS    0 0            ;CLEAR ERRONEOUS RESULT
31  00545'177110            PSH    3 3            ;SAVE RETURN
32  00546'034041            LDA    3 .FP          ;RESTORE FRAME POINTER
33  00547'117710            POPJ                  ;RETURN
34                     ;REMAPPING TASK CALL
35                          FENTRY REMAP
36
37  00550'163710            SAVE   ?RSV?+?TMP?+?BK?      ;ALLOCATE TEMPS
38        000000
39  00552'027773            LDA    1 @A 3         ;GET REMAP START BLOCK
40  00553'125300            MOVS   1 1            ;SWAP BYTES
41  00554'105410            HXL    1 1            ;BLOCK # *16.
42  00555'172070            ELEF   2 16.          ;GET WINDOW OF 16 KW
43        000020
44  00557'162070            ELEF   0 9.           ;REMAP TASK CODE #
45        000011
46  00561'127510            SCL                   ;REMAP MEMORY
47  00562'000002-           ERROR                 ;ERROR RETURN
48  00563'127710            FRET                  ;NORMAL RETURN
49                     ;BIT OPERATIONS
```

```
50              ;CALL ICB(BIT ARRAY NAME.DISPLACEMENT) TO CLEAR BIT
51              ;CALL ISB(BIT ARRAY NAME.DISPLACEMENT) TO SET BIT
52              ;CALL ITB(BIT ARRAY NAME.DISPLACEMENT, FLAG) TO SET FLAG
                                = BIT
53                      FENTRY ICB
54
55  00564'163710         SAVE    ?RSV?+?TMP?+?BK?     ;ALLOCATE TEMPS
56        000000
57  00566'030422         LDA    2 I0      ;GET CLEAR BIT INSTRUCTION
58  00567'000412         JMP    REST      ;GO ON
59                       FENTRY ISB       ;GET SET BIT INSTRUCTION
60

0009 CIG
01  00570'163710         SAVE    ?RSV?+?TMP?+?BK?     ;ALLOCATE TEMPS
02        000000
03  00572'030417         LDA    2 I1      ;GET SET BIT INSTRUCTION
04  00573'000406         JMP    REST      ;GO ON
05                       FENTRY ITB
06
07  00574'163710         SAVE    ?RSV?+?TMP?+?BK?     ;ALLOCATE TEMPS
08        000000
09  00576'102460         SUBC   0 0       ;CLEAR AC0
10  00577'043771         STA    0 @C 3    ;CLEAR FLAG
11  00600;030412         LDA    2 I2      ;GET SKIP ON NONZERO BIT
                                            INSTRUCTION
12  00601'021773 REST:   LDA    0 A 3     ;GET ADDRESS
13  00602'027772         LDA    1 @B 3    ;GET DISPLACEMENT
14  00603'133370         XCT    2         ;PERFORM BIT OPERATION CALLED
                                            FOR
15  00604'127710         FRET             ;RETURN
16  00605'102520         SUBZL  0 0       ;SET AC0 to 1
17  00606'043771         STA    0 @C 3    ;SET FLAG
18  00607'127710         FRET             ;RETURN
19  00610'106110 I0:     BTZ    0 1       ;CLEAR BIT
20  00611'106010 I1:     BTO    0 1       ;SET BIT
21  00612'106770 I2:     SNB    0 1       ;SKIP ON NONZERO BIT
22              ;BYTE PACKING AND UNPACKING
23              ;       CALL PARSE(IP(2,LI,N),K,IT,ID)
24                      FENTRY PARSE
25
26  00613'163710         SAVE    ?RSV?+?TMP?+?BK?     ;ALLOCATE TEMPS
27        000000
28  00615'025773         LDA    1 A 3     ;GET ADDRESS OF ARRAY
29  00616'125120         MOVZL  1 1       ;MAKE INTO BYTE POINTER
30  00617'023772         LDA    0 @B 3    ;GET BYTE COUNT
31  00620'107000         ADD    0 1       ;DISPLACE BYTE POINTER
32  00621'123710         LDB    1 0       ;GET BYTE
33  00622'105000         MOV    0 1       ;COPY IT
34  00623'105510         HXR    1 1       ;GET HIGH NIBBLE
35  00624'047771         STA    1 @C 3    ;RETURN FOR BYTE TYPE
36  00625'143770         ANDI   15. 0     ;GET LOW NIBBLE
37        000017
38  00627'043770         STA    0 @D 3    ;RETURN FOR INTERCEPT ID
39  00630'127710         FRET
40              ;       BYTE(IP(2.M,N),K)=INTEGER EXPRESSION
41  00631'177110 BYTE:   PSH    3 3       ;SAVE RETURN ADDRESS ON STACK
42  00632'135200         MOVR   1 3       ;HALF OF BYTE COUNT
43  00633'157100         ADDL   2 3       ;BYTE POINTER
44  00634'163010         STB    3 0       ;SAVE THE BYTE (FROM AC 0)
45  00635'034041         LDA    3 .FP     ;RESTORE FRAME POINTER
46  00636'117710         POPJ             ;RETURN
47  00637'177110 BYTR:   PSH    3 3       ;SAVE RETURN ADDRESS ON STACK
48  00640'135200         MOVR   1 3       ;HALF OF BYTE COUNT
49  00641'157100         ADDL   2 3       ;BYTE POINTER
50  00642'163710         LDB    3 0       ;GET THE BYTE (INTO AC 0)
51  00643'034041         LDA    3 .FP     ;RESTORE FRAME POINTER
52  00644'117710         POPJ             ;RETURN
```

```
53                          ;PGP DRIVERS
54                                  FENTRY DWRT
55
56      00645'163710        SAVE        ?RSV?+?TMP?+?BK?         ;ALLOCATE TEMPS
57             000000
58      00647'060337        NIOP    37              ;SINGLE STEP AND HALT PGP
59      00650'162070        ELEF    0 66            ;STARTING ADDRESS FOR FNI
60             000066
0010 CIG
01      00652'063037        DOC     0 37            ;SEND OUT TO PGP PC REG
02      00653'000407        JMP     .+7             ;SKIP PAST NEXT ENTRY
03                                  FENTRY DRED
04
05      00654'163710        SAVE        ?RSV?+?TMP?+?BK?         ;ALLOCATE TEMPS
06             000000
07      00656'062237        DOBC    0 37            ;SET READBACK MODE
08      00657'000404        JMP     .+4             ;SKIP OVER ENTRY
09                                  FENTRY DWTC
10
11      00660'163710        SAVE        ?RSV?+?TMP?+?BK?         ;ALLOCATE TEMPS
12             000000
13      00662'062337        DOBP    0 37            ;SET WRITE MODE
14      00663'162070        ELEF    0 37            ;GET PGP DEVICE CODE
15             000037
16      00665'025773        LDA     1 A 3           ;GET ADDRESS FOR XFER
17      00666'033772        LDA     2@B 3           ;GET WORD COUNT FOR XFER
18      00667'150400        NEG     2 2             ;GET 2'S COMPLIMENT
19      00670'006017        .SYSTM                  ;SYSTEM CALL
20      00671'021035        .STMAP                  ;SET MAP FOR DMA XFER TO
                                                        ADDRESS
21      00672'000002-       ERROR                   ;ERROR RETURN
22      00673'065037        DOA     1 37            ;SEND ADDRESS TO PGP
23      00674'072137        DOBS    2 37            ;SEND WORD COUNT TO PGP AND
                                                        START XFER
24      00675'014407        DSZ     FLAG            ;INTERRUPT FLAG SET?
25      00676'010406        ISZ     FLAG            ;NO, TRY AGAIN
26      00677'000402        JMP     .+2             ;YES, TEST DONE FLAG
27      00700'000775        JMP     .-3             ;TRY AGAIN
28      00701'063637        SKPDN   37              ;PGP DONE?
29      00702'000777        JMP     .-1             ;NOT YET
30      00703'127710        FRET                    ;YES, RETURN
31      00704'000000 FLAG;  0                       ;INTERRUPT FLAG
32                          ;SCREEN CLEARING ROUTINE
33                          ;CALL ERASE
34                                  FENTRY ERASE
35
36      00705'163710        SAVE        ?RSV?+?TMP?+?BK?         ;ALLOCATE TEMPS
37             000000
38      00707'126620        SUBZR   1 1             ;AC1=100000
39      00710'120300        COMS    1 0             ;LOOP COUNT = 128
40      00711'060263        NIOC    63              ;CLEAR DAC REGS
41      00712'152120        ADCZL   2 2             ;-2
42      00713'151120        MOVZL   2 2             ;-4
43      00714'065063        DOA     1 63            ;SET CLEAR CYCLE
44      00715'101404        INC     0 0 SZR         ;128 LOOPS @3.8 USEC/LOOP=486
                                                        USEC?
45      00716'000776        JMP     .-2             ;NOT YET
46      00717'105000        MOV     0 1             ;RESET CLEAR BIT
47      00720'151404        INC     2 2 SZR         ;LAST LOOP (.75 SEC TIMEOUT)?
48      00721'000775        JMP     .-3             ;NOT YET
49      00722'127710        FRET
50                          ;SCAN CONVERTER PLOTTING ROUTINE
51                          ;CALL PLOT (BUFFER ADDRESS)
52      00723'117777 XMAX:  11/777
53      00724'000000 NPTS:  0
54                                  FENTRY PLOT
55
```

```
56  00725'163710              SAVE      ?RSV?+?TMP?+?BK?    ;ALLOCATE TEMPS
57       000000
58  00727'060277              INTDS                         ;DISABLE INTERRUPTS
59  00730'020426              LDA    0  BIT 2+1  ;XY ENABLE
60  00731'061063              DOA    0  63       ;OUTPUT TO SCAN CONVERTER
   0011 CIG
01  00732'035773              LDA    3  A 3      ;GET BUFFER ADDRESS
02  00733'025776              LDA    1  -2 3     ;Y POSITION
03  00734'105410              HXL    1  1        ;SCALE *16
04  00735'125220              MOVZR  1  1        ;/2
05  00736;066063              DOB    1  63       ;OUTPUT TO SCAN CONVERTER DAC-B
06  00737'030764              LDA    2  XMAX     ;FIRST X, WRITE ON, UNBLANKING
                                                  OFF
07  00740'073063              DOC    2  63       ;OUTPUT TO SCAN CONVERTER DAC-O
08  00741'020676              LDA    0  BYTR     ;TIMER FOR 360 USEC
09  00742'101404              INC    0  0 SZR    ;TIMED OUT?
10  00743'000777              JMP    .-1         ;NOT YET
11  00744'025777              LDA    1  -1 3     ;# OF PTS
12  00745'147770              ANDI   7777 1      ;NEGATE # OF POINTS
13       007777
14  00747'044755              STA    1  NPTS     ;SAVE FOR LUPE COUNT
15  00750'175120              MOVZL  3  3        ;GET BYTE POINTER TO PIXEL DATA
16  00751'162710  LUPE:       LDB    3  0        ; INTENSITY
17  00752'114010              ADI    1  3        ;INC BYTE POINTER
18  00753'101410              HXL    1  0        ;SCALE INTENSITY
19  00754'101220              MOVZR  0  0        ;SHIFT ONE BIT FOR POSITIVE #
20  00755'163770  BIT2:       ADDI   20000 0     ;NO. SET XY ENABLE
21       020000
22  00757'061063              DOA    0  63       ;OUTPUT INTENSITY AND XY ENABLE
                                                  TO SCAN CONVERTER
23  00760'173770              ADDI   20000 2     ;UNBLANKING ON
24       020000
25  00762'073063              DOC    2  63       ;OUTPUT X POS., WRITE, AND
                                                  UNBLANKING TO SCAN CONVERTER
26  00763'173770              ADDI   -20006 2    ;UNBLANKING OFF, NEXT X
27       157772
28  00765'073063              DOC    2  63       ;OUTPUT
29  00766'014736              DSZ    NPTS        ;ALL PTS DONE?
30  00767'000762              JMP    LUPE        ;NO
31  00770'067063              DOC    1  63       ;YES, WRITE AND UNBLANKING OFF
32  00771'065063              DOA    1  63       ;TURN OFF XY ENABLE
33  00772'060177              INTEN              ;ENABLE INTERRUPTS
34  00773'127710              FRET
35                     ;VIDEO DISK DRIVER
36                            FENTRY OKTEL
37
38  00774'163710              SAVE      ?RSV?+?TMP?+?BK?    ;ALLOCATE TEMPS
39       000000
40  00776'021772              LDA    0  B 3      ;GET START OF DATA
41  00777'101120              MOVZL  0  0        ;MAKE BYTE POINTER
42  01000'027771              LDA    1  @C 3     ;GET BYTE COUNT
43  01001'044703              STA    1  FLAG     ;SAVE BYTE COUNT
44  01002'126520              SUBZL  1  1        ;SEND ONE BYTE AT A TIME
45  01003'033773              LDA    2  @A 3     ;GET UNIT #
46  01004'006017              .SYSTM             ;SYSTEM CALL
47  01005'016477              .WRS   77          ;WRITE BYTE STRING
48  01006'000002-             ERROR              ;ERROR RETURN
49  01007'006017              .SYSTM             ;SYSTEM CALL
50  01010'010400              .DELAY             ;WAIT .1 SEC
51  01011'000002-             ERROR              ;ERROR RETURN
52  01012'101400              INC    0  0        ;GET NEXT BYTE
53  01013'014671              DSZ    FLAG        ;DONE WITH MESSAGE?
54  01014'000770              JMP    .-8.        ;NO, SEND NEXT BYTE
55  01015'127710              FRET
56                     ;OVERLAY MANAGER
57                     ;        CALL OVOPN(CHANNEL #)
58  01016'041517  COMCM;  'CO
```

```
59  01017'046456              'M.
60  01020'041515              'CM
 0012 CIG
01  01021'000000              0
02                            FENTRY OVOPN
03
04  01022'163710              SAVE    ?RSV?+?TMP?+?BK?   ;ALLOCATE TEMPS
05         000000
06  01024'025773              LDA     1 A 3           ;GET ADDRESS OF CHANNEL #
07  01025'033773              LDA     2 @A 3          ;GET CHANNEL #
08  01026'162470              ELEF    0 COMCM         ;GET COM.CM
09         077767
10  01030'006006-             JSR     @.FOPE          ;OPEN THE FILE
11  01031'006011-             JSR     @.IURD          ;READ THE FILE
12  01032'034134-             LDA     3 INSTP         ;GET I/O SP
13  01033'162710              LDB     3 0             ;GET BYTE OFF STACK
14  01034'114010              ADI     1 3             ;BUMP SP
15  01035'101004              MOV     0 0 SZR         ;NULL BYTE?
16  01036'000775              JMP     .-3             ;NO, REPEAT
17  01037'114110              SBI     1 3             ;YES, BACKUP SP
18  01040'162070              ELEF    0 "."           ;GET "."
19         000056
20  01042'163010              STB     3 0             ;PACK ONTO STACK
21  01043'175400              INC     3 3             ;BUMP SP
22  01044'162070              ELEF    0 "O"           ;GET "O"
23         000117
24  01046'163010              STB     3 0             ;PACK ONTO STACK
25  01047'175400              INC     3 3             ;BUMP SP
26  01050'140110              SBI     3 0             ;GET "L"
27  01051'163010              STB     3 0             ;PACK ONTO STACK
28  01052'162070              ELEF    0 IOSTK         ;GET START OF I/O STACK
29         000031-
30  01054'101120              MOVZL   0 0             ;BYTE POINTER TO I/O STACK
31  01055'006017              .SYSTM                  ;SYSTEM CALL
32  01056'014477              .CLOSE  77              ;CLOSE COM.CM
33  01057'000002-             ERROR                   ;ERROR RETURN
34  01060'050432              STA     2 FILNO+1       ;SAVE FOR LOADING
35  01061'006017              .SYSTM                  ;SYSTEM CALL
36  01062'012077              .OVOPN  77              ;OPEN THE OVERLAY FILE
37  01063'000002-             ERROR                   ;ERROR RETURN
38  01064'006014-             JSR     @.TURD          ;CLEAR THE I/O STACK
39  01065'127710              FRET                    ;RETURN
40  01066'041000  LOCMG:      STA     0 0 2           ;SAVE AC0 ON STACK
41  01067'134110              SBI     2 3             ;GET POINTER TO SHADOW
42  01070'055377              STA     3 -1 2          ;SAVE ON STACK
43  01071'021776              LDA     0 -2 3          ;GET NODE #/OVERLAY #
44  01072'100015              COM#    0 0 SNR         ;-1?
45  01073'000424              JMP     THERE           ;YES, OVERLAY NOT RESOLVED
46  01074'137110              PSH     1 3             ;SAVE ACS ON STACK
47  01075'105300              MOVS    0 1             ;COPY OVERLAY #
48  01076'030425              LDA     2 BMASK         ;GET BYTE MASK
49  01077'133400              AND     1 2             ;GET OVERLAY #
50  01100'146460              SUBC    2 1             ;GET NODE #
51  01101'153000              ADD     2 2             ;DOUBLE OVERLAY #
52  01102'153000              ADD     2 2             ;QUADRUPLE OVERLAY #
53  01103'036417              LDA     3 @OVDR         ;GET USTOD
54  01104'157000              ADD     2 3             ;GET OVERLAY STARTING ADDRESS
55  01105'031401              LDA     2 1 3           ;GET
56  01106'132415              SUB#    1 2 SNR         ;OVERLAY ALREADY LOADED?
57  01107'000407              JMP     OLD             ;YES, DONT RELOAD
58  01110'126000              ADC     1 1             ;UNCONDITIONAL LOAD
59  01111'172070  FILNO:      ELEF    2 0             ;GET FILE #
60         000000

0013 CIG
01  01113'006017              .SYSTM                  ;SYSTEM CALL
02  01114'020077              .OVLOD  77              ;LOAD OVERLAY ON AC2 CHANNEL #
```

```
03  01115'000002-            JMP    ERROR       ;ERROR RETURN
04  01116'167210  OLD:       POP    3 1         ;RESTORE ACS
05  01117'021000  THERE:     LDA    0 0 2       ;RESTORE
06  01120'007777             JSR    @-1 3       ;ENTER OVERLAY
07  01121'003376  LC.RTN:    JMP    @-2 2       ;RETURN FROM OVERLAY
08  01122'000020  OVDR:      .GADD  USTAD 20    ;OVERLAY DIRECTORY ADDRESS
                                                   (USTOD)
09  01123'000377  BMASK:     377                ;BYTE MASK
10                           .MACRO B.LOCO      ;BOOKKEEPING MACRO
11            **             .DO .PASS==0       ;ONLY ON PASS 1
12            **             .COUNT= .COUNT+1   ;COUNT THIS ROUTINE
13            **             .ENDC
14            **
15            %
                             .MACRO N.LOCO      ;NREL-CALLED LOCO ROUTINE
16            **             .DO .ARGOT<>3      ;CHECK # OF ARGS.
17            **:                               ;ERROR: WRONG # OF ARGS TO
                                                   N.LOCO
18            **             .ENDC DONE
19            **             B.LOCO             ;DO BOOKKEEPING
20            **             .ENT. ^1           ;DEFINE ENTRY POINT FOR ROUTINE
21                           ^2                 ;OVERLAY DESCRIPTION
22                           ^3                 ;TARGET ROUTINE ENTRY POINT
23            ^1:            STA    3 -2 2      ;CALL COMES HERE TO SHADOW
24                           JSR    @LOC        ; AND GOES OFF TO LOCO MANAGER
                                                   FROM HERE
25            **[DONE]
26            %
27            ;LOAD-ON-CALL TABLE
28  01124;000003 .LOCTAB:    .COUNT             ;FIRST WORD IS NUMBER OF ENTRY
                                                   SHADOWS
29                           N.LOCO EPM1        ;VOL 1   BPM1
30  01125'000001$            VOL1               ;OVERLAY DESCRIPTOR
31  01126'000004$            BPM1               ;TARGET ROUTINE ENTRY POINT
32  01127'055376  EPM1:      STA    3 -2 2      ;CALL COMES HERE TO SHADOW
33  01130'006145-            JSR    @LOC        ; AND GOES OFF TO LOCO MANAGER
                                                   FROM HERE
34                           N.LOCO EPM2        ;VOL 2   BPM2
35  01131'000002$            VOL2               ;OVERLAY DESCRIPTOR
36  01132'000005$            BPM2               ;TARGET ROUTINE ENTRY POINT
37  01133'055376  EPM2:      STA    3 -2 2      ;CALL COMES HERE TO SHADOW
38  01134'006145-            JSR    @LOC        ; AND GOES OFF TO LOCO MANAGER
                                                   FROM HERE
39                           N.LOCO EPM3        VOL3   BPM3
40  01135'000003$            VOL3               ;OVERLAY DESCRIPTOR
41  01136'000006$            .BPM3              ;TARGET ROUTINE ENTRY POINT
42  01137'055376  EPM3:      STA    3 -2 2      ;CALL COMES HERE TO SHADOW
43  01140'006145             JSR    @LOC        ; AND GOES OFF TO LOCO MANAGER
                                                   FROM HERE
44                           .END .F5
```

**00000 TOTAL ERRORS, 00000 PASS 1 ERRORS

What is claimed is:

1. A method for generating an image, said method comprising:

storing a multiplicity of parameters defining quadric and planar surfaces, said parameters being in terms of a three-axis reference coordinate system;

computing coefficients defining image plane curves from the parameters, the image plane curves being a perspective projection into an image plane of silhouette curves of the quadric surfaces, and intersections between the planar surfaces and between the planar surfaces and quadric surfaces;

transforming the stored parameters into terms of an eyepoint coordinate system having an origin at a focal point of the perspective projection and first and third axes paralleling the image plane, the coefficients being computed from the transformed parameters;

grouping the stored parameters into object lists, each object list including all of the parameters defining no more than one of the quadric surfaces and no more than a predetermined number of the planar surfaces, the parameters defining each planar surface including an inequality identification defining a half space bounded by the planar surface, such that the parameters grouped in each object list define an object lying in a conjunction of all the associated half spaces and having a boundary surface defined by the associated quadric and planar surfaces; and displaying desired portions of the image plane curves on a display means in accordance with said coefficients.

2. The method of claim 1, wherein the desired portion of the image plane curves for each object are limited to those portions related to a part of the object's boundary surface which faces a focal point of the perspective projection.

3. The method of claim 1, further comprising
   generating a set of eyepoint coordinates defining a focal point of the perspective projection and a line-of-sight normal to the image plane; and
   transforming the stored parameters into terms of an eyepoint coordinate system having an origin at the focal point of the perspective projection, first and third axes paralleling the image plane, and a second axis coincidental with the line-of-sight normal to the image plane, the coefficients being computed from the transformed parameters.

4. The method of claim 3, wherein the transformed parameters for each quadric surface include ten quadric surface coefficients from which a quadric surface equation may be written, utilizing Cartesian coordinates defining a point in terms of the eyepoint coordinate system, and the quadric surface is a locus of all the points whose Cartesian coordinates satisfy the associated quadric surface equation, and wherein the transformed parameters for each planar surface include four bounding plane coefficients and an inequality identification from which a bounding plane relation $$B_1X + B_2Y + B_3Z + B_4 \; R \; 0$$

may be written, where $B_1$ through $B_4$ are the bounding plane coefficients, R is the inequality identification, and a half space bound by the planar surface is a locus of all the points whose Cartesian coordinates satisfy the associated quadric surface equation.

5. The method of claim 4, wherein the step of computing coefficients defining image plane curves comprises computing limb curve coefficients for each quadric surface in accordance with six limb curve coefficient formulas:

$$a_1 = q_7^2 - 4q_0q_1$$

$$a_2 = q_9^2 - 4q_0q_3$$

$$a_3 = 2q_7q_9 - 4q_0q_6$$

$$a_4 = (2q_7q_8 - 4q_0q_4)f$$

$$a_5 = (2q_8q_9 - 4q_0q_5)f$$

$$a_6 = (q_8^2 - 4q_0q_2)f^2$$

where $a_1$ through $a_6$ are the limb curve coefficients, f is a distance from the focal point of the perspective projection to the image plane, $q_0$ through $q_9$ are the associated quadric surface coefficients, and the perspective projection of the silhouette curve associated with the quadric surface includes a locus of all points in the image plane satisfying an equation:

$$a_1h^2 + a_2v^2 + a_3hv + a_4h + a_5v + a_6 = 0$$

where h and v are Cartesian coordinates defining a point in terms of an image plane coordinate system having an origin at an intersection of the second eyepoint coordinate axis with the image plane, and horizontal and vertical axes paralleling the first and third eyepoint coordinate axes respectively.

6. The method of claim 4, further comprising grouping the stored parameters into object lists, each object list including all of the parameters defining no more than one of the quadric surfaces and no more than a predetermined number of the planar surfaces, such that the parameters grouped in each object list define an object lying in a conjunction of all the associated half spaces and having a boundary surface defined by the associated quadric and planar surfaces.

7. The method of claim 6, wherein the step of computing coefficients defining image plane curves further comprises computing intersection curve coefficients for each planar surface associated by one of the object lists with one of the quadric surfaces, the intersection curve coefficients being computed in accordance with six intersection curve coefficient formulas:

$$e_1 = B_4^2q_1 - B_1B_4q_7 + q_0B_1^2$$

$$e_2 = B_4^2q_3 - B_3B_4q_9 + q_0B_3$$

$$e_3 = B_4^2q_6 - B_1B_4q_9 - B_3B_4q_7 + 2B_1B_3q_0$$

$$e_4 = (B_4^2q_4 - B_2B_4q_7 - B_1B_4q_8 + 2B_1B_2q_0)f$$

$$e_5 = (B_4^2q_5 - B_2B_4q_9 - B_3B_4q_8 + 2B_2B_3q_0)f$$

$$e_6 = (B_4^2q_2 - B_2B_4q_8 + B_2^2q_0)f^2$$

where $e_1$ through $e_6$ are the intersection curve coefficients, $q_0$ through $q_9$ and $B_1$ through $B_4$ are the associated quadric and planar surface coefficients, and the perspective projection of the intersection between the planar surface and the associated quadric surface includes a locus of all points in the image plane satisfying an equation $$e_1h^2 + e_2v^2 + e_3hv + e_4h + e_5v + e_6 = 0.$$

8. The method of claim 7, wherein the step of computing coefficients defining image plane curves further comprises computing intersection line coefficients for pairs of the planar surfaces, the intersection line coefficients being computed for each pair of planar surfaces associated with the same object list in accordance with three intersection line coefficient formulas:

$$l_1 = B_{1\text{-}1}/B_{4\text{-}1} - B_{1\text{-}2}/B_{4\text{-}2}$$

$$l_2 = B_{3\text{-}1}/B_{4\text{-}1} - B_{3\text{-}2}/B_{4\text{-}2}$$

$$l_3 = B_{2\text{-}1}/B_{4\text{-}1} - B_{2\text{-}2}/B_{4\text{-}2}$$

where $l_1$, $l_2$ and $l_3$ are the intersection line coefficients, $B_{1\text{-}1}$ through $B_{4\text{-}1}$ are the bounding plane coefficients for one of the planar surfaces from the pair, $B_{1\text{-}2}$ through $B_{4\text{-}2}$ are the bounding plane coefficients for the other planar surface from the pair, and the perspective projection of the intersection between the planar surfaces in the pair includes a locus of all points in the image plane satisfying an equation:

$$l_1h + l_2v + l_3 = 0.$$

9. The method of claim 8, wherein the desired portions of the image plane curves for each object are limited to those portions related to a part of the object's boundary surface which faces the focal point of the perspective projection.

10. The method of claim 9, further comprising calculating visibility test line coefficients for each intersection curve, the visibility test line coefficients being computed in accordance with three visibility test line coefficient formulas:

$t_1 = B_1/B_4 - q_7/2q_0$ $t_2 = B_3/B_4 - q_9/2q_0$ $t_3 = (B_3/B_4 - q_8/2q_0)f$ where $t_1$, $t_2$ and $t_3$ are the visibility test line coefficients, $B_1$ through $B_4$ are the associated bounding plane coefficients and $q_7$, $q_8$, $q_9$ and $q_0$ are four of the associated quadric surface coefficients; and determining the desired portions of each object's associated image plane curves by referring to the associated limb curve, intersection curve, intersection line and visibility test line coefficients and the inequality identification for the associated planar surfaces.

11. The method of claim 10, wherein the image plane curves include limb curves, each defined by the limb curve coefficients for an associated one of the quadric surfaces; intersection curves, each defined by the intersection curve coefficients for an associated one of the planar surfaces; and intersection lines, each defined by the intersection line coefficients for an associated one of the pairs of planar surfaces.

12. The method of claim 11, wherein the step of determining desired portions of each object's image plane curves comprises:
testing minimum and maximum points on the associated limb curve against the object's associated visibility test line coefficients and intersection lines;
testing contact points between the associated limb curve and each associated intersection curve against the associated intersection lines; and
testing points of intersection between intersection curves and intersection lines against the object's associated intersection line.

13. A method for simulating visual images encountered during nap-of-the-earth flight, said method comprising:
(a) gathering elevation data from a geographic region of which the visual images are to be simulated, the elevation data being measured with respect to a ground plane;
(b) digitizing the elevation data;
(c) determining major terrain features;
(d) isolating the major terrain features;
(e) fitting a single quadric surface to the elevation data corresponding to each isolated major terrain feature;
(f) determining bounding planes for each isolated major terrain feature to maximize continuity between adjoining quadric surfaces;
(g) determining the texture function parameters sufficient to define a desired texture pattern for each quadric surface and bounding plane by Fourier analysis of the elevation data;
(h) generating further quadric surfaces, bounding planes and texture function parameters corresponding to solid surface objects typically found in the geographic region for which the visual images are to be simulated;
(i) generating yet further quadric surfaces, bounding planes and texture function parameters corresponding to dynamic objects typically found in the geographic region for which the visual images are to be simulated;
(j) generating yet further texture function parameters corresponding to a desired cloud texture pattern;
(k) constructing a data base containing quadric surface parameters indicating the size and shape of each quadric surface and its location and orientation with respect to the ground plane, bounding plane parameters indicating the orientation of each bounding plane with respect to the ground plane, and the texture function parameters;
(l) defining a line of sight corresponding to an observation platform location and orientation with respect to the ground plane;
(m) assigning a subframe processor to each of a plurality of uniform subframe areas covering a field of view corresponding to the line of sight;
(n) determining which of the major terrain features, solid surface objects, and dynamic objects are within the field of view;
(o) assigning an object processor to each quadric surface corresponding to the major terrain features, solid surface objects, and dynamic objects within the field of view;
(p) causing each assigned object processor to compute intraobject visibility information for its assigned quadric surface and associated bounding planes from the quadric surface and bounding plane parameters in the data base, and the line of sight;
(q) causing the subframe processors to generate image information from the intraobject visibility information and the texture function parameters;
(r) displaying the image information;
(s) updating the line of sight to simulate a desired incremental in the location and orientation of the observation platform with respect to the ground plane;
(t) varying the texture function parameters corresponding to the dynamic objects and the cloud texture pattern to simulate a desired motion and agitation of the associated texture patterns; and
(u) repeating the steps (n) to (t) at a sufficient rate to simulate the desired visual images.

14. A flight training system for simulating an image plane viewable from a flight platform over a region modeled by a multiplicity of objects, said system comprising:
bulk memory means for storing an object list for each object, each such object list including a plurality of object parameters indicating the size, shape, orientation, location, and texture of the associated object;
viewpoint tracking means for providing an updated set of viewpoint parameters indicating the location and orientation of the flight platform with respect to the objects, said viewpoint parameters being updated once during each passage of a desired frame period;
a plurality of object processors for providing an updated set of coefficients for image plane curves representing a perspective projection of the objects into the image plane, said coefficients being computed once per frame period from the viewpoint parameters and the shape, size, orientation and location object parameters;

pixel generating means for providing an updated set of intensity levels for a multiplicity of pixels corresponding to sample points on the image plane, said intensity levels being computed once per frame period from the image plane curve coefficients, the viewpoint parameters, and the texture and location object parameters, said pixel generating means comprising a plurality of subframe processors each associated with a subframe defined by one of a plurality of uniform contiguous areas forming the image plane, and means for transferring the updated image plane curve coefficient from each object processor to at least one subframe processor whose associated area in the image plane is intersected by the projection of an object associated with that object processor, the updated image plane curve coefficients being transferred once per frame period;

fast memory means for storing those object lists corresponding to objects currently viewable in the image plane, the object lists being organized into blocks in the bulk memory means, each block including all the object lists for one of a plurality of predetermined contiguous areas making up the modeled region, the number of objects in each contiguous area being nearly equal; and display means for arranging the pixels on a video raster.

15. A system as claimed in claim 14, wherein the bulk memory means comprises a magnetic disc memory.

16. A system as claimed in claim 14, further comprising means for transferring the blocks of object lists from the bulk memory means to the fast memory means.

17. A system as claimed in claim 14, wherein the object location parameters for each object comprise three Cartesian coordinates identifying a location point within a reference coordinate system having perpendicular width and depth axes defining a ground plane and an elevation axis perpendicular to the ground plane.

18. A system as claimed in claim 17, wherein the location point for at least one of the objects defines the geometric center of a quadric surface associated with that object.

19. A system as claimed in claim 18, wherein the quadric surface is an ellipsoid.

20. A system as claimed in claim 19, wherein the object shape and size parameters for the object having the associated quadric surface comprise three radial lengths taken from the location point to the surface of the ellipsoid along orthogonal object axes.

21. A system as claimed in claim 18, wherein the quadric surface is a two-sheeted hyperboloid.

22. A system as claimed in claim 21, wherein the object shape and size parameters for the object having the associated quadric surface comprise three linear measurements taken from a vertex of one part of the hyperboloid to a bounding cone associated with the hyperboloid along orthogonal object axes, one of the object axes passing through the location point.

23. A system as claimed in claim 17, wherein the object orientation parameters for each object comprise three angular measurements specifying an angular relationship of three orthogonal object axes to the width, depth and elevation axes, the object axes intersecting at a given point with respect to the object's location point.

24. A system as claimed in claim 17, wherein the location point for at least one of the objects provides a reference for at least one bounding plane associated with that object.

25. A system as claimed in claim 24, wherein the object shape parameters for the object having the associated bounding plane comprise three vector coordinates defining a line segment normal to the bounding plane and extending from the location point to a point on the bounding plane.

26. The system of claim 14, wherein the pixel generating means comprises means for identifying which of the pixels are superimposed by at least one area in the image plane circumscribed by the image plane curves of one of the objects;

means for determining, for each superimposed pixel, first, second and third Cartesian coordinates identifying a location in an object model space of a point on the associated object for which a projection of the point into the image plane falls within the superimposed pixel; and computing means for modulating the intensity level of each superimposed pixel in accordance with a value of a texture function computed using the object texture parameters of the associated object and the Cartesian coordinates determined for the superimposed pixel, the object texture parameters for each object being statistically related to the object, and the object texture parameters for the object associated with the superimposed pixels including spatial frequencies related by the texture function to the first and second Cartesian coordinates determined for each superimposed pixel.

27. The system of claim 26, wherein the object texture parameters for the object associated with the superimposed pixels further include phase shift factors related by the texture function to the spatial frequencies.

28. The system of claim 27, wherein the value of the texture function, T, at each superimposed pixel is computed according to an expression:

$$T = \left[ \sum_{i=1}^{m} C_{xi}\sin(\omega_{xi}x + P_{xi}) \right] \times \left[ \sum_{j=1}^{n} C_{yj}\sin(\omega_{yj}y + P_{yj}) \right]$$

wherein a number, m, of the spatial frequencies, indicated as $\omega_{xi}$, i being an integer varying from 1 to m, are related to the first Cartesian coordinate determined for the pixel, indicated as x, and a number, n, of the spatial frequencies, indicated as $\omega_{yj}$, j being an integer varying from 1 to n, are related to the second Cartesian coordinate determined for the pixel, indicated as y, each of the m spatial frequencies $\omega_{xi}$ having an associated weighting factor, $C_{xi}$, and an associated phase shift component, $P_{xi}$, the phase shift component $P_{xi}$ being derived from the associated phase shift factors, each of the n spatial frequencies $\omega_{yj}$ having an associated phase shift component, $P_{yj}$, the phase shift component $P_{yj}$ being derived from the associated phase shift factors.

29. The system of claim 28, wherein the phase shift components $P_{xi}$ and $P_{yj}$ are derived in accordance with two expressions:

$$P_{xi} = J_{xi} \sin(\phi_{xi}y) + K_{xi} \sin(\psi_{xi}z)$$

and $$P_{yj} = J_{yj} \sin(\phi_{yj} x) + K_{yj} \sin(\psi_{yj} z)$$

wherein the phase shift factors related to each spatial frequency $\psi_{xi}$ are indicated as $J_{xi}$, $\phi_{xi}$, $K_{xi}$ and $\psi_{xi}$, the phase shift factors related to each spatial frequency $\omega_{yj}$ are indicated as $J_{yj}$, $\phi_{yj}$, $K_{yj}$ and $\psi_{yj}$, and the third Cartesian coordinate determined for the pixel for which the texture function is being evaluated is indicated as z.

30. The system of claim 19, wherein the pixel generating means comprises:
   means for computing the intensity levels of each of the pixels in accordance with a desired image plane intensity function evaluated at the sample points, the pixels being square and of a uniform pixel width, each sample point substantially corresponding with a center of its associated pixel;
   alias testing means for identifying as aliased pixels those pixels intersected by a predetermined area about at least one of the image plane curves, said one of the image plane curves defining a boundary curve between first and second regions in the image plane, the image plane intensity function varying at relatively low frequencies within each region and at relatively high frequencies from one region to another;
   distance measuring means for determining a weighting distance for each aliased pixel, each weighting distance being defined as a distance measured in pixel widths from the center of the associated pixel to the boundary curve;
   weight calculating means for deriving first and second intensity weights for each aliased pixel, the first intensity weight for each aliased pixel whose center lies in the first region and the second intensity weight for each aliased pixel whose center lies in the second region being derived from the associated weighting distance, the remaining intensity weight for each aliased pixel being derived from a negative of the associated weighting distance; and
   intensity adjusting means for assigning an antialiased intensity level to each aliased pixel, the antialiased intensity level being substantially equal to a value of the image plane intensity function in the first region multiplied by the first intensity weight plus a value of the image plane intensity function in the second region multiplied by the second intensity weight.

31. The system of claim 30, wherein the predetermined area about the boundary curve includes all points in the image plane within a cutoff distance of the boundary curve, the cutoff distance being substantially equal to the pixel width multiplied by a square root of two.

32. The system of claim 31, wherein the weight calculating means comprises an arithmetic unit which derives each first intensity weight, $W_1$, and each second intensity weight, $W_2$, in substantial accordance with two expressions:

$$W_1 = \tfrac{1}{2} + (3\sqrt{2}/8)d - (\sqrt{2}/16)d^3$$
and
$$W_2 = 1 - W_1$$

wherein the weighting distance of the associated pixel is indicated as d.

33. The system of claim 31, wherein the weight calculating means comprises a look up table.

34. The system of claim 14, wherein each subframe processor comprises:
   a program unit including means for storing and executing a program in accordance with a data structure of the object lists and the image plane curve coefficients;
   a program bus responsive to the program unit for conducting data words and address words;
   a plurality of data registers responsive to the program bus;
   an accumulator bus responsive to at least one of the data registers;
   a multiplier responsive to the program bus and the accumulator bus, said multiplier receiving clocking and control signals from the program unit;
   an adder responsive to the program bus and the accumulator bus, said adder receiving clocking and control signals from the program unit;
   a buffer bus responsive to the multiplier, the adder, and at least one of the data registers;
   a data buffer responsive to the buffer bus and receiving clocking and control signals from the program unit, the buffer bus being further responsive to the data buffer;
   a mask register responsive to the buffer bus and receiving clocking and control signals from the program unit, the program bus being further responsive to the mask register;
   an address register responsive to the program bus and receiving timing and control signals from the program unit;
   an input memory having an address input responsive to the address register, the data buffer being further responsive to the input memory;
   an output memory having an address input responsive to the address register, the output buffer being responsive to the data buffer;
   an input buffer for receiving object lists and updated image plane curve coefficients for those objects whose projections intersect the associated subframe area in the image plane, the input buffer further receiving the updated viewpoint parameters and transferring the received object lists, updated image plane curve coefficients, and updated viewpoint parameters to the input memory;
   an output buffer responsive to the output memory for storing the updated pixel intensity levels;
   a scratchpad memory;
   at least one scratchpad buffer responsive to the scratchpad memory and the buffer bus, the accumulator bus being further responsive to the scratchpad buffer, the scratchpad memory being responsive to the scratchpad buffer; and
   at least one scratchpad address register responsive to the program bus and receiving clocking and control signals from the program unit, the scratchpad memory having an address input responsive to the program bus.

35. The system of claim 14, wherein each object processor comprises:
   a program unit including means for storing and executing an algorithm in accordance with a data structure of the object lists;
   a program bus responsive to the program unit for conducting data words and address words;
   a plurality of data registers responsive to the program bus;

an accumulator bus responsive to at least one of the data registers;

a multiplier responsive to the program bus and the accumulator bus, said multiplier receiving clocking and control signals from the program unit;

an adder responsive to the program bus and the accumulator bus, said adder receiving clocking and control signals from the program unit;

a sine lookup table responsive to the program bus, the accumulator bus being further responsive to the sine lookup table, the sine lookup table receiving clocking and control signals from the program unit;

a buffer bus responsive to the multiplier, the adder, the sine lookup table and at least one of the data registers;

a data buffer responsive to the buffer bus and receiving clocking and control signals from the program unit, the buffer bus being further responsive to the data buffer;

a mask register responsive to the buffer bus and receiving clocking and control signals from the program unit, the program bus being further responsive to the mask register;

an address register responsive to the program bus and receiving timing and control signals from the program unit;

an input memory having an address input responsive to the address register, the data buffer being further responsive to the input memory;

an output memory having an address input responsive to the address register, the output memory being responsive to the data buffer;

an input buffer for receiving assigned object lists from the bulk memory means and updated viewpoint parameters from the viewpoint tracking means, the input buffer transferring the assigned object lists and updated viewpoint parameters to the input memory; and an output buffer responsive to the output memory for storing the updated image plane curve coefficients.

36. In a system for displaying an image plane on a video raster made up of pixels arranged on scan lines, each pixel having an associated intensity level, a portion of the pixels being superimposed by a projection into the image plane of at least one simulated object, a texture generator comprising memory means for storing parameters for a texture function, the parameters being statistically related to the simulated object;

means for determining, for each superimposed pixel, first, second and third Cartesian coordinates identifying a location in an object model space of a point on the simulated object for which a projection of the point into the image plane falls within the superimposed pixel;

computing means for modulating the intensity level of each superimposed pixel in accordance with a value of the texture function computed using the Cartesian coordinates determined for that pixel;

comparing means for comparing the value of the texture function for each superimposed pixel with a translucence limit for the object and substituting a background intensity level for the intensity level of each superimposed pixel whose texture function value is less than the translucence limit.

37. The system of claim 36, wherein the translucence limit varies from a maximum value at a center of the object's projection to a minimum value at an edge of the object's projection, the maximum and minimum values of the translucence limit corresponding to maximum and minimum values of the texture function.

38. The system of claim 36, wherein said parameters include spatial frequencies related by the texture function to the first and second Cartesian coordinates determined for each superimposed pixel, and further include phase shift factors related by the texture function to the spatial frequencies.

39. The system of claim 38, wherein the value of the texture function, T, at each superimposed pixel is computed according to an expression:

$$T = \left[\sum_{i=1}^{m} C_{xi}\sin(\omega_{xi}x + P_{xi})\right] \times \left[\sum_{j=1}^{n} C_{yj}\sin(\omega_{yj}y + P_{yj})\right]$$

wherein a number, m, of the spatial frequencies, indicated as $\omega_{xi}$, i being an integer varying from 1 to m, are related to the first Cartesian coordinate determined for the pixel, indicated as x, and a number, n, of the spatial frequencies, indicated as $\omega_{yj}$, j being an integer varying from 1 to n, are related to the second Cartesian coordinate determined for the pixel, indicated as y, each of the m spatial frequencies $\omega_{xi}$ having an associated weighting factor, $C_{xi}$, and an associated phase shift component, $P_{xi}$, the phase shift component $P_{xi}$ being derived from the associated phase shift factors, each of the n spatial frequencies $\omega_{yj}$ having an associated weighting factor, $C_{yj}$, and an associated phase shift component, $P_{yj}$, the phase shift component $P_{yj}$ being derived from the associated phase shift factors.

40. The system of claim 39, wherein the phase shift components $P_{xi}$ and $P_{yj}$ are derived in accordance with two expressions:

$$P_{xi} = J_{xi}\sin(\phi_{xi}y) + K_{xi}\sin(\psi_{xi}z)$$

and $$P_{yj} = J_{yj}\sin(\phi_{yj}x) + K_{yj}\sin(\psi_{yj}z)$$

wherein the phase shift factors related to each spatial frequency $\omega_{xi}$ are indicated as $J_{xi}$, $\phi_{xi}$, $K_{xi}$ and $\psi_{xi}$, the phase shift factors related to each spatial frequency $\omega_{yj}$ are indicated as $J_{yj}$, $\phi_{yj}$, $K_{yj}$ and $\psi_{yj}$, and the third Cartesian coordinate determined for the pixel is indicated as z.

41. In a system for generating a display of an image plane characterized by at least one boundary curve separating first and second regions of different intensities, the display being formed by a plurality of square pixels of uniform width arranged on a video raster, each pixel having an associated intensity level, an antialiasing filter comprising:

alias testing means for identifying as aliased pixels those pixels intersected by a predetermined area about the boundary curve, said predetermined area about said boundary curve including all points in the image plane within a cutoff distance of said boundary curve, the cutoff distance being substantially equal to the pixel width multiplied by a square root of two distance measuring means for determining a weighting distance for each aliased pixel, each weighting distance being defined as a distance measured in pixel widths from a center of the associated pixel to the boundary curve;

weight calculating means for deriving first and second intensity weights for each aliased pixel, the first intensity weight for each aliased pixel whose center lies in the first region and the second intensity weight for each aliased pixel whose center lies in the second region being derived from the associated weighting distance, the other intensity weight for each aliased pixel being derived from a negative of the associated weighting distance; and intensity adjusting means for assigning an antialiased intensity level to each aliased pixel, the antialiased intensity level being substantially equal to the associated first intensity weight multiplied by the intensity of the first region plus the associated second intensity weight multiplied by the intensity of the second region.

42. The system of claim 41, wherein the weight calculating means comprises an arithmetic unit which derives each first intensity weight, $W_1$, and each second intensity weight, $W_2$, in substantial accordance with two expressions:

$$W_1 = \tfrac{1}{2} + (3\sqrt{2}/8)d - (\sqrt{2}/16)d^3$$

and $$W_2 = 1 - W_1$$

wherein the weighting distance of the associated pixel is indicated as d.

43. The system of claim 41, wherein the weight calculating means comprises a look-up table.

* * * * *

UNITED STATES PATENT AND TRADEMARK OFFICE
CERTIFICATE OF CORRECTION

PATENT NO. : 4,677,576
DATED : June 30, 1987
INVENTOR(S) : EDWIN P. BERLIN, JR., ET AL It is certified that error appears in the above-identified patent and that said Letters Patent is hereby corrected as shown below:

Col. 4, line 47, "and" should be -- are --

Col. 8, line 66, "Particular" should be -- perpendicular --

Col. 16, line 47, "P" should be deleted; "Final" should be the beginning of a new paragraph Col. 18, line 56, "implantation" should be -- implementation --

Col. 19, line 2, "$\overline{\sqrt{2d}}$" should be -- $\sqrt{2}$ d -- line 9, "$\sqrt{2d}$" should be -- $\sqrt{2}$ d --

Col. 20, line 6, "of" should be -- at --

Col. 26, line 53, "mixture" should be -- texture --

Col. 27, line 52, "affect" should be -- affected"

Col. 95, line 9, which is claim 30, "19" should be --14--

Signed and Sealed this

Fourteenth Day of August, 1990

Attest:

HARRY F. MANBECK, JR.

*Attesting Officer*  *Commissioner of Patents and Trademarks*